(12) United States Patent
Shahana et al.

(10) Patent No.: US 11,840,312 B2
(45) Date of Patent: *Dec. 12, 2023

(54) CONTROL DEVICE FOR HUMAN-POWERED VEHICLE AND POWER TRANSMISSION SYSTEM

(71) Applicant: Shimano Inc., Osaka (JP)

(72) Inventors: Satoshi Shahana, Osaka (JP); Hayato Shimazu, Osaka (JP); Mitsuhiko Kawasaki, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,398

(22) Filed: Mar. 7, 2023

(65) Prior Publication Data

US 2023/0202614 A1 Jun. 29, 2023

Related U.S. Application Data

(63) Continuation of application No. 17/120,730, filed on Dec. 14, 2020, now Pat. No. 11,623,713.

(30) Foreign Application Priority Data

Dec. 18, 2019 (JP) ................................. 2019-228121
Oct. 30, 2020 (JP) ................................. 2020-183008

(51) Int. Cl.
*B62M 6/45* (2010.01)
*B62M 9/122* (2010.01)

(52) U.S. Cl.
CPC .............. *B62M 6/45* (2013.01); *B62M 9/122* (2013.01)

(58) Field of Classification Search
CPC .......... B62M 6/45; B62M 9/122; B62M 6/50; B62M 9/123; B62M 11/02; B62M 6/55;
(Continued)

(56) References Cited

U.S. PATENT DOCUMENTS 6,629,574 B2 10/2003 Turner
8,768,585 B2 7/2014 Cheng
(Continued)

FOREIGN PATENT DOCUMENTS

CN 104554612 A 4/2015
CN 105799851 A 7/2016
(Continued)

*Primary Examiner* — Vinh Luong
(74) *Attorney, Agent, or Firm* — Global IP Counselors, LLP

(57) ABSTRACT

A human-powered vehicle includes a crank axle, a first rotational body, a wheel, a second rotational body, a transmission body that transmits a driving force between the first rotational body and the second rotational body, a derailleur configured to operate the transmission body to change a transmission ratio, a motor configured to drive the transmission body and an electric actuator configured to operate the derailleur. A control device has an electronic controller configured to control electric actuator and the motor. The electronic controller is configured to control the electric actuator and drive the transmission body with the motor so that the transmission ratio is changed in a predetermined shifting range in upon determining the derailleur has been actuated to change the transmission ratio and a predetermined condition related to pedaling is satisfied.

27 Claims, 27 Drawing Sheets

(58) Field of Classification Search
CPC . B62M 9/04; B62M 9/12; B62J 45/411; B62J 45/412; B62J 45/413; Y02T 10/72
See application file for complete search history.

(56) References Cited

U.S. PATENT DOCUMENTS

| | | | |
|---|---|---|---|
| 11,623,713 B2 * | 4/2023 | Shahana | B62M 6/45 180/206.2 |
| 2013/0054066 A1 | 2/2013 | Watarai | |
| 2015/0088389 A1 | 3/2015 | Gao | |
| 2016/0052594 A1 | 2/2016 | Kimmich | |
| 2017/0106866 A1 | 4/2017 | Schieffeilin | |
| 2017/0282919 A1 | 10/2017 | Schieffelin | |
| 2018/0354586 A1 | 12/2018 | Komatsu et al. | |
| 2019/0161140 A1 * | 5/2019 | Nishino | B62M 9/133 |
| 2019/0249769 A1 * | 8/2019 | Hamed | F16H 63/42 |
| 2019/0263474 A1 * | 8/2019 | Hamed | B62M 9/127 |
| 2020/0262510 A1 * | 8/2020 | Hahn | B62M 9/132 |
| 2021/0031872 A1 | 2/2021 | Shahana et al. | |
| 2021/0188394 A1 | 6/2021 | Shahana et al. | |
| 2022/0081066 A1 * | 3/2022 | Fujimoto | B62M 9/1242 |
| 2022/0135176 A1 | 5/2022 | Shahana et al. | |
| 2022/0204126 A1 | 6/2022 | Shahana et al. | |
| 2023/0202614 A1 * | 6/2023 | Shahana | B62M 6/45 180/206.2 |
| 2023/0202615 A1 * | 6/2023 | Shahana | B62M 6/45 180/206.2 |
| 2023/0202616 A1 * | 6/2023 | Shahana | B62M 6/55 180/206.3 |

FOREIGN PATENT DOCUMENTS

| | | | | |
|---|---|---|---|---|
| CN | 107428393 A | | 12/2017 | |
| EP | 2 581 299 A | | 4/2013 | |
| EP | 3275775 A1 | * | 1/2018 | ............ B62M 9/132 |
| JP | 2008-222211 A | | 9/2008 | |

* cited by examiner

CONTROL DEVICE FOR HUMAN-POWERED VEHICLE AND POWER TRANSMISSION SYSTEM

CROSS-REFERENCE TO RELATED APPLICATIONS

This application is a continuation application of U.S. patent application Ser. No. 17/120,730, filed on Dec. 14, 2020. The entire disclosure of U.S. patent application Ser. No. 17/120,730 is hereby incorporated herein by reference. This application also claims priority to Japanese Patent Application No. 2019-228121, filed on Dec. 18, 2019, and Japanese Patent Application No. 2020-183008, filed on Oct. 30, 2020. The entire disclosures of Japanese Patent Application Nos. 2019-228121 and 2020-183008 are hereby incorporated herein by reference.

BACKGROUND

Technical Field

The present invention generally relates to a control device for a human-powered vehicle and a power transmission system.

Background Information

Japanese Laid-Open Patent Publication No. 2008-222211 (Patent Document 1) discloses an example of a human-powered vehicle including a derailleur that operates a transmission body to change the transmission ratio.

SUMMARY

One object of the present disclosure is to provide a control device for a human-powered vehicle and a power transmission system that change the transmission ratio in a preferred manner.

A control device in accordance with a first aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body to transmit driving force between the first rotational body and the second rotational body, a derailleur configured to operate the transmission body to change a transmission ratio of a rotational speed of the wheel to a rotational speed of the crank axle, and a motor configured to drive the transmission body. The control device comprises an electronic controller configured to control the motor and drive the transmission body with the motor so as to increase a rotational speed of the motor as a difference of a first rotational speed, which is calculated in correspondence with a rotational speed of the wheel and the transmission ratio, and a predetermined rotational speed or a rotational speed in a predetermined range increases upon determining the derailleur has been actuated to change the transmission ratio and a predetermined condition related to pedaling is satisfied. The control device in accordance with the first aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the first aspect is configured to control the motor and drive the transmission body so as to increase the rotational speed of the motor as the difference of the first rotational speed, which is calculated in correspondence with the rotational speed of the wheel and the transmission ratio, and the predetermined rotational speed or the rotational speed in the predetermined range increases. This changes the transmission ratio in a preferred manner.

In accordance with a second aspect of the present disclosure, the control device according to the first aspect is configured so that the first rotational speed, the predetermined rotational speed, and the rotational speed in the predetermined range correspond to a rotational speed of the crank axle. With the control device according to the second aspect, the motor is controlled in correspondence with the rotational speed of the crank axle in a preferred manner.

In accordance with a third aspect of the present disclosure, the control device according to the second aspect is configured so that the predetermined rotational speed and the rotational speed in the predetermined range are 50 rpm or greater and 80 rpm or less. The control device according to the third aspect allows the user to easily maintain the rotational speed of the crank axle at a rotational speed of 50 rpm or greater and 80 rpm or less.

In accordance with a fourth aspect of the present disclosure, the control device according to any one of the first to third aspects is configured so that the human-powered vehicle further includes a first operating device. The electronic controller is configured to control the motor so as not to drive the transmission body upon determining a first operating device of the human-powered vehicle has been operated to prevent actuation of the derailleur to change the transmission ratio and the predetermined condition related to pedaling is satisfied. The control device in accordance with the fourth aspect is configured to control the motor so as not to drive the transmission body if the operating device is operated even in a case where the derailleur is actuated to change the transmission ratio and the predetermined condition related to pedaling is satisfied. This reduces the frequency of driving the motor.

In accordance with a fifth aspect of the present disclosure, the control device according to the fourth aspect is configured so that the electronic controller is configured to be switchable between a first mode and a second mode. The electronic controller is configured to control the motor in the first mode so as to drive the transmission body in correspondence with a state of the human-powered vehicle upon determining a second operating device of the human-powered vehicle has been operated to actuate the derailleur and the predetermined condition related to pedaling is satisfied. The electronic controller is configured to control the motor in the second mode so as not to drive the transmission body even upon determining the second operating device has been operated and the predetermined condition related to pedaling is satisfied. The control device in accordance with the fifth aspect allows the user to switch between the first mode and the second mode to select whether the transmission body is driven by the motor to perform shifting.

In accordance with a sixth aspect of the present disclosure, in the control device according to any one of the first to fifth aspects, the electronic controller is configured to control the motor so as to stop driving the transmission body with the motor in correspondence with a load on the motor upon determining the derailleur has been actuated to change the transmission ratio and the predetermined condition related to pedaling is satisfied. The control device in accordance with the sixth aspect controls the motor and stops driving the transmission body with the motor in correspondence with the load on the motor in a case where the derailleur is actuated to change the transmission ratio and the predetermined condition related to pedaling is satisfied. The control device in accordance with the sixth aspect avoids propelling the human-powered vehicle with only the motor.

In accordance with a seventh aspect of the present disclosure, the control device according to the sixth aspect further comprises a first detector configured to detect the load on the motor. The electronic controller is configured to control the motor and stop the motor if the derailleur is actuated to change the transmission ratio upon determining the predetermined condition related to pedaling is satisfied and the load on the motor is greater than or equal to a predetermined load. The control device in accordance with the seventh aspect controls the motor and stops the motor if the derailleur is actuated to change the transmission ratio in a case where the predetermined condition related to pedaling is satisfied and the load on the motor is greater than or equal to the predetermined load. The control device in accordance with the seventh aspect avoids propelling the human-powered vehicle with only the motor.

In accordance with an eighth aspect of the present disclosure, in the control device according to any one of the first to seventh aspects, the electronic controller is configured to control the motor so as to stop driving the transmission body upon determining a vehicle speed of the human-powered vehicle is less than or equal to a first speed or the rotational speed of the wheel is less than or equal to a predetermined rotational speed, and upon determining the predetermined condition related to pedaling is satisfied. The control device in accordance with the eighth aspect controls the motor so as to stop driving the transmission body if the vehicle speed of the human-powered vehicle is less than or equal to the first speed or the rotational speed of the wheel is less than or equal to the predetermined rotational speed in a case where the derailleur is actuated to change the transmission ratio and the predetermined condition related to pedaling is satisfied. The control device in accordance with the eighth aspect restricts shifting in a case where the vehicle speed of the human-powered vehicle is low.

In accordance with a ninth aspect of the present disclosure, the control device according to any one of the first to eighth aspects is configured so that the electronic controller is configured to control an electric actuator of the human-powered vehicle to operate the derailleur. The control device in accordance with the ninth aspect controls the electric actuator to operate the derailleur.

In accordance with a tenth aspect of the present disclosure, in the control device according to the ninth aspect, the electronic controller is configured to be switchable between a first shifting mode, in which the electronic controller controls the electric actuator in accordance with a state of the human-powered vehicle, and a second shifting mode, in which the electronic controller controls the electric actuator in accordance with operation of a transmission operating device provided on the human-powered vehicle. The electronic controller is configured to be switchable between a third mode and a fourth mode in the first shifting mode. In the third mode, the electronic controller is configured to control the motor and drive the transmission body in accordance with the state of the human-powered vehicle upon determining the derailleur has been actuated to change the transmission ratio and the predetermined condition related to pedaling is satisfied. In the fourth mode, the electronic controller is configured to control the motor so as not to drive the transmission body even in upon determining the derailleur has been actuated to change the transmission ratio and the predetermined condition related to pedaling is satisfied. With the control device in accordance with the tenth aspect, in the first shifting mode, the user can switch between the third mode in which the transmission body is automatically driven and the fourth mode in which the transmission body is driven by the user.

In accordance with an eleventh aspect of the present disclosure, in the control device according to the ninth aspect, the electronic controller is configured to control the motor and the electric actuator so that relative movement of the derailleur and at least one of the first rotational body and the second rotational body is started simultaneously as the motor is driven or before the motor is driven upon determining the electric actuator and the motor are controlled to change the transmission ratio and a predetermined condition related to pedaling is satisfied. The control device in accordance with the eleventh aspect controls the motor and the electric actuator so that relative movement of the derailleur and at least one of the first rotational body and the second rotational body is started simultaneously as the motor is driven or before the motor is driven. This changes the transmission ratio in a preferred manner.

In accordance with a twelfth aspect of the present disclosure, in the control device according to the ninth aspect, the controller is configured to control the motor and drive the transmission body with the motor upon determining the derailleur has been actuated to change the transmission ratio and the predetermined condition related to pedaling is satisfied. The controller is configured to control the electric actuator so that a shift stage of the derailleur approaches a predetermined shift stage or the transmission ratio approaches a predetermined transmission ratio upon determining the human-powered vehicle is decelerated. The controller is configured to control the electric actuator and change the shift stage of the derailleur one stage at a time upon determining either a difference of the predetermined shift stage and a present shift stage of the derailleur or a difference of the predetermined transmission ratio, and the present transmission ratio is less than or equal to a predetermined value. The controller is configured to control the electric actuator so as to continuously actuate the derailleur over a plurality of shift stages upon determining either a difference of the predetermined shift stage and a present shift stage of the derailleur or a difference of the predetermined transmission ratio, and the present transmission ratio exceeds the predetermined value. The control device in accordance with the twelfth aspect controls the electric actuator so as to continuously actuate the derailleur over a plurality of shift stages in a case where the difference of the predetermined shift stage and the present shift stage of the derailleur or the difference of the predetermined transmission ratio and the present transmission ratio exceeds the predetermined value. The control device in accordance with the twelfth aspect reduces the time for changing the present shift stage to a preferred shift stage or the time for changing the present transmission ratio to a preferred transmission ratio.

In accordance with a thirteenth aspect of the present disclosure, in the control device according to any one of the first to twelfth aspects, the predetermined condition related to pedaling is satisfied in at least one of a case where a human driving force input to the crank axle is less than or equal to a predetermined driving force, a case where a rotational speed of the crank axle is less than or equal to a second rotational speed, and a case where the crank axle is oscillating. The control device in accordance with the thirteenth aspect drives the motor in at least one of a case where human driving force input to the crank axle is less than or equal to the predetermined driving force, a case where the rotational speed of the crank axle is less than or equal to the second rotational speed, and a case where the crank axle is oscillating. This changes the transmission ratio in a preferred manner.

In accordance with a fourteenth aspect of the present disclosure, in the control device according to any one of the first to thirteenth aspects, the electronic controller is configured to control the motor to apply a propulsion force to the human-powered vehicle in accordance with a human driving force, and the electronic controller is configured to drive the transmission body so as not to apply the propulsion force to the human-powered vehicle upon determining the derailleur has been actuated to change the transmission ratio and the predetermined condition related to pedaling is satisfied. The control device in accordance with the fourteenth aspect controls the motor and drives the transmission body so as not to apply the propulsion force to the human-powered vehicle in a case where the derailleur is actuated to change the transmission ratio and the predetermined condition related to pedaling is satisfied. The control device in accordance with the fourteenth aspect reduces the power consumption of the motor.

A power transmission system in accordance with a fifteenth aspect of the present disclosure is for a human-powered vehicle. The power transmission system comprises the control device according to any one of the first to fourteenth aspects and a first one-way clutch provided in a first power transmission path between the crank axle and the first rotational body and configured to transmit rotational force from the crank axle to the first rotational body in a first rotational direction and restrict transmission of rotational force from the first rotational body to the crank axle in the first rotational direction. The power transmission system in accordance with the fifteenth aspect changes the transmission ratio in a preferred manner. The power transmission system in accordance with the fifteenth aspect restricts transmission of rotational force of the first rotational body to the crank axle with the first one-way clutch in a case where the first rotational body is rotated by the motor. This changes the transmission ratio in a preferred manner in a case where the motor is driven to change the transmission ratio.

In accordance with a sixteenth aspect of the present disclosure, the power transmission system according to the fifteenth aspect further comprises a second one-way clutch provided in a second power transmission path between the second rotational body and the wheel and configured to transmit rotational force from the second rotational body to the wheel in a second rotational direction corresponding to the first rotational direction and restrict transmission of rotational force from the wheel to the second rotational body in the second rotational direction. In the power transmission system in accordance with the sixteenth aspect, the second one-way clutch allows relative rotation of the second rotational body and the wheel. This changes the transmission ratio in a preferred manner in a case where the motor is driven to change the transmission ratio.

A control device in accordance with a seventeenth aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, and a motor configured to drive the transmission body. The control device comprises an electronic controller configured to control the motor and drive the transmission body with the motor so as to change at least one of a rotational angle of the motor and an output torque of the motor in correspondence with a state of the human-powered vehicle upon determining the derailleur has been actuated to change the transmission ratio and a predetermined condition related to pedaling is satisfied. The control device in accordance with the seventeenth aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the seventeenth aspect is configured to control the motor and drive the transmission body with the motor to change at least one of the rotational angle of the motor and the output torque of the motor in correspondence with the state of the human-powered vehicle. This changes the transmission ratio in a preferred manner.

In accordance with an eighteenth aspect of the present disclosure, the control device according to the seventeenth aspect is configured so that the state of the human-powered vehicle includes the rotational speed of the wheel and the transmission ratio. The electronic controller is configured to control the motor so as to increase at least one of the rotational angle of the motor and the output torque as a difference of a first rotational speed, which is calculated in correspondence with the rotational speed of the wheel and the transmission ratio, and a predetermined rotational speed or a rotational speed in a predetermined range increases. The control device in accordance with the eighteenth aspect is configured to control the motor so as to increase the rotational speed of the motor as the difference of the first rotational speed, which is calculated in correspondence with the rotational speed of the wheel and the transmission ratio, and the predetermined rotational speed or the rotational speed in the predetermined range increases. This changes the transmission ratio in a preferred manner.

In accordance with a nineteenth aspect of the present disclosure, the control device according to the seventeenth or eighteenth aspect is configured so that the state of the human-powered vehicle includes a change in a vehicle speed of the human-powered vehicle or a change in the rotational speed of the wheel. The electronic controller is configured to control the motor so as to increase at least one of a rotational angle of the motor and an output torque as an acceleration or a deceleration of the human-powered vehicle increases in a traveling direction or an acceleration or a deceleration of the rotational speed of the wheel increases in a rotational direction corresponding to the traveling direction of the human-powered vehicle. The control device in accordance with the nineteenth aspect is configured to control the motor so as to increase at least one of the rotational angle of the motor and the output torque as the acceleration or deceleration of the human-powered vehicle increases in the traveling direction or the acceleration or deceleration of the rotational speed of the wheel increases in the rotational direction corresponding to the traveling direction of the human-powered vehicle. This changes the transmission ratio in a preferred manner.

A control device in accordance with a twentieth aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, and a motor configured to drive the transmission body. The control device comprises an electronic controller configured to control the motor. The electronic controller is configured to drive the transmission body with the motor in a case where the derailleur is actuated to change the transmission ratio and a predetermined condition related to pedaling is satisfied. The electronic controller is configured to stop driving the transmission body with the motor in correspondence with load on the motor. The control device in accordance with the twentieth aspect is configured to control the motor and drive the transmission body with the motor upon determining the derailleur has been actuated to change the transmission ratio and the predetermined condition related to pedaling is satisfied. This changes the transmission ratio in a preferred manner. The control device in accordance with the twentieth aspect controls the motor and stops driving the transmission body with the motor in correspondence with the load on the motor in a case where the derailleur is actuated to change the transmission ratio and the predetermined condition related to pedaling is satisfied.

A control device in accordance with a twenty-first aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, and a motor configured to drive the transmission body. The control device comprises an electronic controller configured to control the motor and drive the transmission body with the motor so as to change a rotational speed of the motor in correspondence with acceleration of the human-powered vehicle in a traveling direction and increase the rotational speed of the motor as the acceleration of the human-powered vehicle increases upon determining the derailleur has been actuated to change the transmission ratio and a predetermined condition related to pedaling is satisfied. The control device in accordance with the twenty-first aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the twenty-first aspect is configured to control the motor and drive the transmission body with the motor to increase the rotational speed of the motor as the acceleration of the human-powered vehicle increases. This changes the transmission ratio in a preferred manner.

A control device in accordance with a twenty-second aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, a motor configured to drive the transmission body, and a first operating device. The control device comprises an electronic controller configured to control the motor and drive the transmission body with the motor upon determining the derailleur has been actuated to change the transmission ratio and a predetermined condition related to pedaling is satisfied. The electronic controller is configured to control the motor so as not to drive the transmission body if the first operating device is operated even upon determining the derailleur has been actuated to change the transmission ratio and the predetermined condition related to pedaling is satisfied. The control device in accordance with the twenty-second aspect is configured to control the motor and drive the transmission body with the motor upon determining the derailleur has been actuated to change the transmission ratio and the predetermined condition related to pedaling is satisfied. This changes the transmission ratio in a preferred manner. The control device in accordance with the twenty-second aspect is configured to control the motor so as not to drive the transmission body if the first operating device is operated even upon determining the derailleur has been actuated to change the transmission ratio and the predetermined condition related to pedaling is satisfied. This allows the user to select whether to drive the transmission body with the motor to perform shifting.

In accordance with a twenty-third aspect of the present disclosure, in the control device according to the twenty-second aspect, the electronic controller is configured to control the motor so as not to drive the transmission body during at least one of a period during which the first operating device is being operated and a predetermined period after the first operating device is operated even upon determining the derailleur has been actuated to change the transmission ratio and the predetermined condition related to pedaling is satisfied. The control device in accordance with the twenty-third aspect controls the motor so as not to drive the transmission body during at least one of the period during which the first operating device is being operated and the predetermined period after the first operating device is operated even upon determining the derailleur has been actuated to change the transmission ratio and the predetermined condition related to pedaling is satisfied. With the control device in accordance with the twenty-third aspect, in a case where the user wants to reduce changes in the transmission ratio, changes in the transmission ratio are easily reduced by operating the first operating device.

In accordance with a twenty-fourth aspect of the present disclosure, in the control device according to the twenty-second or twenty-third aspect, the electronic controller is configured to control the motor so as not to drive the transmission body if a first operating portion included in the first operating device is operated or a predetermined operation is performed on the first operating portion even upon determining the derailleur has been actuated to change the transmission ratio and the predetermined condition related to pedaling is satisfied. The control device in accordance with the twenty-fourth aspect controls the motor so as not to drive the transmission body if the first operating portion of the first operating device is operated or the predetermined operation is performed on the first operating portion even upon determining the derailleur has been actuated to change the transmission ratio and the predetermined condition related to pedaling is satisfied. With the control device in accordance with the twenty-fourth aspect, in a case where the user wants to reduce changes in the transmission ratio, changes in the transmission ratio are easily reduced by operating the first operating device.

A control device in accordance with a twenty-fifth aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, and a motor configured to drive the transmission body. The control device comprises an electronic controller configured to control the motor to drive the transmission body with the motor upon determining the derailleur has been actuated to change the transmission ratio and a predetermined condition related to pedaling is satisfied, and is configured to control the motor so as to stop driving the transmission body upon determining a vehicle speed of the human-powered vehicle is less than or equal to a first speed or a rotational speed of the wheel is less than or equal to predetermined rotational speed. The control device in accordance with the twenty-fifth aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the twenty-fifth aspect controls the motor to stop driving the transmission body in a case where the vehicle speed of the human-powered vehicle is less than or equal to the first speed or the rotational speed of the wheel is less than or equal to the predetermined rotational speed. The control device in accordance with the twenty-fifth aspect restricts shifting in a case where the vehicle speed of the human-powered vehicle is low.

In accordance with a twenty-sixth aspect of the present disclosure, in the control device according to the twenty-fifth aspect, the electronic controller is configured to control the electric actuator and drive the transmission body with the motor so that the transmission ratio is changed only in one of an increasing direction and a decreasing direction upon determining the derailleur has been actuated to change the transmission ratio and a predetermined condition related to pedaling is satisfied. With the control device in accordance with the twenty-sixth aspect, the transmission ratio is changed only in one of an increasing direction and a decreasing direction in a case where the predetermined condition related to pedaling is satisfied. This reduces the processing load on the electronic controller.

A control device in accordance with a twenty-seventh aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, a motor configured to drive the transmission body, and an electric actuator configured to operate the derailleur. The control device comprises an electronic controller configured to control the electric actuator and the motor. The electronic controller is configured to control the electric actuator and drive the transmission body with the motor so that the transmission ratio is changed only in one of an increasing direction and a decreasing direction upon determining the derailleur has been actuated to change the transmission ratio and a predetermined condition related to pedaling is satisfied. The control device in accordance with the twenty-seventh aspect is configured to control the motor and drive the transmission body with the motor in a case where the derailleur is actuated to change the transmission ratio and the predetermined condition related to pedaling is satisfied. This changes the transmission ratio in a preferred manner. Further, with the control device in accordance with the twenty-seventh aspect, the transmission ratio is changed only in one of the increasing direction and the decreasing direction in a case where the predetermined condition related to pedaling is satisfied. This reduces the processing load on the electronic controller.

In accordance with a twenty-eight aspect of the present disclosure, in the control device according to the twenty-sixth or twenty-seventh aspect, the electronic controller is configured to control the electric actuator and drive the transmission body with the motor so that the transmission ratio is changed in a predetermined shifting range upon determining the derailleur has been actuated to change the transmission ratio and the predetermined condition related to pedaling is satisfied. With the control device in accordance with the twenty-eight aspect, the transmission ratio is changed in a suitable shifting range in a case where the predetermined condition related to pedaling is satisfied.

A control device in accordance with a twenty-ninth aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, a motor configured to drive the transmission body, and an electric actuator configured to operate the derailleur. The control device comprises an electronic controller configured to control the electric actuator and the motor. The electronic controller is configured to control the electric actuator and drive the transmission body with the motor so that the transmission ratio is changed in a predetermined shifting range upon determining the derailleur has been actuated to change the transmission ratio and a predetermined condition related to pedaling is satisfied. The control device in accordance with the twenty-ninth aspect is configured to control the motor and drive the transmission body with the motor in a case where the derailleur is actuated to change the transmission ratio and the predetermined condition related to pedaling is satisfied. This changes the transmission ratio in a preferred manner. With the control device in accordance with the twenty-ninth aspect, the transmission ratio is changed in a suitable shifting range in a case where the predetermined condition related to pedaling is satisfied.

In accordance with a thirtieth aspect of the present disclosure, the control device according to the twenty-eight or twenty-ninth aspect is configured so that the predetermined shifting range includes a range that is less than or equal to a predetermined third transmission ratio, and the predetermined third transmission ratio is less than a maximum one of the transmission ratio that is changeable by the derailleur. The control device in accordance with the thirtieth aspect reduces changes of the transmission ratio to the maximum one of the transmission ratio, which is changeable by the derailleur, in a case where the predetermined condition related to pedaling is satisfied. This limits excessive increases in the burden on the user.

In accordance with a thirty-first aspect of the present disclosure, in the control device according to the twenty-sixth aspect, the electronic controller is configured to control the electric actuator and drive the transmission body with the motor so that the transmission ratio is changed in a predetermined shifting range in at least one of a case where the derailleur is actuated to change the transmission ratio, the predetermined condition related to pedaling is satisfied, and a road on which the human-powered vehicle travels changes from an uphill to a downhill, and a case where the derailleur is actuated to change the transmission ratio, the predetermined condition related to pedaling is satisfied, and a vehicle speed of the human-powered vehicle changes from an increasing state to a decreasing state. With the control device in accordance with the thirty-first aspect, the transmission ratio is suitably changed in at least one of a case where the road on which the human-powered vehicle travels changes from an uphill to a downhill and a case where the vehicle speed of the human-powered vehicle changes from an increasing state to a decreasing state.

In accordance with a thirty-second aspect of the present disclosure, the control device according to any one of the twenty-eight to thirty-first aspects is configured so that the predetermined shifting range includes a range that is greater than or equal to a predetermined fourth transmission ratio, and the predetermined fourth transmission ratio is greater than a minimum one of the transmission ratio that is changeable by the derailleur. The control device in accordance with the thirty-second aspect reduces changes of the transmission ratio to the minimum one of the transmission ratio, which is changeable by the derailleur, in a case where the predetermined condition related to pedaling is satisfied. This limits excessive increases in the rotational speed of the crank, which is rotated by the user.

In accordance with a thirty-third aspect of the present disclosure, in the control device according to the thirty-second aspect, the electronic controller is configured to control the electric actuator and drive the transmission body with the motor so that the transmission ratio is changed in the predetermined shifting range in at least one of a case where the derailleur is actuated to change the transmission ratio, the predetermined condition related to pedaling is satisfied, and a vehicle speed of the human-powered vehicle is less than or equal to a sixth speed, and a case where the derailleur is actuated to change the transmission ratio, the predetermined condition related to pedaling is satisfied, and the rotational speed of the crank axle of the human-powered vehicle is less than or equal to a third rotational speed. With the control device in accordance with the thirty-third aspect, the transmission ratio is suitably changed in at least one of a case where the vehicle speed of the human-powered vehicle is less than or equal to the sixth speed, and a case where the rotational speed of the crank axle of the human-powered vehicle is less than or equal to the third rotational speed.

A control device in accordance with a thirty-fourth aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, a motor configured to drive the transmission body, and an electric actuator configured to operate the derailleur. The control device comprises an electronic controller configured to control the electric actuator and the motor. The electronic controller is configured to be switchable between a first shifting mode, in which the electronic controller controls the electric actuator in accordance with a state of the human-powered vehicle, and a second shifting mode, in which the electronic controller controls the electric actuator in accordance with operation of a transmission operating device provided on the human-powered vehicle. The electronic controller is configured to be switchable between a third mode and a fourth mode in the first shifting mode. In the third mode, the electronic controller is configured to control the motor and drive the transmission body in accordance with the state of the human-powered vehicle upon determining the derailleur has been actuated to change the transmission ratio and a predetermined condition related to pedaling is satisfied. In the fourth mode, the electronic controller is configured to control the motor so as not to drive the transmission body even upon determining the derailleur has been actuated to change the transmission ratio and the predetermined condition related to pedaling is satisfied. The control device in accordance with the thirty-fourth aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the thirty-fourth aspect allows the user in the first shifting mode to switch between the third mode in which the transmission body is automatically driven and the fourth mode in which the transmission body is driven by the user.

A control device in accordance with a thirty-fifth aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, an electric actuator configured to operate the derailleur, and a motor configured to drive the transmission body. The control device comprises an electronic controller configured to control the electric actuator and the motor so that a first rotational speed calculated in correspondence with the rotational speed of the wheel and the transmission ratio is included in a predetermined range. The electronic controller is configured to drive the transmission body with the motor upon determining the derailleur has been actuated to change the transmission ratio and a predetermined condition related to pedaling is satisfied. The electronic controller is configured to control the electric actuator so that among a plurality of shift stages of the derailleur, the transmission ratio is set to be in the largest shift stage upon determining the first rotational speed is included in the predetermined range. The control device in accordance with the thirty-fifth aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the thirty-fifth aspect controls the electric actuator so that among a plurality of shift stages of the derailleur, the transmission ratio is set to be in the largest shift stage in a case where the first rotational speed is included in the predetermined range. The control device in accordance with the thirty-fifth aspect optimally changes the shift stage in accordance with the vehicle speed of the human-powered vehicle.

In accordance with a thirty-sixth aspect of the present disclosure, in the control device according to any one of the twenty-sixth to thirty-fifth aspects, the electronic controller is configured to control the motor and drive the transmission body with the motor upon determining the derailleur has been actuated to change the transmission ratio and the predetermined condition related to pedaling is satisfied. The electronic controller is configured to control the electric actuator so that the transmission ratio does not increase upon determining a vehicle speed of the human-powered vehicle is greater than or equal to a second speed or the rotational speed of the wheel is greater than or equal to a predetermined rotational speed. The control device in accordance with the thirty-sixth aspect restricts an increase in the transmission ratio in a case where the vehicle speed of the human-powered vehicle is greater than or equal to the second speed or the rotational speed of the wheel is greater than or equal to the predetermined rotational speed. The control device in accordance with the thirty-sixth aspect limits excessive increases in the vehicle speed of the human-powered vehicle.

A control device in accordance with a thirty-seventh-first aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, an electric actuator configured to operate the derailleur, and a motor configured to drive the transmission body. The control device comprises an electronic controller configured to control the electric actuator and the motor. The electronic controller is configured to control the motor and drive the transmission body with the motor upon determining the derailleur has been actuated to change the transmission ratio and a predetermined condition related to pedaling is satisfied. The electronic controller is configured to control the electric actuator so that the transmission ratio does not increase upon determining a vehicle speed of the human-powered vehicle is greater than or equal to a second speed or the rotational speed of the wheel is greater than or equal to a predetermined rotational speed. The control device in accordance with the thirty-seventh aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the thirty-seventh aspect restricts an increase in the transmission ratio in a case where the vehicle speed of the human-powered vehicle is greater than or equal to the second speed or the rotational speed of the wheel is greater than or equal to the predetermined rotational speed. The control device in accordance with the thirty-seventh aspect limits excessive increases in the vehicle speed of the human-powered vehicle.

In accordance with a thirty-eighth aspect of the present disclosure, in the control device according to any one of the thirty-fifth to thirty-seventh aspects, the electronic controller is configured to control the electric actuator so as not to change the transmission ratio until a first condition related to shifting is satisfied upon determining the derailleur has been actuated. The control device in accordance with the thirty-eighth aspect controls the electric actuator so as not to change the transmission ratio until the first condition related to shifting is satisfied in a case where the derailleur is actuated. The control device in accordance with the thirty-eighth aspect restricts continuous actuation of the derailleur.

A control device in accordance with a thirty-ninth aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, an electric actuator configured to actuate the derailleur, and a motor configured to drive the transmission body. The control device comprises an electronic controller configured to control the motor and the electric actuator. The electronic controller is configured to control the motor and drive the transmission body upon determining the derailleur has been actuated with the electric actuator to change the transmission ratio and a predetermined condition related to pedaling is satisfied. The electronic controller is configured to control the electric actuator so as not to change the transmission ratio until a first condition related to shifting is satisfied upon determining the derailleur has been actuated. The control device in accordance with the thirty-ninth aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the thirty-ninth aspect controls the electric actuator so as not to change the transmission ratio until the first condition related to shifting is satisfied in a case where the vehicle speed of the human-powered vehicle is greater than or equal to the second speed or the rotational speed of the wheel is greater than or equal to the predetermined rotational speed. The control device in accordance with the thirty-ninth aspect restricts continuous actuation of the derailleur in a case where the vehicle speed of the human-powered vehicle is greater than or equal to the second speed or the rotational speed of the wheel is greater than or equal to the predetermined rotational speed.

In accordance with a fortieth aspect of the present disclosure, the control device according to the thirty-eighth or thirty-ninth aspect is configured so that the human-powered vehicle further includes a second operating device configured to operate the derailleur. The first condition related to shifting is satisfied in at least one of a case where a predetermined first time elapses from a time of operating the second operating device, a case where a predetermined second time elapses from a time of stopping the electric actuator, a case where an inclination angle of the human-powered vehicle becomes greater than or equal to a first angle, and a case where a vehicle speed of the human-powered vehicle becomes greater than or equal to a predetermined third speed. The control device in accordance with the fortieth aspect controls the electric actuator so as not to change the transmission ratio in at least one of a case where the predetermined first time elapses from the time of operating the second operating device, a case where the predetermined second time elapses from the time of stopping the electric actuator, a case where the inclination angle of the human-powered vehicle becomes greater than or equal to the first angle, and a case where the vehicle speed of the human-powered vehicle becomes greater than or equal to the predetermined third speed.

In accordance with a forty-first aspect of the present disclosure, in the control device according to any one of the twenty-sixth to thirty-ninth aspects, the electronic controller is configured to control the electric actuator so as not to change the transmission ratio with the derailleur until a second condition related to shifting is satisfied upon determining the electric actuator and the motor are controlled to increase or decrease the transmission ratio a predetermined number of times or more within a predetermined third time. The control device in accordance with the forty-first aspect controls the electric actuator so as not to change the transmission ratio with the derailleur until the second condition related to shifting is satisfied in a case where the electric actuator and the motor are controlled to increase or decrease the transmission ratio a predetermined number of times or more within the predetermined third time. The control device in accordance with the forty-first aspect reduces frequent changes in the transmission ratio.

A control device in accordance with a forty-second aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, an electric actuator configured to actuate the derailleur, and a motor that drives the transmission body. The control device comprises an electronic controller configured to control the electric actuator and the motor. The electronic controller is configured to control the motor and drive the transmission body upon determining the derailleur has been actuated with the electric actuator to change the transmission ratio and a predetermined condition related to pedaling is satisfied. The electronic controller is configured to control the electric actuator so as not to change the transmission ratio with the derailleur until a second condition related to shifting is satisfied upon determining the electric actuator and the motor are controlled to increase or decrease the transmission ratio a predetermined number of times or more within a predetermined third time. The control device in accordance with the forty-second aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the forty-second aspect controls the electric actuator so as not to change the transmission ratio with the derailleur until the second condition related to shifting is satisfied in a case where the electric actuator and the motor are controlled to increase or decrease the transmission ratio a predetermined number of times or more within the predetermined third time. The control device in accordance with the forty-second aspect reduces frequent changes in the transmission ratio.

In accordance with a forty-third aspect of the present disclosure, the control device according to the forty-first or forty-second aspect is configured so that the second condition related to shifting is satisfied in at least one of a case where a predetermined fourth time elapses from a time of stopping the electric actuator, a case where an inclination angle of the human-powered vehicle becomes greater than or equal to a second angle, and a case where a vehicle speed of the human-powered vehicle becomes greater than or equal to a predetermined fourth speed. The control device in accordance with the forty-third aspect controls the electric actuator so as not to change the transmission ratio with the derailleur until at least one of a case where the predetermined fourth time elapses from the time of stopping the electric actuator, a case where the inclination angle of the human-powered vehicle becomes greater than or equal to the second angle, and a case where the vehicle speed of the human-powered vehicle becomes greater than or equal to the predetermined fourth speed is satisfied.

A control device in accordance with a forty-fourth aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, an electric actuator configured to actuate the derailleur, and a motor configured to drive the transmission body. The control device comprises an electronic controller configured to control the electric actuator and the motor. The electronic controller is configured to control the electric actuator and the motor so that relative movement of the derailleur and at least one of the first rotational body and the second rotational body is started simultaneously as the motor is driven or before the motor is driven upon determining the electric actuator and the motor are controlled to change the transmission ratio and a predetermined condition related to pedaling is satisfied. The control device in accordance with the forty-fourth aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the forty-fourth aspect controls the motor and the electric actuator so that relative movement of the derailleur and at least one of the first rotational body and the second rotational body is started simultaneously as the motor is driven or before the motor is driven. This changes the transmission ratio in a preferred manner.

In accordance with a forty-fifth aspect of the present disclosure, in the control device according to the forty-fourth aspect, the electronic controller is configured to receive a signal for adjusting a position of the derailleur. The electronic controller is configured to drive the motor in a case where the signal is received. The electronic controller is configured to control the electric actuator so that the position of the derailleur corresponds to the first transmission ratio upon determining a first transmission ratio corresponding to a rotational speed of the motor and a rotational speed of the wheel does not correspond to the present position of the derailleur. The control device in accordance with the forty-fifth aspect drives the motor in a case where the signal for adjusting the position of the derailleur is received and the first transmission ratio corresponding to the rotational speed of the motor and the rotational speed of the wheel does not correspond to the present position of the derailleur. This changes the transmission ratio in a preferred manner.

A control device in accordance with a forty-sixth aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, a motor configured to drive the transmission body, and an electric actuator configured to operate the derailleur. The control device comprises an electronic controller configured to control the electric actuator and the motor. The electronic controller is configured to control the motor and drive the transmission body with the motor upon determining the derailleur has been actuated to change the transmission ratio and a predetermined condition related to pedaling is satisfied. The electronic controller is configured to control the electric actuator so that a shift stage of the derailleur approaches a predetermined shift stage or the transmission ratio approaches a predetermined transmission ratio upon determining the human-powered vehicle has decelerated. The electronic controller is configured to control the electric actuator and change the shift stage of the derailleur one stage at a time upon determining a difference of the predetermined shift stage and a present shift stage of the derailleur or a difference of the predetermined transmission ratio and the present transmission ratio is less than or equal to a predetermined value. The electronic controller is configured to control the electric actuator so as to continuously actuate the derailleur over a plurality of shift stages upon determining a difference of the predetermined shift stage and a present shift stage of the derailleur or a difference of the predetermined transmission ratio and the present transmission ratio exceeds the predetermined value. The control device in accordance with the forty-sixth aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the forty-sixth aspect controls the electric actuator so as to continuously actuate the derailleur over a plurality of shift stages in a case where the human-powered vehicle is decelerated and the difference of the predetermined shift stage and the present shift stage of the derailleur or the difference of the predetermined transmission ratio and the present transmission ratio exceeds the predetermined value. The control device in accordance with the forty-sixth aspect reduces the time for changing the present shift stage to a preferred shift stage or the time for changing the present transmission ratio to a preferred transmission ratio.

In accordance with a forty-seventh aspect of the present disclosure, in the control device according to any one of the twenty-sixth to forty-sixth aspects, the electronic controller is configured to control the motor and drive the transmission body with the motor upon determining the derailleur has been actuated to change the transmission ratio and the predetermined condition related to pedaling is satisfied. The electronic controller is configured to control the electric actuator so that a fifth time during which the derailleur is actuated over a plurality of shift stages in a case where a vehicle speed of the human-powered vehicle is less than or equal to a fifth speed becomes shorter than a sixth time during which the derailleur is actuated over the plurality of shift stages in a case where the vehicle speed of the human-powered vehicle exceeds the predetermined fifth speed. The control device in accordance with the forty-seventh aspect controls the electric actuator so that in a case where the derailleur is actuated over a plurality of shift stages and the vehicle speed of the human-powered vehicle is less than or equal to the fifth speed, actuation of the derailleur is completed in a shorter time than in a case where the vehicle speed of the human-powered vehicle exceeds the predetermined fifth speed. The control device in accordance with the forty-seventh aspect facilitates completion of shifting before the human-powered vehicle stops.

A control device in accordance with a forty-eighth aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle, a motor configured to drive the transmission body, and an electric actuator configured to operate the derailleur. The control device comprises an electronic controller configured to control the electric actuator and the motor. The electronic controller is configured to control the motor and drive the transmission body with the motor upon determining the derailleur has been actuated to change the transmission ratio and a predetermined condition related to pedaling is satisfied. The electronic controller is configured to control the electric actuator so that a fifth time during which the derailleur is actuated over a plurality of shift stages in a case where a vehicle speed of the human-powered vehicle is less than or equal to a fifth speed becomes shorter than a sixth time during which the derailleur is actuated over the plurality of shift stages in a case where the vehicle speed of the human-powered vehicle exceeds the predetermined fifth speed. The control device in accordance with the forty-eighth aspect is configured to control the motor and drive the transmission body with the motor in a case where the derailleur is actuated to change the transmission ratio and the predetermined condition related to pedaling is satisfied. This changes the transmission ratio in a preferred manner. The control device in accordance with the forty-eighth aspect controls the electric actuator so that in a case where the derailleur is actuated over a plurality of shift stages and the vehicle speed of the human-powered vehicle is less than or equal to the fifth speed, actuation of the derailleur is completed in a shorter time than in a case where the vehicle speed of the human-powered vehicle exceeds the predetermined fifth speed. The control device in accordance with the forty-eighth aspect facilitates completion of shifting before the human-powered vehicle stops.

A control device in accordance with a forty-ninth aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, a derailleur configured to operate the transmission body to change a transmission ratio of a rotational speed of the wheel to a rotational speed of the crank axle and including a plurality of shift positions, an electric actuator configured to actuate the derailleur, and a motor configured to drive the transmission body. The control device comprises an electronic controller configured to control the electric actuator and the motor and receive a signal for adjusting the position of the derailleur. The electronic controller is configured to control the motor so as to drive the motor in a case where the signal is received. The electronic controller is configured to control the electric actuator so that a position of the derailleur corresponds to a first transmission ratio corresponding to a rotational speed of the motor and the rotational speed of the wheel upon determining the first transmission ratio does not correspond to a present position of the derailleur. The control device in accordance with the forty-ninth aspect drives the motor in a case where a signal for adjusting the position of the derailleur is received, and drives the derailleur with the electric actuator so that in a case where the first transmission ratio corresponding to the rotational speed of the motor and the rotational speed of the wheel does not correspond to the present position of the derailleur, the present position of the derailleur corresponds to correspond to the first transmission ratio.

In accordance with a fiftieth aspect of the present disclosure, the control device according to the forty-ninth aspect further comprises a power storage device configured to store electric power generated by the motor. The electronic controller is configured to control the motor with the electric power of the power storage device. The power transmission system in accordance with the forty-ninth aspect controls the motor using electric power of the power storage device configured to store electric power generated by the motor. The power transmission system in accordance with the fiftieth aspect reduces the frequency of charging the power storage device.

A power transmission system in accordance with a fifty-first aspect of the present disclosure is for a human-powered vehicle. The human-powered vehicle includes a crank axle, a first rotational body connected to the crank axle, a wheel, a second rotational body connected to the wheel, a transmission body engaged with the first rotational body and the second rotational body and configured to transmit driving force between the first rotational body and the second rotational body, and a derailleur configured to operate the transmission body to change a transmission ratio of a rotational speed of the wheel to a rotational speed of the crank axle. The power transmission system comprises a motor configured to drive the transmission body and generate electric power by being driven by the transmission body, a power storage device configured to store the electric power generated by the motor, and a control device for the human-powered vehicle, wherein the control device includes an electronic controller configured to control the motor with the electric power of the power storage device, and the electronic controller is configured to control the motor and drive the transmission body upon determining the derailleur has been actuated to change the transmission ratio and a predetermined condition related to pedaling is satisfied. The power transmission system in accordance with the fifty-first aspect is configured to control the motor and drive the transmission body with the motor in a case where the derailleur is actuated to change the transmission ratio and the predetermined condition related to pedaling is satisfied. This changes the transmission ratio in a preferred manner. The power transmission system in accordance with the fiftieth aspect controls the motor using electric power of the power storage device configured to store electric power generated by the motor. The power transmission system in accordance with the fifty-first aspect reduces the frequency of charging the power storage device.

In accordance with a fifty-second aspect of the present disclosure, the power transmission system according to the fifty-first aspect is configured so that the human-powered vehicle further includes an electric actuator configured to actuate the derailleur. The electronic controller is configured to control the electric actuator with the electric power of the power storage device. The power transmission system in accordance with the fifty-second aspect controls the electric actuator using electric power of the power storage device configured to store electric power generated by the motor.

In accordance with a fifty-third aspect of the present disclosure, the power transmission system according to the fiftieth or fifty-first aspect further comprises a first one-way clutch provided in a first power transmission path between the crank axle and the first rotational body and configured to transmit rotational force from the crank axle to the first rotational body in a first rotational direction and restrict transmission of rotational force from the first rotational body to the crank axle in the first rotational direction. The power transmission system in accordance with the fifty-third aspect restricts transmission of rotational force of the first rotational body to the crank axle with the first one-way clutch in a case where the first rotational body is rotated by the motor. This changes the transmission ratio in a preferred manner in a case where the motor is driven to change the transmission ratio.

The control device for a human-powered vehicle and the power transmission system of the present disclosure change the transmission ratio in a preferred manner.

BRIEF DESCRIPTION OF THE DRAWINGS

Referring now to the attached drawings which form a part of this original disclosure.

DETAILED DESCRIPTION OF EMBODIMENTS

Figure 1:
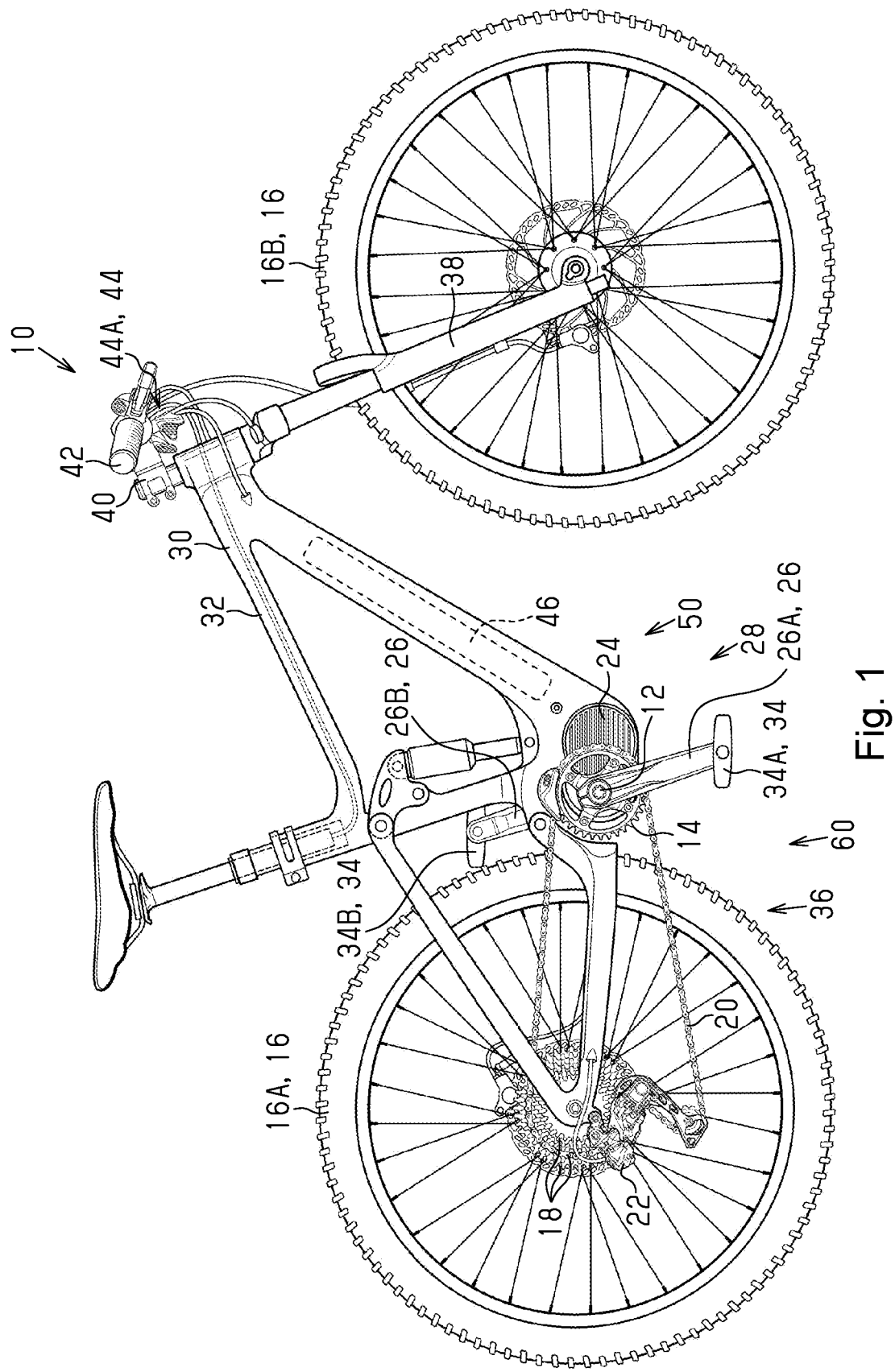
FIG. 1 is a side elevational view of a human-powered vehicle including a control device in accordance with a first embodiment.

Selected embodiments will now be explained with reference to the drawings. It will be apparent to those skilled in the human-powered vehicle field from this disclosure that the following descriptions of the embodiments are provided for illustration only and not for the purpose of limiting the invention as defined by the appended claims and their equivalents.

First Embodiment

A first embodiment of a power transmission system 60 for a human-powered vehicle and a control device 70 for a human-powered vehicle will now be described with reference to FIGS. 1 to 6. A human-powered vehicle 10 is a vehicle including at least one wheel and driven by at least the human driving force H. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a monocycle and a vehicle including three or more wheels. The human-powered vehicle 10 is not limited to a vehicle configured to be driven only by human driving force H. The human-powered vehicle 10 includes an E-bike that uses driving force of a motor in addition to the human driving force H for propulsion. The E-bike includes an electric assist bicycle that assists in propulsion with a motor. In the embodiments described below, the human-powered vehicle 10 refers to an electric assist bicycle.

The human-powered vehicle 10 includes a crank axle 12, a first rotational body 14, a wheel 16, a second rotational body 18, a transmission body 20, a derailleur 22, and a motor 24. The human-powered vehicle 10 further includes two crank arms 26. The crank axle 12 and the crank arms 26 form a crank 28. A human driving force H is input to the crank 28. The human-powered vehicle 10 further includes a vehicle body 30. The wheel 16 includes a rear wheel 16A and a front wheel 16B. The vehicle body 30 includes a frame 32. The crank 28 is rotatable relative to the frame 32. The crank arms 26 include a first crank arm 26A and a second crank arm 26B. The first crank arm 26A is provided on one axial end of the crank axle 12. The second crank arm 26B is provided on the other axial end of the crank axle 12. The human-powered vehicle 10 includes pedals 34. The pedals 34 include a first pedal 34A and a second pedal 34B. The first pedal 34A is coupled to the first crank arm 26A. The second pedal 34B is coupled to the second crank arm 26B. The rear wheel 16A is driven in accordance with rotation of the crank 28. The rear wheel 16A is supported by the frame 32. The crank 28 and the rear wheel 16A are coupled by a drive mechanism 36.

The drive mechanism 36 includes the first rotational body 14, the second rotational body 18, and the transmission body 20. The first rotational body 14 is connected to the crank axle 12. The second rotational body 18 is connected to the wheel 16. The transmission body 20 is engaged with the first rotational body 14 and the second rotational body 18 and is configured to transmit driving force between the first rotational body 14 and the second rotational body 18. The transmission body 20 transmits rotational force of the first rotational body 14 to the second rotational body 18. In the present embodiment, the first rotational body 14 is coaxial with the crank axle 12. However, the first rotational body 14 can be configured not to be coaxial with the crank axle 12. In a case where the first rotational body 14 is not coaxial with the crank axle 12, the first rotational body 14 and the crank axle 12 are connected by a first transmission mechanism including at least one of a gear, a pulley, a chain, a shaft, and a belt. In the present embodiment, the second rotational body 18 is coaxial with the rear wheel 16A. However, the second rotational body 18 can be configured not to be coaxial with the rear wheel 16A. In a case where the second rotational body 18 is not coaxial with the rear wheel 16A, the second rotational body 18 and the rear wheel 16A are connected by a second transmission mechanism including at least one of a gear, a pulley, a chain, a shaft, and a belt.

The front wheel 16B is attached to the frame 32 by a front fork 38. The front fork 38 is coupled to a handlebar 42 by a stem 40. In the present embodiment, the rear wheel 16A is coupled to the crank 28 by the drive mechanism 36. However, at least one of the rear wheel 16A and the front wheel 16B can be coupled to the crank 28 by the drive mechanism 36.

The derailleur 22 is configured to operate the transmission body 20 to change a transmission ratio R of rotational speed NW of the wheel 16 to rotational speed NC of the crank axle 12. The relation of the transmission ratio R, the rotational speed NW, and the rotational speed NC is expressed by equation (1).

$$\text{Transmission Ratio } R = \text{Rotational Speed } NW / \text{Rotational Speed } NC \quad \text{Equation (1):}$$

The derailleur 22 includes, for example, at least one of a front derailleur and a rear derailleur. In a case where the derailleur 22 includes a rear derailleur, the first rotational body 14 includes at least one sprocket, the second rotational body 18 include multiple sprockets, and the transmission body 20 includes a chain. In a case where the derailleur 22 includes a rear derailleur, the derailleur 22 moves the chain from one of the sprockets of the second rotational body 18 to another one of the sprockets that is engaged with the chain. In a case where the derailleur 22 includes a front derailleur, the first rotational body 14 includes multiple sprockets, the second rotational body 18 includes at least one sprocket, and the transmission body 20 includes a chain. In a case where the derailleur 22 includes a front derailleur, the derailleur 22 moves the chain from one of the sprockets of the first rotational body 14 to another one of the sprockets that is engaged with the chain. The derailleur 22 operates the transmission body 20 to change the transmission ratio R by changing the engagement state of the transmission body 20 with at least one of the first rotational body 14 and the second rotational body 18.

The first rotational body 14 and the second rotational body 18 can be provided on a gear box. The gear box is, for example, provided in the vicinity of the crank axle 12. In a case where the first rotational body 14 and the second rotational body 18 are provided on the gear box, at least one of the first rotational body 14 and the second rotational body 18 includes multiple sprockets, and the derailleur 22 is provided on the gear box and is configured to change the engagement state of the transmission body 20 with at least one of the first rotational body 14 and the second rotational body 18.

Preferably, the human-powered vehicle 10 further includes a first operating device 44. The first operating device 44 is provided, for example, on the handlebar 42. The first operating device 44 is configured to be operated by a hand or a finger of a user or the like. The first operating device 44 includes a first operating portion 44A. The first operating device 44 is operated by the user to intentionally prohibit shifting. Preferably, the human-powered vehicle 10 further includes a second operating device 45 configured to operate the derailleur 22. The second operating device 45 is, for example, provided on the handlebar 42. The second operating device 45 is configured to be operated by a hand or a finger of the user of the like. The second operating device 45 includes at least a second operating portion 45A and a third operating portion 45B.

Part of the first operating device 44 and part of the second operating device 45 can be formed integrally with each other as a one-piece member. For example, the first operating portion 44A of the first operating device 44 and the second operating portion 45A and the third operating portion 45B of the second operating device 45 can be provided on the same base member. The first operating portion 44A includes, for example, a button switch or a lever switch. The first operating portion 44A is not limited to a button switch or a lever switch and can have any configuration that changes between at least two states in accordance with operation of the user. The second operating portion 45A and the third operating portion 45B include, for example, a button switch or a lever switch. The second operating portion 45A and the third operating portion 45B are not limited to a button switch or a lever switch and can have any configuration that changes between at least two states in accordance with operation of the user.

The second operating portion 45A and the third operating portion 45B are configured to operate the derailleur 22. The second operating device 45 outputs a shifting operation signal to an electronic controller 72 of the control device 70 in accordance with operation of the user. In addition to or instead of the second operating portion 45A and the third operating portion 45B, the second operating device 45 can include a fourth operating portion 45C configured to operate a human-powered vehicle component that excludes the derailleur 22. The human-powered vehicle component includes, for example, at least one of a cycle computer, a suspension, an adjustable seatpost, a lamp, and a drive unit. The shifting operation signal includes, for example, a first operation signal including an instruction to operate the derailleur 22 to increase the transmission ratio R and a second operation signal including an instruction to operate the derailleur 22 to decrease the transmission ratio R.

The second operating device 45 outputs the first operation signal in a case where the second operating portion 45A is operated, and outputs the second operation signal in a case where the third operating portion 45B is operated. In the present embodiment, the rear derailleur is operated by the second operating portion 45A and the third operating portion 45B. However, the front derailleur can be operated by the second operating portion 45A and the third operating portion 45B. Both the front derailleur and the rear derailleur can be operated by the second operating portion 45A and the third operating portion 45B. In addition to the second operating portion 45A and the third operating portion 45B, the second operating device 45 can further include a fifth operating portion and a sixth operating portion. The fifth operating portion and the sixth operating portion are, for example, configured in the same manner as the second operating portion 45A and the third operating portion 45B. The rear derailleur can be operated by one of the set of the second operating portion 45A and the third operating portion 45B and the set of the fifth operating portion and the sixth operating portion, and the front derailleur can be operated by the other one of the set of the second operating portion 45A and the third operating portion 45B and the set of the fifth operating portion and the sixth operating portion.

Preferably, the human-powered vehicle 10 further includes an electric actuator 48 that is configured to operate the derailleur 22. The electric actuator 48 includes, for example, an electric motor. The electric actuator 48 can further include, for example, a speed reducer coupled to an output shaft of the electric motor. The electric actuator 48 can be provided on the derailleur 22 or can be provided on the human-powered vehicle 10 at a position separate from the derailleur 22. The electric actuator 48 is driven so that the derailleur 22 operates the transmission body 20 to perform a shifting action. The derailleur 22 includes, for example, a base member, a movable member, and a link member that movably couples the movable member to the base member. The movable member includes a guide member that guides a coupling member. The guide member includes, for example, a guide plate and a pulley. The electric actuator 48 can, for example, directly drive the link member. The electric actuator 48 can drive the link member using a cable.

Preferably, the human-powered vehicle 10 further includes a battery 46. The battery 46 includes one or more battery elements. The battery elements include a rechargeable battery. The battery 46 is configured to supply electric power to the control device 70. Preferably, the battery 46 is also configured to supply electric power to the electric actuator 48. Preferably, the battery 46 is connected to the controller 72 of the control device 70 so that wired or wireless communication is performed. The battery 46 is configured to communicate with the controller 72 through, for example, power line communication (PLC), a controller area network (CAN), or a universal asynchronous receiver/transmitter (UART).

The motor 24 is configured to drive the transmission body 20. Preferably, the motor 24 is configured to apply a propulsion force to the human-powered vehicle 10 in accordance with the human driving force H. The motor 24 includes one or more electric motors. The electric motor of the motor 24 is, for example, a brushless motor. The motor 24 is configured to transmit rotational force to a power transmission path of the human driving force H extending from the pedals 34 to the second rotational body 18. In the present embodiment, the motor 24 is provided on the frame 32 of the human-powered vehicle 10, and is configured to transmit rotational force to the first rotational body 14. The human-powered vehicle 10 further includes a housing 52 on which the motor 24 is provided. A drive unit 50 is configured to include the motor 24 and the housing 52. The housing 52 is attached to the frame 32. The housing 52 rotationally supports the crank axle 12. The motor 24 can be configured to transmit rotational force to the transmission body 20, for example, without using the first rotational body 14. In this case, for example, a sprocket configured to engage with the transmission body 20 is provided on the output shaft of the motor 24 or a transmission member to which force of the output shaft is transmitted.

A speed reducer 54 can be provided between the motor 24 and the power transmission path of the human driving force H. The speed reducer 54 is, for example, configured to include gears. Preferably, a third one-way clutch 56 can be provided between the motor 24 and the power transmission path of the human driving force H to restrict transmission of rotational force of the crank 28 to the motor 24 in a case where the crank axle 12 is rotated in a direction in which the human-powered vehicle 10 travels forward. The third one-way clutch 56 includes, for example, at least one of a roller clutch, a sprag-type clutch, and a pawl-type clutch.

The drive unit 50 includes an output portion 58. The output portion 58 is, for example, coupled to the crank axle 12 and the speed reducer 54. The human driving force H and the output of the motor 24 are input to the output portion 58. The first rotational body 14 is coupled to the output portion 58 so as to rotate integrally with the output portion 58.

Preferably, the power transmission system 60 includes the control device 70 and a first one-way clutch 62. The first one-way clutch 62 is provided in a first power transmission path between the crank axle 12 and the first rotational body 14. The first one-way clutch 62 is configured to transmit rotational force from the crank axle 12 to the first rotational body 14 in a first rotational direction, and restrict transmission of rotational force from the first rotational body 14 to the crank axle 12 in the first rotational direction. The first one-way clutch 62 is configured to rotate the first rotational body 14 forward in a case where the crank 28 rotates forward, and allow relative rotation of the crank 28 and the first rotational body 14 in a case where the crank 28 rotates rearward. The first one-way clutch 62 is provided, for example, on the housing 52 of the drive unit 50. The first one-way clutch 62 is provided, for example, between the crank axle 12 and the output portion 58. The first one-way clutch 62 includes, for example, at least one of a roller clutch, a sprag-type clutch, and a pawl-type clutch.

The crank axle 12 and the first rotational body 14 can be coupled so as to rotate integrally with each other. In a case where the crank axle 12 and the first rotational body 14 are coupled so as to rotate integrally with each other, the first one-way clutch 62 is omitted.

Preferably, the power transmission system 60 further includes a second one-way clutch 64. The second one-way clutch 64 is provided in a second power transmission path between the second rotational body 18 and the wheel 16. The second one-way clutch 64 is configured to transmit rotational force from the second rotational body 18 to the wheel 16 in a second rotational direction corresponding to the first rotational direction, and restrict transmission of rotational force from the wheel 16 to the second rotational body 18 in the second rotational direction. The second one-way clutch 64 is configured to rotate the rear wheel 16A forward in a case where the second rotational body 18 rotates forward, and allow relative rotation of the second rotational body 18 and the rear wheel 16A in a case where the second rotational body 18 rotates rearward. The second one-way clutch 64 is provided, for example, on a hub axle of the rear wheel 16A. The second one-way clutch 64 includes, for example, at least one of a roller clutch, a sprag-type clutch, and a pawl-type clutch.

The second rotational body 18 and the rear wheel 16A can be coupled so as to rotate integrally with each other. In a case where the second rotational body 18 and the rear wheel 16A are coupled so as to rotate integrally with each other, the second one-way clutch 64 is omitted.

Preferably, the power transmission system 60 further includes a power storage device 66. The power storage device 66 is configured to store electric power generated by the motor 24. Preferably, the controller 72 is configured to control the motor 24 using electric power of the power storage device 66. The power storage device 66 can include the battery 46, can include a battery different from the battery 46, or can include a capacitor. The power storage device 66 is provided, for example, on the housing 52 of the drive unit 50.

Figure 2:
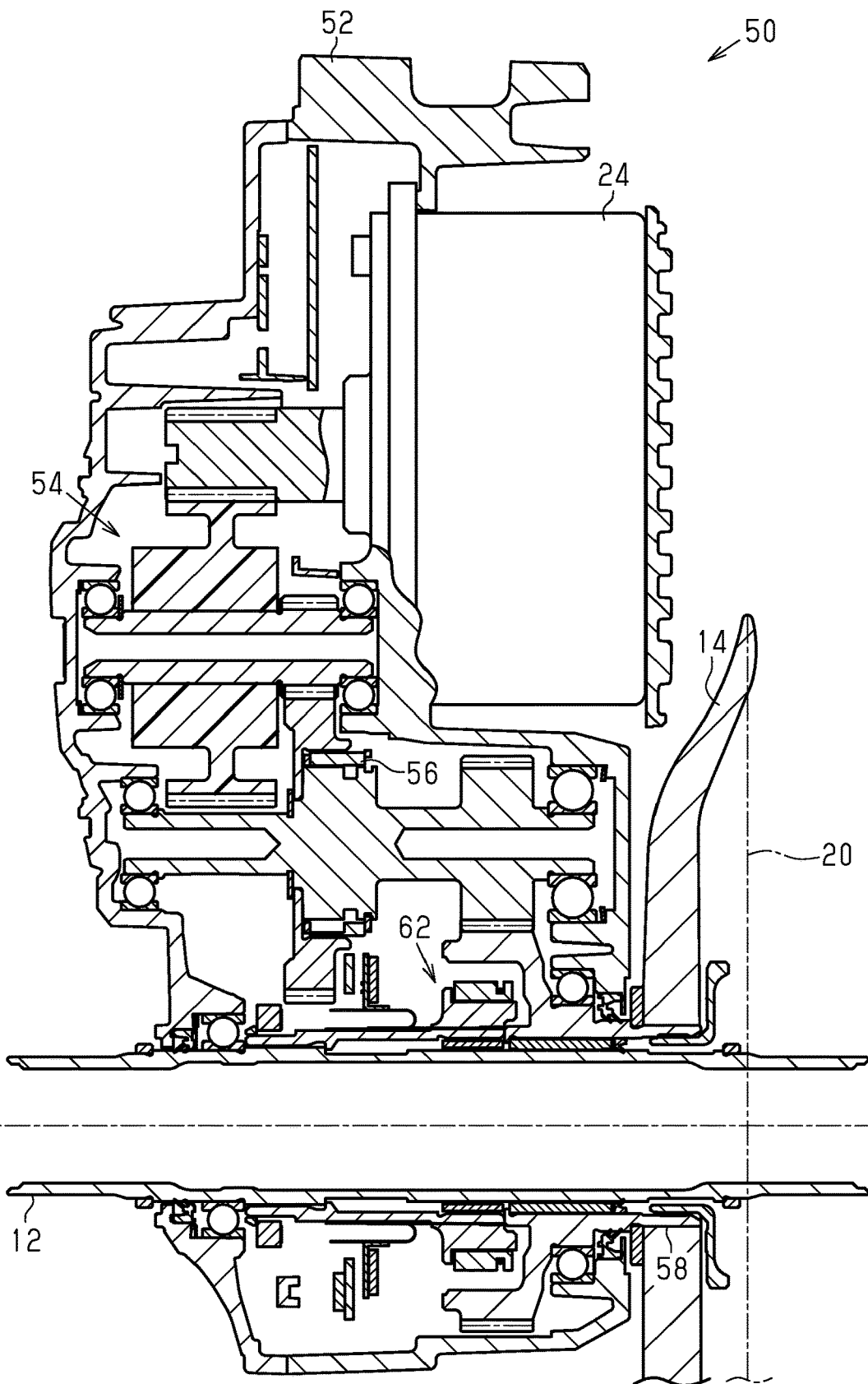
FIG. 2 is a cross-sectional view of a drive unit included in the human-powered vehicle shown in FIG. 1.
Figure 3:
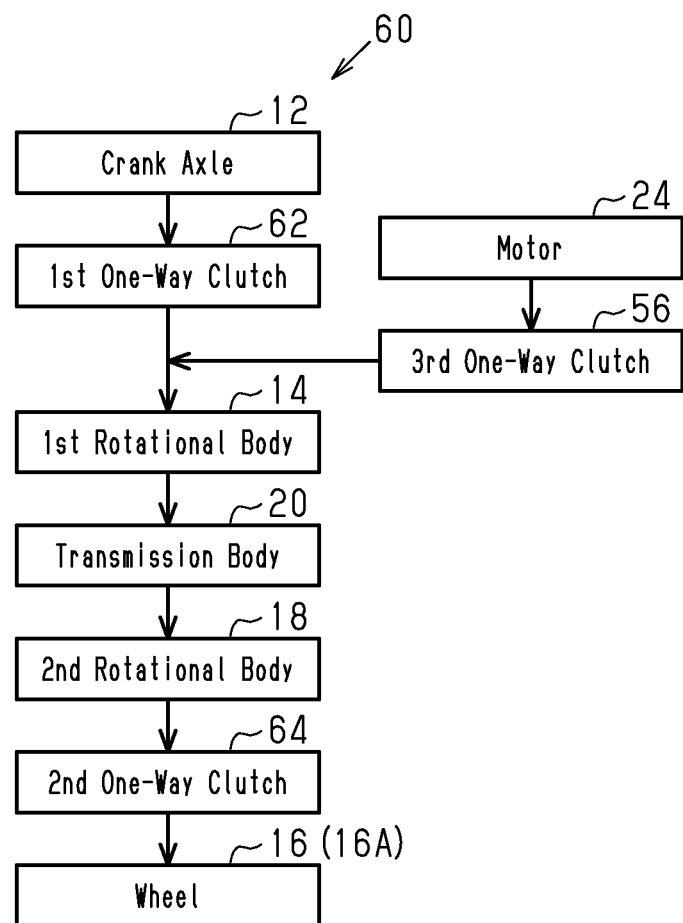
FIG. 3 is a diagram showing a power transmission path of a power transmission system of the human-powered vehicle shown in FIG. 1.
Figure 4:
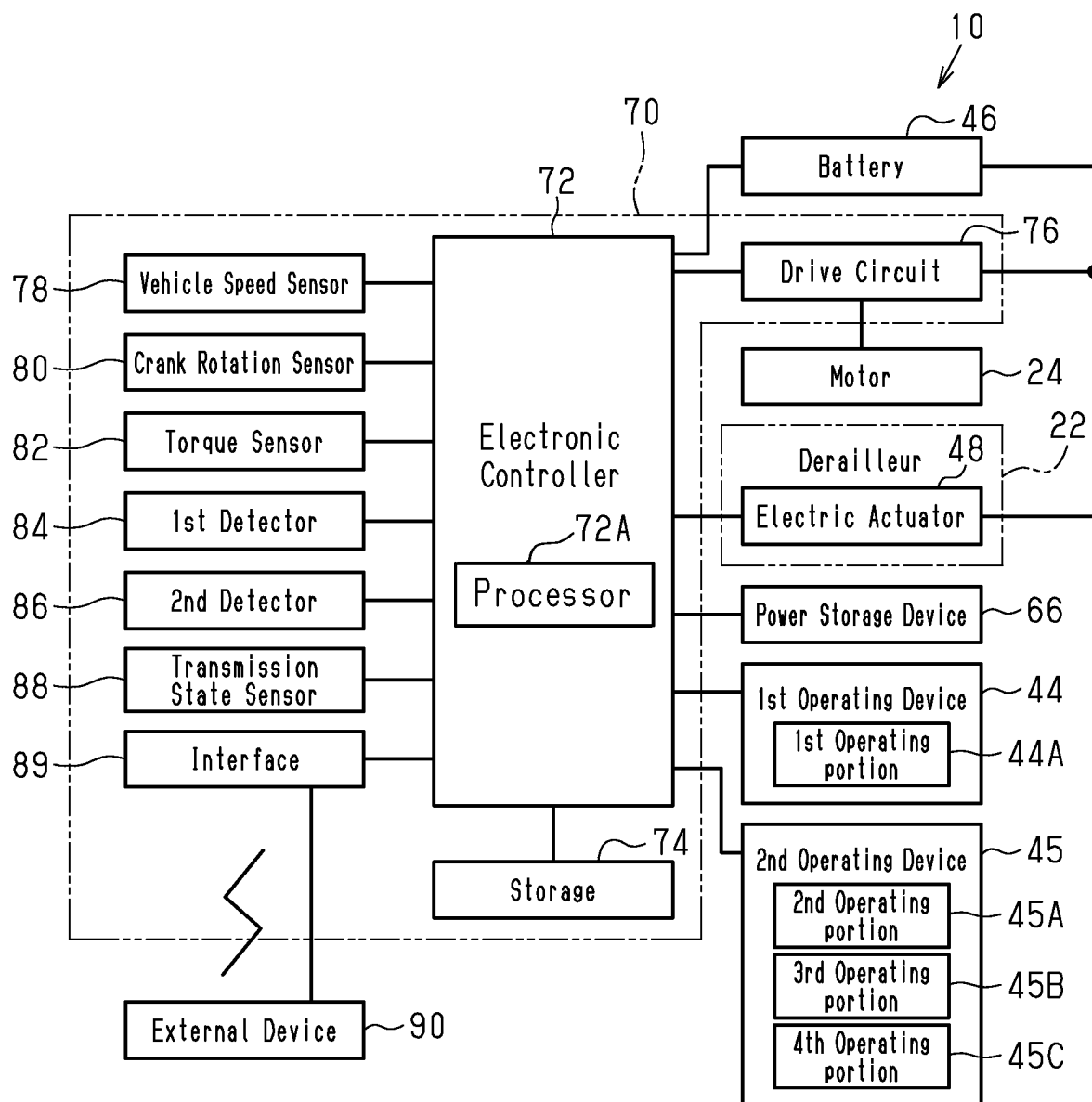
FIG. 4 is a block diagram showing the electrical configuration of the human-powered vehicle including the control device of the first embodiment.

The control device 70 includes the electronic controller 72. The controller 72 includes at least one processor 72A that executes a predetermined control program. The at least one processor 72A can be for example, a central processing unit (CPU) or a micro processing unit (MPU). The term "electronic controller" as used herein refers to hardware that executes a software program, and does not include a human. For the sake of brevity, the electronic controller 72 shall hereinafter be simply referred to as "the controller 72". The processor 72A includes, for example, an arithmetic processing unit. While only one processor is illustrated in FIG. 2, it will be apparent from this disclosure that several processors can be used. When several processors are used, the processors can be provided at different positions separate from each other. The controller 72 can include one or more microcomputers. Preferably, the control device 70 further includes storage 74. The storage 74 stores various control programs and information used for various control processes. The storage 74 includes any computer storage device or any non-transitory computer-readable medium with the sole exception of a transitory, propagating signal. For example, the storage 74 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Preferably, the control device 70 further includes a drive circuit 76 of the motor 24. Preferably, the drive circuit 76 and the controller 72 are provided on the housing 52 of the drive unit 50. The drive circuit 76 and the controller 72 can be provided, for example, on the same circuit substrate. The drive circuit 76 includes an inverter circuit. The drive circuit 76 controls electric power supplied from the battery 46 to the motor 24. The drive circuit 76 is connected to the controller 72 so that wired or wireless communication is performed. The drive circuit 76 drives the motor 24 in accordance with a control signal from the controller 72.

Preferably, the control device 70 further includes a vehicle speed sensor 78, a crank rotation sensor 80, and a torque sensor 82. The term "sensor" as used herein also refers to a hardware device or instrument designed to detect the presence of a particular object or substance and to emit a signal in response. The term "sensor" as used herein also do not include a human.

The vehicle speed sensor 78 is configured to detect information corresponding to the rotational speed NW of the wheel 16 of the human-powered vehicle 10. Preferably, the vehicle speed sensor 78 is configured to detect a magnet provided on the wheel 16 of the human-powered vehicle 10. The vehicle speed sensor 78 is configured to, for example, output detection signals a predetermined number of times in one rotation of the wheel 16. The predetermined number of times is, for example, one. The vehicle speed sensor 78 outputs a signal corresponding to the rotational speed NW of the wheel 16. The controller 72 calculates a vehicle speed V of the human-powered vehicle 10 based on the rotational speed NW of the wheel 16. The vehicle speed V is calculated based on the rotational speed NW of the wheel 16 and information related to the perimeter of the wheel 16. The information related to the perimeter of the wheel 16 is stored in the storage 74.

The vehicle speed sensor 78 includes, for example, a magnetic reed forming a reed switch or a Hall element. The vehicle speed sensor 78 can be attached to a chainstay of the frame 32 of the human-powered vehicle 10 and configured to detect a magnet attached to the rear wheel 16A or can be provided on the front fork 38 and configured to detect a magnet attached to the front wheel 16B. In the present embodiment, the vehicle speed sensor 78 is configured so that the reed switch detects the magnet once in one rotation of the wheel 16. The vehicle speed sensor 78 can have any configuration that detects information corresponding to the rotational speed NW of the wheel 16 of the human-powered vehicle 10 and can include, for example, an optical sensor or an acceleration sensor. The vehicle speed sensor 78 is connected to the controller 72 via a wireless communication device or an electric cable.

The crank rotation sensor 80 is configured to detect information corresponding to the rotational speed NC of the crank axle 12 of the human-powered vehicle 10. The crank rotation sensor 80 is provided, for example, on the frame 32 of the human-powered vehicle 10 or the drive unit 50. The crank rotation sensor 80 is configured to include a magnetic sensor that outputs a signal corresponding to the strength of the magnetic field. An annular magnet having a magnetic field, the strength of which changes in the circumferential direction, is provided on the crank axle 12, a member that rotates in cooperation with the crank axle 12, or the power transmission path between the crank axle 12 and the first rotational body 14. The member that rotates in cooperation with the crank axle 12 can include the output shaft of the motor 24. The crank rotation sensor 80 outputs a signal corresponding to the rotational speed NC of the crank axle 12.

The magnet can be provided on a member that rotates integrally with the crank axle 12 in the power transmission path of the human driving force H between the crank axle 12 and the first rotational body 14. For example, in a case where the first one-way clutch is not provided between the crank axle 12 and the first rotational body 14, the magnet can be provided on the first rotational body 14. The crank rotation sensor 80 can have any configuration that detects information corresponding to the rotational speed NC of the crank axle 12 of the human-powered vehicle 10 and can include, for example, an optical sensor, an acceleration sensor, or a torque sensor instead of the magnetic sensor. The crank rotation sensor 80 is connected to the controller 72 by a wireless communication device or an electric cable.

The torque sensor 82 is configured to output a signal corresponding to torque applied to the crank 28 by the human driving force H. The torque sensor 82 is configured to output information corresponding to torque of the human driving force H that is input to the crank 28. For example, in a case where the first one-way clutch 62 is provided on the power transmission path, it is preferred that the torque sensor 82 is provided at the upstream side of the first one-way clutch 62 in the power transmission path. The torque sensor 82 includes, for example, a strain sensor, a magnetostrictive sensor, or a pressure sensor. The strain sensor includes a strain gauge. The torque sensor 82 is provided on a member included in the power transmission path or a member provided near the member included in the power transmission path. The member included in the power transmission path is, for example, the crank axle 12, a member that transmits the human driving force H between the crank axle 12 and the first rotational body 14, the crank arms 26, or the pedals 34. The torque sensor 82 is connected to the controller 72 by a wireless communication device or an electric cable.

Preferably, the control device 70 includes a first detector 84. The term "detector" as used herein refers to a hardware device or instrument designed to detect the presence of a particular object or substance and to emit a signal in response. The term "detector" as used herein do not include a human. The first detector 84 is configured to detect a load L of the motor 24. The first detector 84 includes a current sensor that detects current flowing through the motor 24 and a rotation sensor that detects rotational speed of the motor 24. Since a known technique can be used to detect the load L of the motor 24 based on the current flowing through the motor 24 and the rotational speed of the motor 24, the technique will not be described in detail.

Preferably, the control device 70 further includes a second detector 86 that detects an inclination angle D of the human-powered vehicle 10. The inclination angle D includes a pitch angle of the human-powered vehicle 10. The second detector 86 includes, for example, at least one of an inclination sensor and a global positioning system (GPS). The inclination sensor includes, for example, at least one of a gyro sensor and an acceleration sensor. In a case in which the second detector 86 includes a GPS receiver, the storage 74 stores map information including information related to road gradient in advance, and the controller 72 obtains the road gradient of the current position of the human-powered vehicle 10 as the pitch angle.

Preferably, the control device 70 further includes a transmission state sensor 88. The transmission state sensor 88 outputs information related to a transmission state of the derailleur 22. The transmission state includes, for example, a shift stage. The transmission state sensor 88 can be provided on the derailleur 22 or can be provided on the second operating device 45. The transmission state sensor 88 is configured to, for example, detect an action of the electric actuator 48. The electric actuator 48 includes, for example, an electric motor and a speed reducer. The transmission state sensor 88 is configured to detect an action of the electric motor or the speed reducer of the electric actuator 48. The transmission state sensor 88 is configured to include, for example, a magnetic sensor, a potentiometer, a rotary encoder, a linear encoder or an optical sensor.

The storage 74 stores information related to the transmission state that is output from the transmission state sensor 88 in association with information related to the transmission ratio R of the human-powered vehicle 10. The association of information related to the transmission state with information related to the transmission ratio R of the human-powered vehicle 10 can be stored as a table or a function. The controller 72 obtains information related to the present transmission ratio R of the human-powered vehicle 10 based on the information related to the transmission state output from the transmission state sensor 88 and information stored in the storage 74. Information relate to the transmission ratio R of the human-powered vehicle 10 can be expressed by the transmission ratio R or can be expressed by a parameter corresponding to the transmission ratio R instead of the transmission ratio R. The parameter corresponding to the transmission ratio R can be a parameter expressing the shift stage.

The controller 72 is configured to control the motor 24. The controller 72 is configured to control the motor 24, for example, in accordance with at least one of the vehicle speed V of the human-powered vehicle 10, a rotational speed N of the crank 28, and the human driving force H. The human driving force H can be expressed in torque HT or power HW. In a case where the human driving force H is expressed in the power HW, the human driving force H is obtained by multiplying torque that is detected by the torque sensor 82 by the rotational speed NC of the crank axle 12 detected by the crank rotation sensor 80.

The controller 72 is configured to control the motor 24, for example, so that the ratio of an assist force M produced by the motor 24 to the human driving force H equals a predetermined assist ratio A. The predetermined assist ratio A does not have to be constant and can be, for example, change in accordance with the human driving force H, the vehicle speed V, or both the human driving force H and the vehicle speed V. The human driving force H and the assist force M can be expressed in torque or power. In a case where the human driving force H and the assist force M are expressed in torque, the human driving force H is referred to as human torque TH, and the assist force M is referred to as an assist torque TM. In a case where the human driving force H and the assist force M are expressed in power, the human driving force H is referred to as a human power WH, and the assist force M is referred to as an assist power WM. In the description, the torque ratio of an output torque MT to the human torque TH of the human-powered vehicle 10 can be referred to as an assist ratio AT. In the description, the ratio of the assist power WM of the motor 24 to the human power WH can be referred to as an assist ratio AW. The assist ratio A is equal to the ratio of a propulsion force generated in the human-powered vehicle 10 by an assist force of the motor 24 to a propulsion force generated in the human-powered vehicle by the human driving force H.

The controller 72 is configured to control the motor 24, for example, in a control state selected from multiple control states that at least partially differ from each other in the correspondence relationship between the human driving force H and the ratio A. The human power WH is calculated by multiplying the human torque TH by the rotational speed NC of the crank axle 12. In a case where the output of the motor 24 is input to the power transmission path of the human driving force H through the speed reducer 54, the output of the speed reducer 54 is used as the assist force M. In a case where the speed reducer 54 is not provided, the assist power WM is calculated by multiplying the output torque of the motor 24 by the rotational speed of the motor 24. In a case where the speed reducer 54 is provided, the assist power WM is calculated by multiplying the output torque of the speed reducer 54 by an output rotational speed of the speed reducer 54. In a case where the speed reducer 54 is provided, the storage 74 is configured to store information related to a reduction ratio of the speed reducer 54.

The controller 72 calculates the output rotational speed of the speed reducer 54 based on the rotational speed of the motor 24 and information related to the reduction ratio of the speed reducer 54. The storage 74 stores, for example, information indicating the relation between a control instruction of the motor 24 and the output torque of the motor 24. The controller 72 calculates the output torque of the motor 24 in accordance with, for example, information indicating the relation between the control instruction of the motor 24 and the output torque of the motor 24 stored in the storage 74. The controller 72 calculates the output torque of the speed reducer 54, for example, in accordance with the output torque of the motor 24 and information related to the reduction ratio of the speed reducer. The controller 72 is configured to output the control instruction to the drive circuit 76 of the motor 24 in accordance with the human torque TH or the human power WH. The control instruction includes, for example, a torque instruction value. The control states can include a control state in which the motor 24 is not driven.

The controller 72 is configured to control the motor 24 so that the assist force M becomes less than or equal to an upper limit value MX. In a case where the assist force M is expressed in torque, the controller 72 is configured to control the motor 24 so that the output torque MT becomes less than or equal to an upper limit value MTX. Preferably, the upper limit value MTX is in a range that is greater than or equal to 30 Nm and less than or equal to 90 Nm. The upper limit value MTX is, for example, 80 Nm. The upper limit value MTX is determined, for example, by an output property of the motor 24. In a case where the assist force M is expressed in power, the controller 72 is configured to control the motor 24 so that the assist power WM becomes less than or equal to an upper limit value WMX.

For example, upon determining the vehicle speed V has become greater than or equal to a predetermined the vehicle speed VX, the controller 72 stops the motor 24. The predetermined vehicle speed VX is, for example, 45 km per hour. The predetermined vehicle speed VX can be less than 45 km per hour and can be, for example, 25 km per hour.

For example, upon determining the rotational speed NC of the crank axle 12 is less than a predetermined rotational speed NCX, the controller 72 stops driving the motor 24 in accordance with at least one of the rotational speed N of the crank 28 and the human driving force H. The predetermined rotational speed NCX is, for example, 0 rpm. For example, upon determining the rotational speed NC of the crank axle 12 is greater than or equal to a predetermined rotational speed NCY, the controller 72 can stop the motor 24 or can control the motor 24 to decrease the assist force M. The predetermined rotational speed NCY is greater than a predetermined rotational speed NC and, for example, has a value in a range from 120 rpm to 200 rpm.

Preferably, the controller 72 is configured to control the electric actuator 48. Preferably, the controller 72 is configured to control the electric actuator 48 and the motor 24. The controller 72 outputs a shifting control signal for changing the transmission ratio R to the electric actuator 48. In a case where the shifting control signal is input, the electric actuator 48 is actuated to operate the derailleur 22. The shifting control signal includes, for example, electric power for driving the electric actuator 48. Preferably, the shifting control signal includes a first shifting control signal including an instruction that the electric actuator 48 operates the derailleur 22 to increase the transmission ratio R and a second shifting control signal including an instruction that the electric actuator 48 operates the derailleur 22 to decrease the transmission ratio R.

Preferably, upon determining a shifting condition is satisfied, the controller 72 is configured to control the electric actuator 48 so that the derailleur 22 is actuated to change the transmission ratio R. Upon determining a shifting condition for increasing the transmission ratio R is satisfied, the controller 72 transmits the first shifting control signal to the electric actuator 48 to operate the derailleur 22 so that the electric actuator 48 increases the transmission ratio R. Upon determining a shifting condition for decreasing the transmission ratio R is satisfied, the controller 72 transmits the second shifting control signal to the electric actuator 48 to operate the derailleur 22 so that the electric actuator 48 decreases the transmission ratio R.

In the present embodiment, the shifting condition is satisfied in a case where a shifting execution condition is satisfied and shifting is not prohibited. The shifting condition can be satisfied in a case where the shifting execution condition is satisfied. The shifting execution condition is satisfied, for example, in at least one of a case where the shifting operation signal is input to the controller 72 from the second operating device 45 and a case where a predetermined condition related to a travel state of the human-powered vehicle 10 is satisfied. The controller 72 can control the derailleur 22 in accordance with a manual operation performed by the user on the second operating device 45, can automatically control the derailleur 22 in accordance with the travel state of the human-powered vehicle 10, or can control the derailleur 22 in accordance with both the manual operation performed by the user on the second operating device 45 and the travel state of the human-powered vehicle 10.

The controller 72 can be configured to switch between a manual shifting mode and an automatic shifting mode. In the manual shifting mode, the derailleur 22 is controlled in accordance with the manual operation performed by the user on the second operating device 45. In the automatic shifting mode, the derailleur 22 is automatically controlled in accordance with the travel state of the human-powered vehicle 10. For example, a third operating device can be provided on the handlebar 42 to switch between the manual shifting mode and the automatic shifting mode. Upon determining the user operates the third operating device, the controller 72 can switch between the manual shifting mode and the automatic shifting mode. For example, the controller 72 alternately switches between the manual shifting mode and the automatic shifting mode each time the third operating device is operated. For example, upon determining the second operating portion 45A and the third operating portion 45B of the second operating device 45 are simultaneously operated, the controller 72 can switch between the manual shifting mode and the automatic shifting mode.

For example, upon determining the second operating device 45 is operated in the manual shifting mode, the controller 72 can be configured to be automatically switchable from the manual shifting mode to the automatic shifting mode in correspondence with a difference between a first rotational speed N1, which is calculated in accordance with the rotational speed NW of the wheel 16 and the transmission ratio R, and a predetermined rotational speed or a rotational speed in a predetermined range. The first rotational speed N1 is obtained from equation (2).

First Rotational Speed $N1$ = Rotational Speed $NW$/Transmission Ratio $R$    Equation (2):

For example, in a case of switching to the automatic shifting mode, the controller 72 controls the motor 24 and the electric actuator 48 so that the transmission ratio R is set in correspondence with a difference between the first rotational speed N1 stored in the storage 74 and the predetermined rotational speed or the rotational speed in the predetermined range. In any one of a case of automatically switching to the automatic shifting mode and a case of switching to the automatic shifting mode by operation of the user, the controller 72 can be configured to be switchable from the automatic shifting mode to the manual shifting mode in at least one of a case where a predetermined time elapses, a case where the human driving force H becomes greater than or equal to a predetermined value, and a case where the rotational amount of the crank axle 12 becomes greater than or equal to a predetermined rotational amount.

The predetermined condition related to the travel state of the human-powered vehicle 10 is satisfied, for example, in at least one of a case where the rotational speed NC of the crank axle 12 is outside a predetermined first range, a case where the human driving force H is outside a predetermined second range, and a case where the human-powered vehicle 10 is decelerated. The predetermined condition related to the travel state of the human-powered vehicle 10 can be satisfied in only one or any two of a case where the rotational speed NC of the crank axle 12 is outside a predetermined first range, a case where the human driving force H is outside a predetermined second range, and a case where the human-powered vehicle 10 is decelerated. The controller 72 is configured to control the electric actuator 48 so that the first rotational speed N1 is included in a predetermined range.

Preferably, the case where the human-powered vehicle 10 is decelerated includes a case where the deceleration in a direction corresponding to the traveling direction of the human-powered vehicle 10 is greater than a predetermined deceleration. Preferably, the predetermined deceleration corresponds to a deceleration in a case where the human-powered vehicle 10 is quickly decelerated as a result of hard braking.

The shifting execution condition can include a condition related to a traveling resistance of the human-powered vehicle 10. The traveling resistance includes, for example, at least one of air resistance, rolling resistance, gradient resistance, and acceleration resistance. The controller 72 can control the electric actuator 48, for example, to decrease the transmission ratio R upon determining the traveling resistance is increased, and to increase the transmission ratio R upon determining the traveling resistance is decreased.

The controller 72 includes at least one of the following configurations (A1), (A2), (A3), and (A4). The controller 72 can include two, three, or all of the configurations (A1), (A2), (A3), and (A4).

(A1) The controller 72 is configured to control the electric actuator 48 so that the transmission ratio R does not increase in a case where the vehicle speed V of the human-powered vehicle 10 is greater than or equal to a second speed V2 or the rotational speed NW of the wheel 16 is greater than or equal to a predetermined rotational speed NWX. In the configuration (A1), the controller 72 can be configured to control the electric actuator 48 so that the transmission ratio R does not increase in a case where the vehicle speed V of the human-powered vehicle 10 is greater than or equal to the second speed V2 and the rotational speed NW of the wheel 16 is greater than or equal to the predetermined rotational speed NWX.

(A2) The controller 72 is configured to control the electric actuator 48 so as not to change the transmission ratio R until a first condition related to shifting is satisfied in a case where the derailleur 22 is actuated.

(A3) The controller 72 is configured to control the electric actuator 48 so as not to change the transmission ratio R with the derailleur 22 until a second condition related to shifting is satisfied in a case where the electric actuator 48 and the motor 24 are controlled to increase or decrease the transmission ratio R a predetermined number of times or more within a predetermined third time T3.

(A4) The controller 72 is configured to control the electric actuator 48 so as not to change the transmission ratio R with the derailleur 22 upon determining the vehicle speed V of the human-powered vehicle 10 is less than or equal to a first speed V1 or the rotational speed NW of the wheel 16 is less than or equal to a predetermined rotational speed NX even if the predetermined condition related to the travel state of the human-powered vehicle 10 is satisfied.

In a case where the controller 72 includes the configuration (A1), the controller 72 does not execute control on the electric actuator 48 that increases the transmission ratio R in at least one of a case where the vehicle speed V of the human-powered vehicle 10 is greater than or equal to the second speed V2 and a case where the rotational speed NW of the wheel 16 is greater than or equal to the predetermined rotational speed NWX. For example, in at least one of a case where the vehicle speed V of the human-powered vehicle 10 is greater than or equal to the second speed V2 and a case where the rotational speed NW of the wheel 16 is greater than or equal to the predetermined rotational speed NWX, the controller 72 does not transmit the first shifting control signal to the electric actuator 48. For example, in at least one of a case where the vehicle speed V of the human-powered vehicle 10 is greater than or equal to the second speed V2 and a case where the rotational speed NW of the wheel 16 is greater than or equal to the predetermined rotational speed NWX, the controller 72 is configured to transmit the second shifting control signal to the electric actuator 48 in correspondence with the shifting execution condition. In at least one of a case where the vehicle speed V is greater than or equal to the second speed V2 and the rotational speed NW of the wheel 16 is greater than or equal to the predetermined rotational speed NWX, the controller 72 controls the electric actuator 48 so as not to increase the transmission ratio R, so that increases in the vehicle speed V of the human-powered vehicle 10 are limited.

In a case where the controller 72 includes the configuration (A2), the controller 72 is configured to control the electric actuator 48 so as not to change the transmission ratio R until the first condition related to shifting is satisfied, for example, in a case where the derailleur 22 is actuated by operation of the second operating device 45. Preferably, the first condition related to shifting is satisfied in at least one of a case where a predetermined first time T1 elapses from the time of operating the second operating device 45, a case where a predetermined second time T2 elapses from the time of stopping the electric actuator 48, a case where the inclination angle D of the human-powered vehicle 10 becomes greater than or equal to a predetermined first angle D1, and a case where the vehicle speed V of the human-powered vehicle 10 becomes greater than or equal to a predetermined third speed V3. The controller 72 does not execute control on the electric actuator 48 that changes the transmission ratio R upon determining the derailleur 22 has been actuated and the first condition related to shifting is not satisfied. For example, upon determining the derailleur 22 has been actuated and the first condition related to shifting is not satisfied, the controller 72 does not output the first shifting control signal and the second shifting control signal to the electric actuator 48. The predetermined first time T1 is, for example, included in a range from 0.1 seconds to 10 seconds. The predetermined second time T2 is, for example, included in a range from 0.1 seconds to 10 seconds. The predetermined first angle D1 is, for example, a pitch angle of the human-powered vehicle 10 that is greater than or equal to 5 degrees.

In a case where the controller 72 includes the configuration (A3), the second condition related to shifting is satisfied, for example, in at least one of a case where a predetermined fourth time T4 elapses from the time of stopping the electric actuator 48, a case where the inclination angle D of the human-powered vehicle 10 becomes greater than or equal to a predetermined second angle D2, and a case where the vehicle speed of the human-powered vehicle 10 becomes greater than or equal to a predetermined fourth speed V4. The controller 72 does not execute control on the electric actuator 48 that changes the transmission ratio R upon determining the second condition related to shifting is not satisfied and the electric actuator 48 and the motor 24 are controlled to increase or decrease the transmission ratio R a predetermined number of times or more within the predetermined third time T3. For example, the controller 72 does not output the first shifting control signal and the second shifting control signal to the electric actuator 48 upon determining the second condition related to shifting is not satisfied and the electric actuator 48 and the motor 24 are controlled to increase or decrease the transmission ratio R a predetermined number of times or more within the predetermined third time T3. The predetermined fourth time T4 is, for example, included in a range from 0.1 seconds to 10 seconds. The fourth speed V4 is, for example, greater than or equal to 3 km per hour. The predetermined second angle D2 is, for example, a pitch angle of the human-powered vehicle 10 that is greater than or equal to 5 degrees.

In a case where the controller 72 includes the configuration (A4), the first speed V1 and the predetermined rotational speed NX have values that are, for example, appropriate for determining a stoppage of traveling of the human-powered vehicle 10. The first speed V1 has, for example, a value in a range from 0 km/h to 3 km/h. The predetermined rotational speed NX has, for example, a value in a range from 0 rpm to 5 rpm. Upon determining the first speed V1 and the predetermined rotational speed NX have values that are appropriate for determining a stoppage of traveling of the human-powered vehicle 10, the controller 72 restricts changes in the transmission ratio R in a case where the human-powered vehicle 10 stops. This avoids a situation in which the human-powered vehicle 10 stops during a shifting operation of the derailleur 22.

The controller 72 is configured to control the motor 24 and drive the transmission body 20 with the motor 24 upon determining the derailleur 22 has been actuated to change the transmission ratio R and a predetermined condition related to pedaling is satisfied. Preferably, the controller 72 is configured to control the motor 24 and drive the transmission body 20 so as not to apply a propulsion force to the human-powered vehicle 10 upon determining the derailleur 22 has been actuated to change the transmission ratio R and the predetermined condition related to pedaling is satisfied. The controller 72 drives the transmission body 20 so as not to transmit driving force of the motor 24 to the rear wheel 16A upon determining the derailleur 22 has been actuated to change the transmission ratio R and the predetermined condition related to pedaling is satisfied. For example, the controller 72 is configured to control the motor 24 so that the transmission body 20 is driven by the motor 24 and the rear wheel 16A is not rotated by the motor 24. For example, the controller 72 is configured to control the motor 24 so that the rotational speed of the second rotational body 18 becomes less than or equal to the rotational speed of the rear wheel 16A. The controller 72 can control the motor 24 so as not to apply a propulsion force to the human-powered vehicle 10 in correspondence with information related to the rotational speed or rotational torque of the motor 24 stored in the storage 74 in advance.

Preferably, the controller 72 is configured to control the electric actuator 48 and the motor 24 so that relative movement of the derailleur 22 and at least one of the first rotational body 14 and the second rotational body 18 is started simultaneously as the motor 24 is driven or before the motor 24 is driven in a case where the electric actuator 48 and the motor 24 are controlled to change the transmission ratio R and the predetermined condition related to pedaling is satisfied. The controller 72 can be configured to control the electric actuator 48 and the motor 24 so that relative movement of the derailleur 22 and at least one of the first rotational body 14 and the second rotational body 18 is started after the motor 24 is driven in a case where the electric actuator 48 and the motor 24 are controlled to change the transmission ratio R and the predetermined condition related to pedaling is satisfied.

In the shifting condition, the controller 72 can be configured to control the electric actuator 48 so that the derailleur 22 is actuated over a plurality of shift stages. In this case, the shifting control signal includes a signal for actuating the derailleur 22 over a plurality of shift stages. The controller 72 can be configured to control the motor 24 so that the rotational speed of the motor 24 in a case where the derailleur 22 changes the shift stage twice or more to reach the target transmission ratio R is greater than the rotational speed of the motor 24 in a case where the derailleur 22 changes the shift stage only once to reach the target transmission ratio R. Preferably, the controller 72 is configured to control the motor 24 and drive the transmission body 20 with the motor 24 upon determining the derailleur 22 has been actuated to change the transmission ratio R and the predetermined condition related to pedaling is satisfied.

The controller 72 is configured to control the electric actuator 48 so that the shift stage of the derailleur 22 approaches a predetermined shift stage or the transmission ratio R approaches a predetermined transmission ratio R in a case where the human-powered vehicle 10 is decelerated. The controller 72 is configured to control the electric actuator 48 and change the shift stage of the derailleur 22 one stage at a time in a case where a difference of the predetermined shift stage and the present shift stage of the derailleur 22 or a difference of the predetermined transmission ratio R and the present transmission ratio R is less than or equal to a predetermined value. The controller 72 is configured to control the electric actuator 48 so as to continuously actuate the derailleur 22 over a plurality of shift stages upon determining either the difference of the predetermined shift stage and the present shift stage of the derailleur 22 or the difference of the predetermined transmission ratio R and the present transmission ratio R exceeds the predetermined value.

Information related to the predetermined shift stage or information related to the predetermined transmission ratio R is, for example, stored in the storage 74 as the target transmission ratio R in a case where the human-powered vehicle 10 is decelerated. In a case where shifting is performed in correspondence with the information related to the predetermined shift stage, it is preferred that the predetermined value is such that the difference of the predetermined shift stage and the present shift stage of the derailleur 22 corresponds to a range from one stage to three stages. In a case where shifting is performed in correspondence with the information related to the predetermined transmission ratio R, it is preferred that the predetermined value is such that the difference of the predetermined transmission ratio R and the present transmission ratio R corresponds to a range from one stage to three stages if converted into shift stage.

Preferably, the controller 72 is configured to control the electric actuator 48 so that a fifth time T5 during which the derailleur 22 is actuated over a plurality of shift stages in a case where the vehicle speed V of the human-powered vehicle 10 is less than or equal to a predetermined fifth speed V5 becomes shorter than a sixth time T6 during which the derailleur 22 is actuated over a plurality of shift stages in a case where the vehicle speed V of the human-powered vehicle 10 exceeds the predetermined fifth speed V5. In a case where the second rotational body 18 includes one or more shift facilitation regions that are suitable for shifting, as the vehicle speed V increases, it takes a shorter time for the shifting facilitation region of the second rotational body 18, after passing through the region in which the transmission body 20 is moved by the derailleur 22, to again pass through to the region in which the transmission body 20 moves.

Preferably, the fifth speed V5 is less than or equal to 10 km per hour. Preferably, the fifth time T5 is set to a sufficient time to change the transmission ratio R over a plurality of shift stages in correspondence with the shifting control signal in a case where the vehicle speed V of the human-powered vehicle 10 is less than or equal to the predetermined fifth speed V5. Preferably, the sixth time T6 is set to a sufficient time to change the transmission ratio R over a plurality of shift stages in correspondence with the shifting control signal in a case where the vehicle speed V of the human-powered vehicle 10 exceeds the predetermined fifth speed V5.

The controller 72 can be configured to change the actuation speed of the derailleur 22 in a case where the derailleur 22 is actuated over a plurality of shift stages. The controller 72 can be configured to control the electric actuator 48 to stop the derailleur 22 each time the shift stage is changed by one stage and change a predetermined interval until the next actuation starts. The predetermined interval is, for example, in a range that is greater than or equal to 0.5 seconds and less than 1 second in a case where the vehicle speed V is less than or equal to 15 km per hour, and in a range that is greater than or equal to 0.25 seconds and less than 0.5 seconds in a case where the vehicle speed V is greater than 15 km per hour. The shifting condition can include a condition for shifting the derailleur 22 over a plurality of shift stages or can include only a condition for shifting the derailleur 22 by only one stage.

Preferably, the predetermined condition related to pedaling is satisfied in at least one of a case where the human driving force H input to the crank axle 12 is less than or equal to a predetermined driving force HX, a case where the rotational speed NC of the crank axle 12 is less than or equal to a second rotational speed NC2, and a case where the crank axle 12 is oscillating. Preferably, the predetermined condition related to pedaling determines that pedaling is stopped. Preferably, the predetermined driving force HX and the second rotational speed NC2 have values that are appropriate for determining a stoppage of rotation of the crank axle 12 of the human-powered vehicle 10. The predetermined driving force HX has, for example, a value in a range from 0 Nm to 3 Nm. The second rotational speed NC2 has, for example, a value in a range from 0 rpm to 5 rpm. The case where the crank axle 12 is oscillating includes a case where the crank axle 12 is not completely stopped and a rotational angle CC of the crank axle 12 is maintained in a predetermined angle range. The predetermined angle range is, for example, greater than or equal to 1 degree and less than or equal to 20 degrees.

For example, in a case where the feet of the rider are on the pedals 34 and the rider is not pedaling, the crank axle 12 can oscillate. In a case where rotation of the crank axle 12 is stopped or the crank axle 12 is oscillating, the first rotational body 14 and the second rotational body 18 are not rotated by the human driving force H. Therefore, shifting cannot be performed even in a case where the derailleur 22 is actuated. In a case where the derailleur 22 is actuated to change the transmission ratio R and rotation of the crank axle 12 is stopped or the crank axle 12 is oscillating, the controller 72 is configured to control the motor 24 and drive the transmission body 20 with the motor 24, so that the first rotational body 14 and the second rotational body 18 are rotated. This allows the derailleur 22 to perform shifting.

The controller 72 includes at least one of the following configurations (B1), (B2), (B3), and (B4) and controls the motor 24 in a case where the derailleur 22 is actuated to change the transmission ratio R and the predetermined condition related to pedaling is satisfied. The controller 72 can include two, three, or all of the configurations (B1), (B2), (B3), and (B4).

(B1) The controller 72 is configured control the motor 24 and drive the transmission body 20 with the motor 24 so as to increase the rotational speed NM of the motor 24 as a difference DN of the first rotational speed N1, which is calculated in correspondence with the rotational speed NW of the wheel 16 and the transmission ratio R, and the predetermined rotational speed NX or a rotational speed NA in a predetermined range increases. Preferably, the first rotational speed N1, the predetermined rotational speed NX, and the rotational speed NA in the predetermined range correspond to the rotational speed NC of the crank axle 12. The predetermined rotational speed NX and the rotational speed NA in the predetermined range are greater than or equal to 50 rpm and less than or equal to 80 rpm.

(B2) The controller 72 is configured to change the rotational speed of the motor 24 in correspondence with the acceleration of the human-powered vehicle 10 in the traveling direction. The controller 72 is configured to control the motor 24 and drive the transmission body 20 with the motor 24 to increase the rotational speed NM of the motor 24 as the acceleration of the human-powered vehicle 10 increases.

(B3) The controller 72 is configured to control the motor 24 to change at least one of a rotational angle CA of the motor 24 and the output torque MT of and the motor 24 in correspondence with a state of the human-powered vehicle 10. The state of the human-powered vehicle 10 includes at least one of the rotational speed NW of the wheel 16 and the transmission ratio R. Preferably, the controller 72 is configured to control the motor 24 so as to increase at least one of a rotational angle MN of the motor 24 and the output torque MT as the difference of the first rotational speed N1, which is calculated in correspondence with the rotational speed NW of the wheel 16 and the transmission ratio R, and the predetermined rotational speed NX or the rotational speed NA in the predetermined range increases.

(B4) The controller 72 is configured to control the motor 24 to change at least one of the rotational angle CA of the motor 24 and the output torque MT of and the motor 24 in correspondence with a state of the human-powered vehicle 10. The state of the human-powered vehicle 10 includes a change in the vehicle speed V of the human-powered vehicle 10 or a change in the rotational speed NW of the wheel 16. Preferably, the controller 72 is configured to control the motor 24 and drive the transmission body 20 with the motor 24 to increase at least one of the rotational angle of the motor 24 and the output torque MT as an acceleration or a deceleration of the human-powered vehicle 10 increases in the traveling direction or an acceleration or a deceleration of the rotational speed NW of the wheel 16 in a rotational direction corresponding to the traveling direction of the human-powered vehicle 10 increases. The controller 72 is configured to calculate the acceleration or deceleration of the human-powered vehicle 10 in the traveling direction, for example, by differentiating the vehicle speed V. The human-powered vehicle 10 can include an acceleration sensor that detects information related to the acceleration or deceleration of the human-powered vehicle 10 in the traveling direction. In a case where the human-powered vehicle 10 includes an acceleration sensor, the controller 72 receives information detected by the acceleration sensor.

Instead of or in addition to at least one of the configurations (B1), (B2), (B3), and (B4), the human-powered vehicle 10 can be configured to control so that output of the motor 24 differs in correspondence with the transmission ratio R or the shift stage. Preferably, the storage 74 stores information related to the transmission ratio R in association with information related to output of the motor 24. The association of information related to the transmission ratio R with information related to output of the motor 24 can be stored as a table or a function. The controller 72 is configured to control the motor 24 in correspondence with the detection result of the transmission state sensor 88 and the information stored in the storage 74.

Preferably, the controller 72 is configured to control the motor 24 so as not to drive the transmission body 20 if the first operating device 44 is operated even upon determining the derailleur 22 has been actuated to change the transmission ratio R and the predetermined condition related to pedaling is satisfied. The controller 72 is configured to control the motor 24 so as not to drive the transmission body 20 if a non-driving condition of the motor 24 is satisfied even upon determining the derailleur 22 has been actuated to change the transmission ratio R and the predetermined condition related to pedaling is satisfied. The non-driving condition of the motor 24 includes at least one of a first non-driving condition and a second non-driving condition. In a case where only one or both of the first non-driving condition and the second non-driving condition are satisfied, the controller 72 can be configured to control so that the motor 24 is stopped.

The first non-driving condition is satisfied at least one of during operation of the first operating device 44 and in a predetermined period after the first operating device 44 is operated. In a case where the controller 72 controls the motor 24 under the first non-driving condition, the controller 72 is configured to control the motor 24 so as not to drive the transmission body 20 at least one of during operation of the first operating device 44 and in the predetermined period after the first operating device 44 is operated even upon determining the derailleur 22 has been actuated to change the transmission ratio R and the predetermined condition related to pedaling is satisfied.

The second non-driving condition is satisfied in a case where the first operating portion 44A of the first operating device 44 is operated or a predetermined operation is performed on the first operating device 44. In a case where the controller 72 controls the motor 24 under the second non-driving condition, the controller 72 is configured to control the motor 24 so as not to drive the transmission body 20 if the first operating portion 44A of the first operating device 44 is operated or the predetermined operation is performed on the first operating portion 44A even upon determining the derailleur 22 has been actuated to change the transmission ratio R and the predetermined condition related to pedaling is satisfied.

Instead of or in addition to at least one of the first non-driving condition and the second non-driving condition, the controller 72 can be configured to control the motor 24 so as not to drive the transmission body 20 upon determining at least one of the following third to sixth non-driving conditions is satisfied.

The third non-driving condition is satisfied in a case where the acceleration of the human-powered vehicle 10 in the traveling direction is greater than a first value. The fourth non-driving condition is satisfied in a case where the deceleration of the human-powered vehicle 10 in the traveling direction is greater than a second value. The fifth non-driving condition is satisfied in a case where the acceleration of the rotational speed NW of the wheel 16 in the rotational direction corresponding to the traveling direction of the human-powered vehicle 10 is greater than a third value. The sixth non-driving condition is satisfied in a case where the deceleration of the rotational speed NW of the wheel 16 in the rotational direction corresponding to the traveling direction of the human-powered vehicle 10 is greater than a fourth value. The controller 72 is configured to calculate at least one of the acceleration and deceleration of the rotational speed NW of the wheel 16 in the rotational direction corresponding to the traveling direction of the human-powered vehicle 10, for example, by differentiating the rotational speed NW of the wheel 16. The first value and the third value correspond to a quick acceleration of the human-powered vehicle 10 and are set in advance based on, for example, tests. The second value and the fourth value correspond to a quick deceleration of the human-powered vehicle 10 and are set in advance based on, for example, tests. In a case where the human-powered vehicle 10 is quickly accelerating or decelerating in the traveling direction, the controller 72 restricts changes in the transmission ratio R.

In a case where the controller 72 controls the motor 24 and drives the transmission body 20 with the motor 24 upon determining the predetermined condition related to pedaling is satisfied, the controller 72 is configured to control the motor 24 to stop driving the transmission body 20 with the motor 24 upon determining a stop condition of the motor 24 is satisfied. The stop condition of the motor 24 includes at least one of a first stop condition and a second stop condition. In a case where only one or both of the first stop condition and the second stop condition are satisfied, the controller 72 can be configured to control so that the motor 24 is stopped.

The first stop condition relates to the load L of the motor 24. In a case where the motor 24 is controlled under the first stop condition, for example, the controller 72 is configured to control the motor 24 and drive the transmission body 20 with the motor 24 upon determining the derailleur 22 has been actuated to change the transmission ratio R and the predetermined condition related to pedaling is satisfied, and stop driving the transmission body 20 with the motor 24 in correspondence with the load L of the motor 24. The first stop condition is satisfied, for example, in a case where the load L of the motor 24 is greater than or equal to a predetermined load L1. Preferably, in a case where the derailleur 22 is actuated to change the transmission ratio R, the predetermined condition related to pedaling is satisfied, and the load L of the motor 24 is greater than or equal to the predetermined load L1, the controller 72 is configured to control the motor 24 so that the motor 24 is stopped.

The predetermined load L1 is set to, for example, a value that is greater than a load L generated to rotate the rear wheel 16A only with driving force of the motor 24 in a case where the rear wheel 16A of the human-powered vehicle 10 is not in contact with the ground and is freely rotatable, and less than a load L generated to propel the human-powered vehicle 10 on a level road. In this case, in a state where the rear wheel 16A of the human-powered vehicle 10 is not in contact with the ground and is freely rotatable, the transmission body 20 is driven by the motor 24. In a state where the rear wheel 16A of the human-powered vehicle 10 is in contact with the ground, the human-powered vehicle 10 will not be propelled on the level road only by driving force of the motor 24.

The second stop condition relates to the vehicle speed V of the human-powered vehicle 10 or the rotational speed NW of the wheel 16. The second stop condition is satisfied in a case where the vehicle speed V of the human-powered vehicle 10 is less than or equal to the first speed V1 or the rotational speed NW of the wheel 16 is less than or equal to the predetermined rotational speed NX. In a case where the motor 24 is controlled under the second stop condition, the controller 72 is configured to control the motor 24 and stop driving the transmission body 20, for example, upon determining the predetermined condition related to pedaling is satisfied and the vehicle speed V of the human-powered vehicle 10 becomes less than or equal to the first speed V1 or the rotational speed NW of the wheel 16 becomes less than or equal to the predetermined rotational speed NX. The first speed V1 and the predetermined rotational speed NX have values that are, for example, appropriate for determining a stoppage of traveling of the human-powered vehicle 10. The first speed V1 has, for example, a value in a range from 0 km/h to 3 km/h. The predetermined rotational speed NX has, for example, a value in a range from 0 rpm to 5 rpm.

Even in a case where the human-powered vehicle 10 is coasting, the controller 72 restricts changes in the transmission ratio R in a case where the human-powered vehicle 10 stops. In a case where the motor 24 is controlled under the second stop condition, the controller 72 can be configured to control the motor 24 and stop driving the transmission body 20, for example, upon determining the predetermined condition related to pedaling is satisfied, the predetermined condition related to a travel state of the human-powered vehicle 10 is satisfied, and the vehicle speed V of the human-powered vehicle 10 becomes less than or equal to the first speed V1 or the rotational speed NW of the wheel 16 becomes less than or equal to the predetermined rotational speed NX. In a case where the controller 72 changes the transmission ratio R with the derailleur 22 based on the traveling condition regardless of an intention of the rider, this configuration avoids a situation in which the transmission ratio R is decreased in a case where the human-powered vehicle 10 stops. The controller 72 can be configured to set a lower limit value of the transmission ratio R upon determining either the vehicle speed V becomes less than or equal to the first speed V1 or the rotational speed NW of the wheel 16 becomes less than or equal to the predetermined rotational speed NX.

In a case where the vehicle speed V becomes less than or equal to the first speed V1 or the rotational speed NW of the wheel 16 becomes less than or equal to the predetermined rotational speed NX, the controller 72 changes the transmission ratio R with the derailleur 22 so that the transmission ratio R will not become less than the lower limit value. In this case, the human-powered vehicle 10 will not resume traveling in a state where the transmission ratio R is less than the lower limit value. Thus, the human-powered vehicle 10 resumes traveling in a preferred manner. The lower limit value of the transmission ratio R is stored in the storage 74. The controller 72 can be configured to change the lower limit value of the transmission ratio R stored in the storage 74 in accordance with operation performed by the user on the first operating device 44 or an external device 90. The external device 90 includes, for example, at least one of a personal computer, a tablet computer, and a smartphone.

Instead of or in addition to the configuration that controls the motor 24 under at least one of the first stop condition and the second stop condition, the controller 72 can be configured to stop the motor 24 based on at least one of a third stop condition and a fourth stop condition. The third stop condition is satisfied in a case where the motor 24 is driven but the transmission ratio R remains the same. The fourth stop condition is satisfied in a case where braking force of a brake device of the human-powered vehicle 10 is greater than or equal to a predetermined braking force.

A process of the controller 72 for controlling the motor 24 and the electric actuator 48 to change the transmission ratio R will be described with reference to FIG. 5. In a case where electric power is supplied to the controller 72, the controller 72 starts the process and proceeds to step S11 of the flowchart illustrated in FIG. 5. Upon completion of the flowchart illustrated in FIG. 5, the controller 72 repeats the process from step S11 in predetermined cycles until the supply of electric power is stopped.

In step S11, the controller 72 determines whether the shifting execution condition is satisfied. In a case where the shifting condition is not satisfied, the controller 72 ends the process. In a case where the shifting condition is satisfied, the controller 72 proceeds to step S12.

In step S12, the controller 72 determines the target transmission ratio R and proceeds to step S10. In step S12, a target shift stage can be determined instead of the target transmission ratio R.

In step S10, the controller 72 determines whether shifting is performable. In a case where it is determined that shifting is performable, the controller 72 proceeds to step S13. In a case where it is determined that shifting is not performable, the controller 72 ends the process. The derailleur 22, the first rotational body 14 and the second rotational body 18 form a transmission. The transmission is configured to perform shifting in a range that is greater than or equal to a minimum transmission ratio R and less than or equal to a maximum transmission ratio R that are determined by the first rotational body 14 and the second rotational body 18. In a case where the present transmission ratio R is the minimum transmission ratio R, the controller 72 is configured not to execute control that decreases the transmission ratio R.

In a case where the present transmission ratio R is the maximum transmission ratio R, the controller 72 is configured not to execute control that increases the transmission ratio R. The controller 72 determines, for example, whether the target transmission ratio R is greater than or equal to the minimum transmission ratio R and less than or equal to the maximum transmission ratio R, which are determined by the first rotational body 14 and the second rotational body 18. Information related to the minimum transmission ratio R and the maximum transmission ratio R is stored in the storage 74. In step S10, in a case where the target transmission ratio R is greater than or equal to the minimum transmission ratio R and less than or equal to the maximum transmission ratio R, which are determined by the first rotational body 14 and the second rotational body 18, the controller 72 determines that shifting is performable and proceeds to step S13. In step S10, in a case where the target transmission ratio R is not greater than or equal to the minimum transmission ratio R and not less than or equal to the maximum transmission ratio R, which are determined by the first rotational body 14 and the second rotational body 18, the controller 72 determines that shifting is not performable and ends the process.

In a case where the target shift stage is determined instead of the target transmission ratio R in step S12, the controller 72 can compare the target shift stage with information related to the shift stage stored in the storage 74 in step S10. For example, the target shift stage is a thirteenth shift stage and the storage 74 stores information related to first to twelfth shift stages, the controller 72 determines that shifting is not performable and ends the process.

In step S13, the controller 72 determines whether the predetermined condition related to pedaling is satisfied. In a case where the predetermined condition related to pedaling is satisfied, the controller 72 proceeds to step S20.

In step S20, the controller 72 determines whether the non-driving condition is satisfied. In a case where the non-driving condition is not satisfied, the controller 72 proceeds to step S30. In a case where the non-driving condition is satisfied, the controller 72 ends the process.

In step S30, the controller 72 determines whether shifting is prohibited. In step S30, in a case where it is determined that shifting is not prohibited, the controller 72 proceeds to step S14. In step S30, in a case where it is determined that shifting is prohibited, the controller 72 ends the process. The controller 72 determines whether shifting is prohibited, for example, in accordance with at least one of the configurations (B1), (B2), (B3), and (B4). For example, in a case where the controller 72 includes the configuration (B1), the controller 72 determines that shifting is prohibited in a case where the target transmission ratio R is greater than the present transmission ratio R. In a case where the target transmission ratio R is less than the present transmission ratio R, the controller 72 determines that shifting is not prohibited.

For example, in a case where the controller 72 includes the configuration (B2), the controller 72 determines that shifting is prohibited until the first condition related to shifting is satisfied upon determining the derailleur 22 has been actuated, and determines that shifting is not prohibited in a case where the first condition related to shifting is satisfied. For example, in a case where the controller 72 includes the configuration (B3), the controller 72 determines that shifting is prohibited until the second condition related to shifting is satisfied in a case where the electric actuator 48 and the motor 24 are controlled to increase or decrease the transmission ratio R a predetermined number of times or more within the predetermined third time T3. In a case where the second condition related to shifting is satisfied, the controller 72 determines that shifting is not prohibited.

The predetermined third time T3 is, for example, included in a range from 1 second to 10 seconds. The predetermined number of times is, for example, included in a range from two times to ten times. For example, in a case where the controller 72 includes the configuration (B4), the controller 72 determines that shifting is prohibited upon determining the vehicle speed V of the human-powered vehicle 10 is less than or equal to the first speed V1, and determines that shifting is not prohibited upon determining the vehicle speed V of the human-powered vehicle 10 exceeds the first speed V1. For example, in a case where the controller 72 includes the configuration (B4), the controller 72 determines that shifting is prohibited upon determining the rotational speed NW of the wheel 16 is less than or equal to the predetermined rotational speed NX, and determines that shifting is not prohibited upon determining the rotational speed NW of the wheel 16 exceeds the predetermined rotational speed NX.

In step S14, the controller 72 controls the motor 24 and drives the transmission body 20 with the motor 24 and then proceeds to step S15. In step S15, the controller 72 controls the electric actuator 48 so that the derailleur 22 starts a shifting action to obtain the target transmission ratio R, and then proceeds to step S16. In the present embodiment, the controller 72 executes steps S14 and S15 to control the motor 24 and the electric actuator 48 so that the motor 24 is driven before the electric actuator 48 starts actuating. In other words, the controller 72 executes steps S14 and S15 to control the motor 24 and the electric actuator 48 so that the transmission body 20 is driven before the derailleur 22 starts to be actuated.

The controller 72 can execute steps S14 and S15 to control the motor 24 and the electric actuator 48 so that the electric actuator 48 starts actuating at the same time as the motor 24 starts driving. In other words, the controller 72 can execute steps S14 and S15 to control the motor 24 and the electric actuator 48 so that the derailleur 22 starts actuating at the same time as the transmission body 20 starts to be driven. The controller 72 can execute steps S14 and S15 to control the motor 24 and the electric actuator 48 so that the motor 24 is driven after the electric actuator 48 starts actuating. In other words, the controller 72 can execute steps S14 and S15 to control the motor 24 and the electric actuator 48 so that the transmission body 20 is driven after the derailleur 22 starts to be actuated.

In step S16, the controller 72 determines whether the stop condition of the motor 24 is satisfied. Upon determining the stop condition of the motor 24 is not satisfied, the controller 72 proceeds to step S17. In step S17, the controller 72 determines whether shifting is completed. Upon determining shifting is not completed, the controller 72 proceeds to step S16. In step S16, upon determining the stop condition of the motor 24 is satisfied, the controller 72 proceeds to step S18. In step S17, upon determining shifting is completed, the controller 72 proceeds to step S18. In step S18, the controller 72 controls the motor 24 to stop the motor 24 and then ends the process.

In step S13, upon determining the predetermined condition related to pedaling is not satisfied, the controller 72 proceeds to step S19. In step S19, the controller 72 controls the electric actuator 48 and actuates the derailleur 22 with the electric actuator 48 to obtain the target transmission ratio R, and then ends the process.

Preferably, the controller 72 is configured to receive a signal for adjusting the position of the derailleur 22. The controller 72 is configured drive the motor 24 in a case where the signal for adjusting the position of the derailleur 22 is received, and is configured to control the electric actuator 48 so that the position of the derailleur 22 corresponds to a first transmission ratio R1 in a case where the first transmission ratio R1 corresponding to the rotational speed of the motor 24 and the rotational speed NW of the wheel 16 does not correspond to the present position of the derailleur 22.

The signal for adjusting the position of the derailleur 22 is, for example, transmitted from the external device 90 connected to the controller 72. The signal for adjusting the position of the derailleur 22 can be transmitted from the first operating device 44 or the second operating device 45. For example, the second operating device 45 can be configured to transmit the signal for adjusting the position of the derailleur 22 in a case where the second operating portion 45A and the third operating portion 45B are simultaneously operated. Preferably, the control device 70 includes an interface 89. The interface 89 includes at least one of a wireless communication device and a connection port of a communication line. The interface 89 is connected to the controller 72 so as to communicate with the controller 72. In a case where the interface 89 includes a wireless communication device, the interface 89 is connected to perform communication with at least one of the external device 90, the first operating device 44, and the second operating device 45, for example, through near-field communication such as Bluetooth® or ANT+®.

A process of the controller 72 for controlling the motor 24 and the electric actuator 48 to adjust the position of the derailleur 22 will now be described with reference to FIG. 6. In a case in which electric power is supplied to the controller 72, the controller 72 starts the process and proceeds to step S21 of the flowchart illustrated in FIG. 6. Upon completion of the flowchart illustrated in FIG. 6, the controller 72 repeats the process from step S21 in predetermined cycles until the supply of electric power is stopped. The position of the derailleur 22 is adjusted in a state where the rear wheel 16A of the human-powered vehicle 10 is not in contact with the ground and is freely rotatable.

In step S21, the controller 72 determines whether a signal for adjusting the position of the derailleur 22 is received. In a case where the signal for adjusting the position of the derailleur 22 is not received, the controller 72 ends the process. In a case where the signal for adjusting the position of the derailleur 22 is received, the controller 72 proceeds to step S22.

In step S22, the controller 72 controls the motor 24 and drives the transmission body 20 with the motor 24 and then proceeds to step S23. In step S23, the controller 72 determines whether the motor 24 is rotating. Upon determining that the motor 24 is rotating, the controller 72 proceeds to step S24. Upon determining that the motor 24 is not rotating, the controller 72 proceeds to step S28. In step S23, instead of determining whether the motor 24 is rotating, the controller 72 can determine whether the first rotational body 14 is rotating, whether the second rotational body 18 is rotating, or whether the rear wheel 16A is rotating. In any one of a case where it is determined that the first rotational body 14 is rotating, a case where it is determined that the second rotational body 18 is rotating, and a case where it is determined that the rear wheel 16A is rotating, the controller 72 proceeds to step S24.

In step S24, the controller 72 determines whether the first transmission ratio R1 corresponding to the rotational speed NM of the motor 24 and the rotational speed NW of the wheel 16 corresponds to the present position of the derailleur 22. For example, the controller 72 determines whether the first transmission ratio R1 corresponding to the rotational speed NM of the motor 24 and the rotational speed NW of the wheel 16 corresponds to the present position of the derailleur 22, for example, based on the present position of the derailleur 22 detected by the transmission state sensor 88. In a case where the first transmission ratio R1 corresponding to the rotational speed NM of the motor 24 and the rotational speed NW of the wheel 16 corresponds to the present position of the derailleur 22, the controller 72 proceeds to step S28. In a case where the first transmission ratio R1 corresponding to the rotational speed NM of the motor 24 and the rotational speed NW of the wheel 16 does not correspond to the present position of the derailleur 22, the controller 72 proceeds to step S25.

In step S25, the controller 72 controls the electric actuator 48 and starts actuating the derailleur 22 to decrease or increase the transmission ratio R, and then proceeds to step S26. In step S25, the controller 72 determines whether the derailleur 22 is actuated to increase the transmission ratio or to decrease the transmission ratio in accordance with the first transmission ratio R1, which corresponds to the rotational speed NM of the motor 24 and the rotational speed NW of the wheel 16, and the present position of the derailleur 22 and controls the electric actuator 48.

In step S26, the controller 72 determines whether the first transmission ratio R1 corresponding to the rotational speed NM of the motor 24 and the rotational speed NW of the wheel 16 corresponds to the present position of the derailleur 22. The controller 72 executes the determination process of step S26, for example, in the same manner as that of step S24. In a case where the first transmission ratio R1 corresponding to the rotational speed NM of the motor 24 and the rotational speed NW of the wheel 16 does not correspond to the present position of the derailleur 22, the controller 72 again executes step S26. In a case where the first transmission ratio R1 corresponding to the rotational speed NM of the motor 24 and the rotational speed NW of the wheel 16 corresponds to the present position of the derailleur 22, the controller 72 proceeds to step S27.

In step S27, the controller 72 controls the electric actuator 48 to stop actuating the derailleur 22 and proceeds to step S28. In step S28, the controller 72 controls the motor 24 to stop the motor 24 and ends the process.

In the present embodiment, in a case where the motor 24 is driven in step S14, it is preferred that the controller 72 drives the motor 24 so that the rotational speed of the second rotational body 18 driven by the motor 24 is lower than the rotational speed of the rear wheel 16A. In a case where the rotational speed of the second rotational body 18 driven by the motor 24 is lower than the rotational speed of the rear wheel 16A, driving force of the motor 24 is not transmitted to the rear wheel 16A. In a case where the motor 24 is driven in step S14, the controller 72 can drive the motor 24 so that the load L of the motor 24 is less than a load L that is generated to propel the human-powered vehicle 10 on a level road.

Second Embodiment

Figure 7:
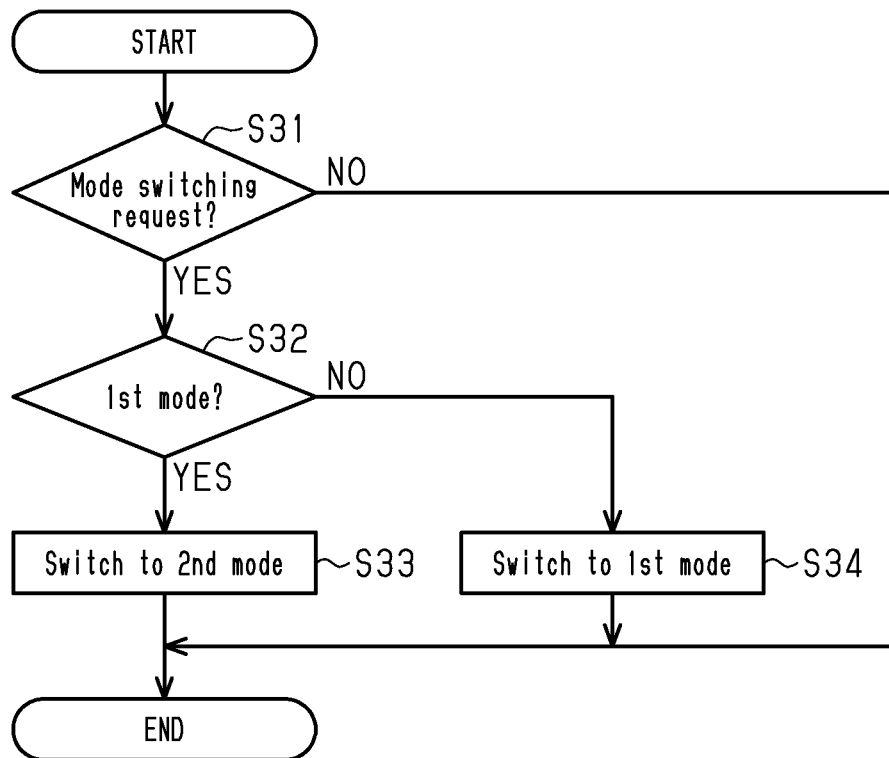
FIG. 7 is a flowchart of a process executed by an electronic controller for switching between a first mode and a second mode in accordance with a second embodiment.

A second embodiment of a control device 70 will now be described with reference to FIGS. 7 and 8. The control device 70 of the second embodiment is the same as the control device 70 of the first embodiment except that the second embodiment is switchable between a first mode and a second mode. Thus, the same reference characters are given to those components that are the same as the corresponding components of the first embodiment. Such components will not be described in detail.

The controller 72 can be configured to be switchable between the first mode and the second mode. The controller 72 is configured to control the motor 24 in the first mode so as to drive the transmission body 20 in correspondence with a state of the human-powered vehicle 10 upon determining the second operating device 45 has been operated and the predetermined condition related to pedaling is satisfied. The controller 72 is configured to control the motor 24 in the second mode so as not to drive the transmission body 20 with the motor 24 upon determining the second operating device 45 has been operated and the predetermined condition related to pedaling is satisfied.

The controller 72 is configured to be switchable between the first mode and the second mode, for example, in correspondence with operation of at least one of the second operating device 45 and the external device 90. In the first mode, the controller 72 can be configured to control the motor 24 so as to drive the transmission body 20 in correspondence with a state of the human-powered vehicle 10 upon determining the shifting condition is satisfied as a result of the predetermined condition related to a travel state of the human-powered vehicle 10 being satisfied and the predetermined condition related to pedaling is satisfied. In the second mode, the controller 72 can be configured to control the motor 24 so as not to drive the transmission body 20 even upon determining the shifting condition is satisfied as a result of the predetermined condition related to a travel state of the human-powered vehicle 10 being satisfied and the predetermined condition related to pedaling is satisfied.

A process of the controller 72 for switching between the first mode and the second mode will be described with reference to FIG. 7. Upon determining electric power is supplied to the controller 72, the controller 72 starts the process and proceeds to step S31 of the flowchart illustrated in FIG. 7. Upon completion of the flowchart illustrated in FIG. 7, the controller 72 repeats the process from step S31 in predetermined cycles until the supply of electric power is stopped.

In step S31, the controller 72 determines whether there is a request for switching the mode. The controller 72 determines that there is a request for switching the mode, for example, in a case where an operation for switching the mode is performed on at least one of the second operating device 45 and the external device 90. In a case where there is no request for switching the mode, the controller 72 ends the process. In a case where there is a request for switching the mode, the controller 72 proceeds to step S32.

In step S32, the controller 72 determines whether the controller 72 is in the first mode. In a case where the controller 72 is in the first mode, the controller 72 proceeds to step S33. In step S33, the controller 72 switches to the second mode and ends the process.

In step S32, in a case where the controller 72 is not in the first mode, the controller 72 proceeds to step S34. In step S34, the controller 72 switches to the first mode and ends the process.

A process of the controller 72 for controlling the motor 24 and the electric actuator 48 to change the transmission ratio R will be described with reference to FIGS. 5 and 8. In a case where electric power is supplied to the controller 72, the controller 72 starts the process and proceeds to step S11 of the flowchart illustrated in FIG. 5. Upon completion of the flowchart illustrated in FIG. 5, the controller 72 repeats the process from step S11 in predetermined cycles until the supply of electric power is stopped.

Figure 8:
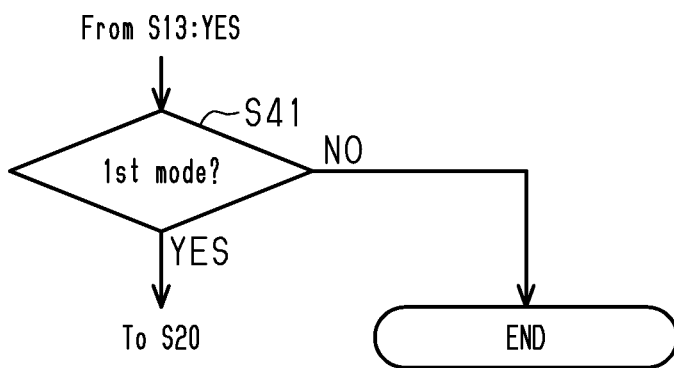
FIG. 8 is a flowchart of a process executed by the electronic controller of the second embodiment for controlling the electric actuator and the motor to change the transmission ratio.

In a case where an affirmative determination is made in step S13, the controller 72 proceeds to step S41 shown in FIG. 8. In step S41, in a case where the controller 72 is in the first mode, the controller 72 proceeds to step S20 shown in FIG. 5. In step S41, in a case where the controller 72 is not in the first mode, the controller 72 ends the process.

Third Embodiment

Figure 9:
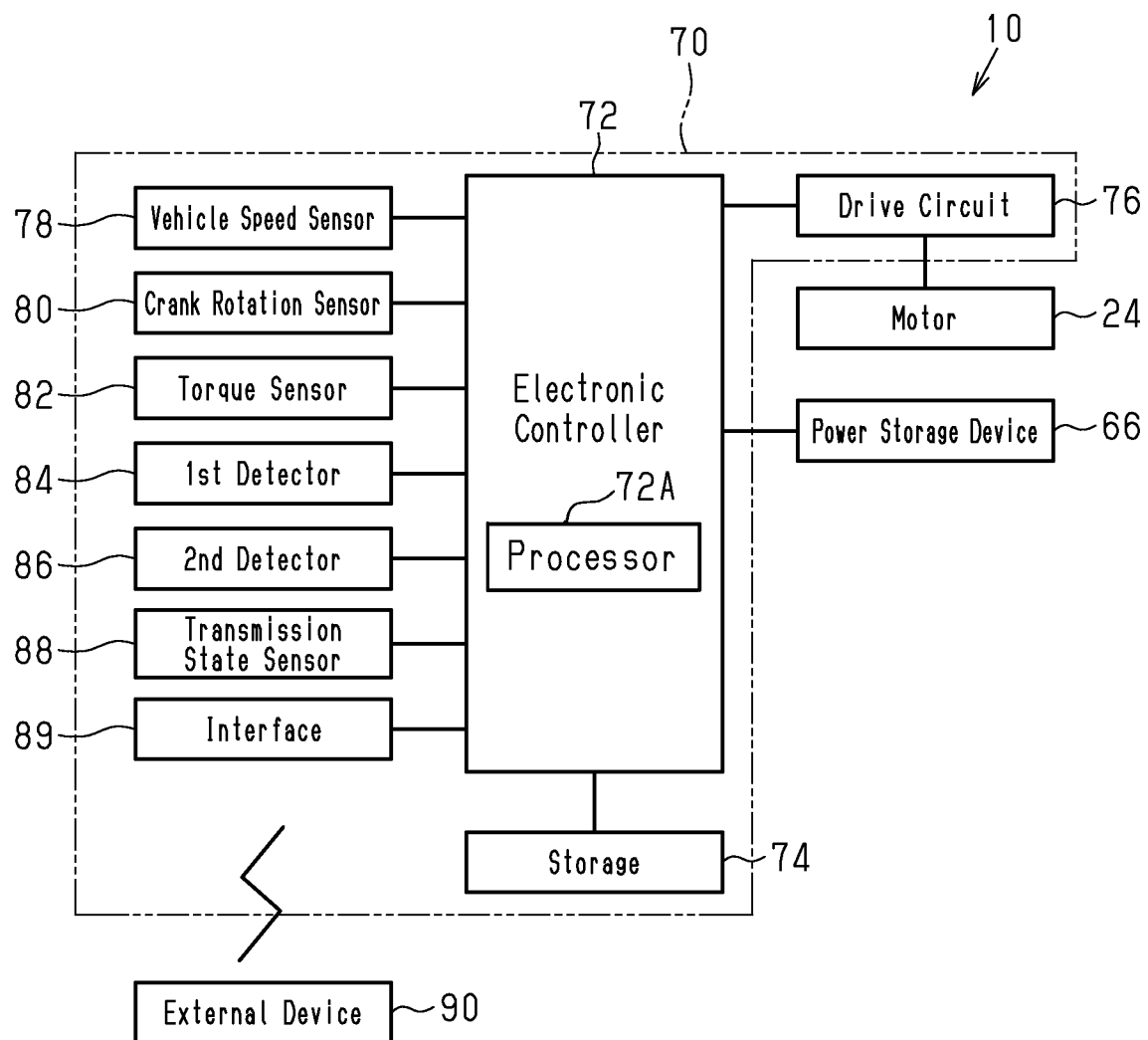
FIG. 9 is a block diagram showing the electrical configuration of a control device in accordance with a third embodiment.

A third embodiment of a control device 70 will now be described with reference to FIGS. 9 and 10. The control device 70 of the third embodiment is the same as the control devices 70 of the first and second embodiments except that the controller 72 does not control the derailleur 22 with the electric actuator 48. Thus, the same reference characters are given to those components that are the same as the corresponding components of the first and second embodiments. Such components will not be described in detail.

In the present embodiment, the derailleur 22 is, for example, connected to a manual transmission operating device by a Bowden cable and is configured to be a cable-type transmission configured to be actuated by the user mechanically operating the Bowden cable using the manual transmission operating device. The manual transmission operating device is, for example, provided on the handlebar 42.

In the present embodiment, the transmission state sensor 88 can be provided on the derailleur 22, the Bowden cable, or the manual transmission operating device. The transmission state sensor 88 is configured to detect at least one of movement of a movable portion of the derailleur 22, movement of the Bowden cable, and movement of the manual transmission operating device.

In the present embodiment, the controller 72 is configured to control the motor 24 and drive the transmission body 20 with the motor 24 upon determining the derailleur 22 has been actuated to change the transmission ratio R and a predetermined condition related to pedaling is satisfied.

A process of the controller 72 for controlling the motor 24 to change the transmission ratio R will be described with reference to FIG. 10. Upon determining electric power is supplied to the controller 72, the controller 72 starts the process and proceeds to step S51 of the flowchart illustrated in FIG. 10. Upon completion of the flowchart illustrated in FIG. 10, the controller 72 repeats the process from step S51 in predetermined cycles until the supply of electric power is stopped.

Figure 5:
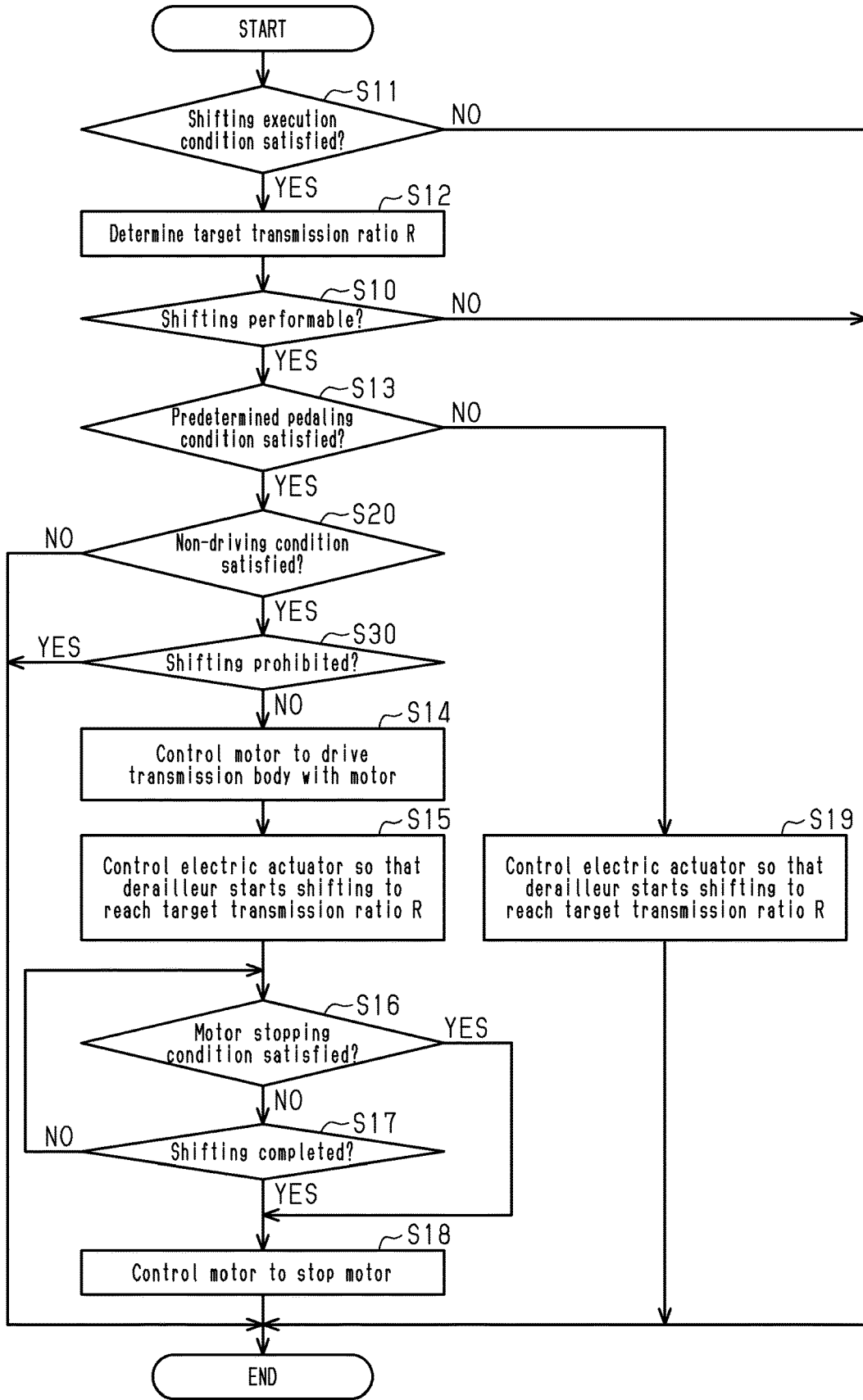
FIG. 5 is a flowchart of a process executed by the electronic controller shown in FIG. 4 for controlling an electric actuator and a motor to change the transmission ratio.
Figure 10:
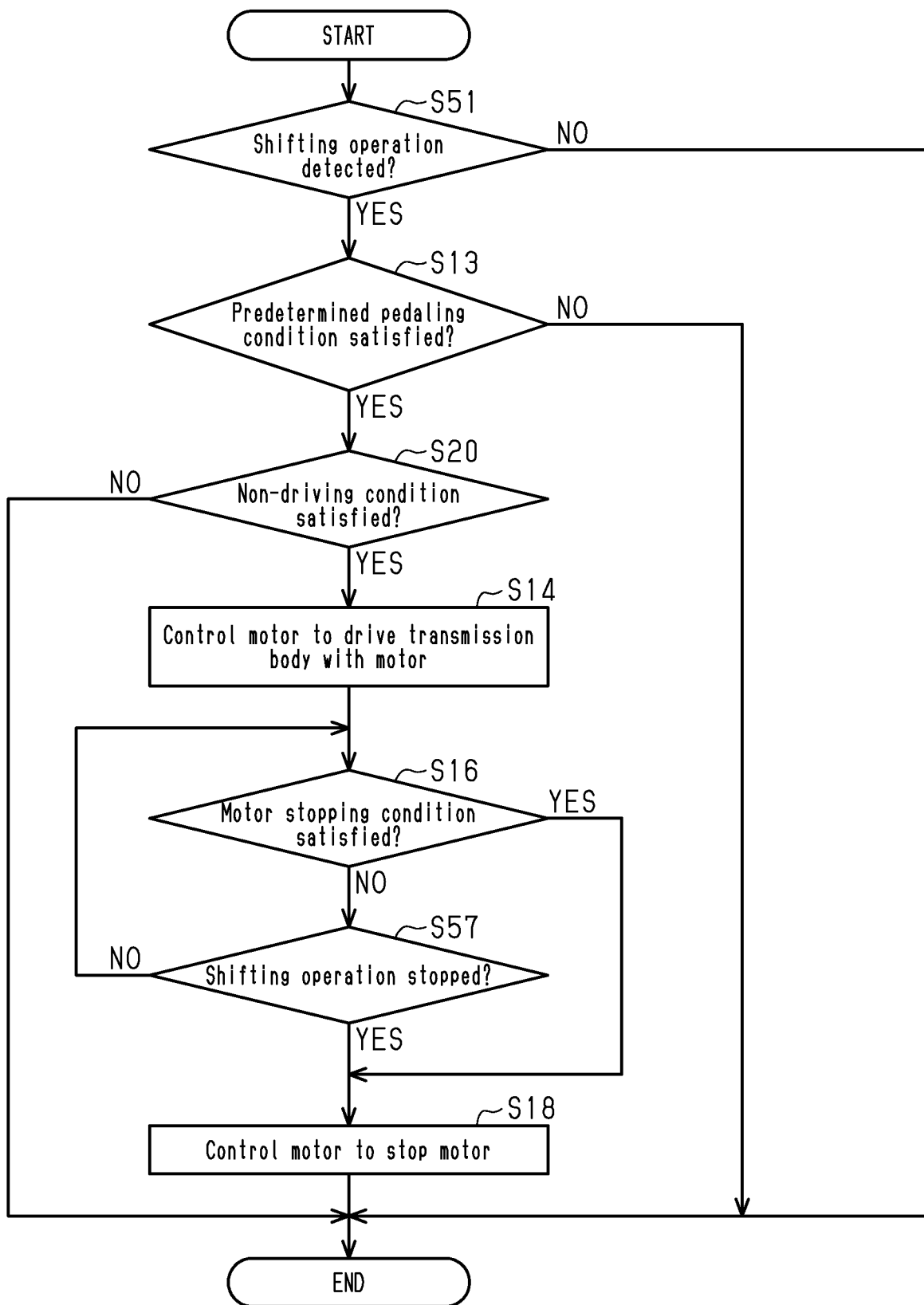
FIG. 10 is a flowchart of a process executed by the electronic controller shown in FIG. 9 for controlling the electric actuator and the motor to change the transmission ratio.

Steps S13, S20, S14, S16, and S18 in the flowchart illustrated in FIG. 10 are executed in the same manner as steps S13, S20, S14, S16, and S18 in the flowchart illustrated in FIG. 5.

In the process shown in FIG. 10, in step S51, upon determining a shifting operation is detected, the controller 72 proceeds to step S13. The controller 72 detects a shifting operation, for example, in a case where output signals of the transmission state sensor 88 change. In step S51, in a case where the shifting operation is not detected, the controller 72 ends the process. In step S51, in a case where the shifting operation is detected, the controller 72 proceeds to step S13. In a case where an affirmative determination is made in step S13, the controller 72 proceeds to step S20. In a case where an affirmative determination is made in step S20, the controller 72 proceeds to step S14.

In step S14, the controller 72 controls the motor 24 and drives the transmission body 20 with the motor 24 and then proceeds to step S16. In a case where a negative determination is made in step S16, the controller 72 proceeds to step S57. In step S57, the controller 72 determines whether the shifting operation is stopped. In step S57, in a case where it is determined that the shifting operation is stopped, the controller 72 proceeds to step S18. If it is determined that the shifting operation is not stopped, the controller 72 proceeds to step S16. In the process shown in FIG. 10, in step S13, in a case where the predetermined condition related to pedaling is not satisfied, the controller 72 ends the process.

Fourth Embodiment

Figure 11:
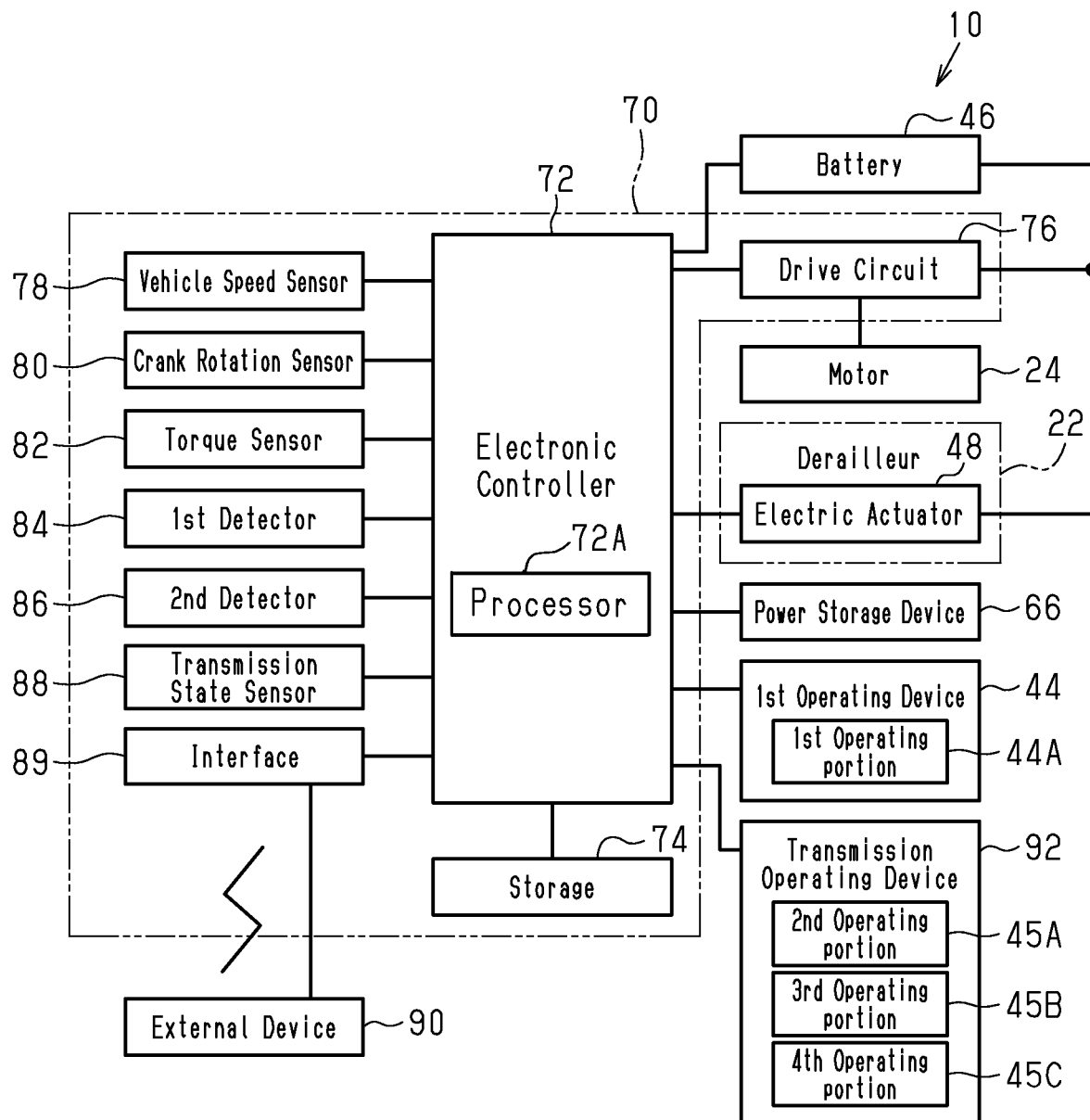
FIG. 11 is a block diagram showing the electrical configuration of the human-powered vehicle including the control device of the third embodiment.
Figure 12:
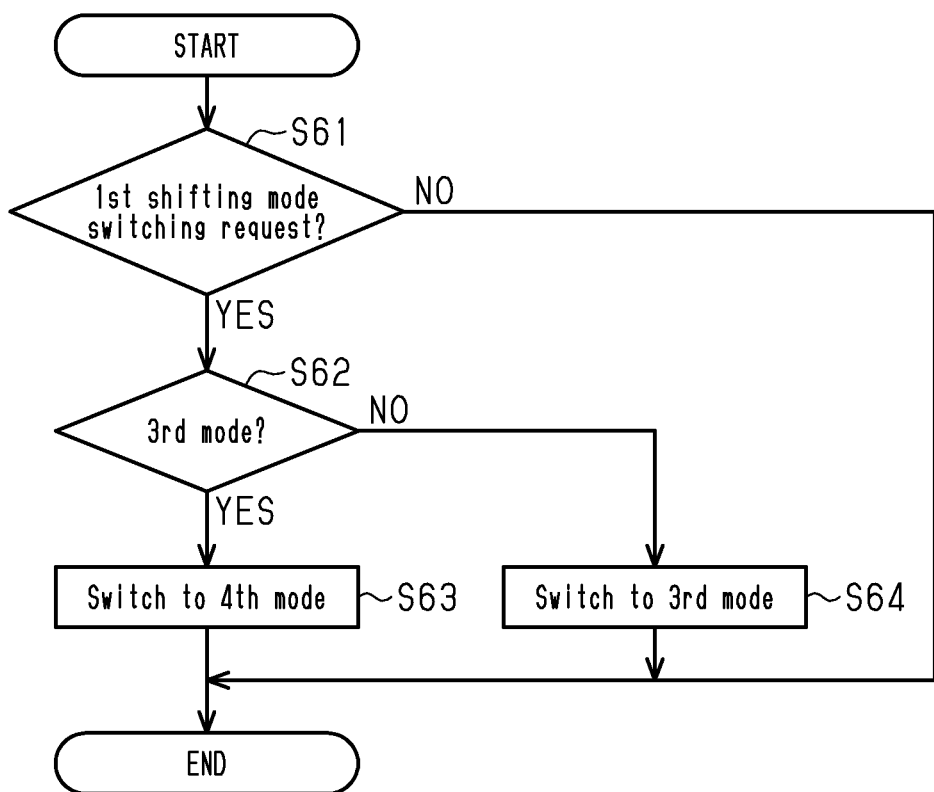
FIG. 12 is a flowchart of a process executed by the electronic controller shown in FIG. 11 for switching between a third mode and a fourth mode in a first shifting mode.

The control device 70 in accordance with a fourth embodiment will now be described with reference to FIGS. 11 and 12. The control device 70 in accordance with the fourth embodiment differs from the control device 70 in accordance with the first embodiment and the second embodiment only in that the controller 72 has a first shifting mode and a second shifting mode. Thus, same reference characters are given to those elements that are the same as the corresponding elements of the first embodiment. Such elements will not be described in detail.

The human-powered vehicle 10 of the present embodiment includes a transmission operating device 92. Preferably, the transmission operating device 92 is configured in the same manner as at least one of the second operating device 45 and the third operating device of the first embodiment. The transmission operating device 92 can differ in configuration from the second operating device 45.

The controller 72 is configured to control the electric actuator 48 and the motor 24. The control device 70 is configured to be switchable between the first shifting mode and the second shifting mode. In the first shifting mode, the electric actuator 48 is controlled in accordance with the state of the human-powered vehicle 10. In the second shifting mode, the electric actuator 48 is controlled in accordance with the operation of the transmission operating device 92 provided on the human-powered vehicle 10. Preferably, the first shifting mode corresponds to the automatic shifting mode of the first embodiment, and the second shifting mode corresponds to the manual shifting mode of the first embodiment. Preferably, the first shifting mode and the second shifting mode are switched through an operation similar to that performed to switch between the automatic shifting mode and the manual shifting mode.

The control device 70 is configured to be switchable between a third mode and a fourth mode in the first shifting mode. In the third mode, the control device 70 is configured to control the motor 24 and drive the transmission body 20 in accordance with the state of the human-powered vehicle 10 upon determining the derailleur 22 has been actuated to change the transmission ratio R and a predetermined condition related to pedaling is satisfied. In the fourth mode, the control device 70 is configured to control the motor 24 so as not to drive the transmission body 20 even upon determining the derailleur 22 has been actuated to change the transmission ratio and the predetermined condition related to pedaling is satisfied.

A process for switching the controller 72 between the third mode and the fourth mode in the first shifting mode will now be described with reference to FIG. 12. In a case where the controller 72 is supplied with electric power, the controller 72 starts the process and proceeds to step S61 of the flowchart illustrated in FIG. 12. Upon completion of the flowchart illustrated in FIG. 12, the controller 72 repeats the process from step S61 in predetermined cycles until the supply of electric power is stopped.

In step S61, the controller 72 determines whether there is a request for switching the first shifting mode. For example, the controller 72 determines that there is a request for switching the first shifting mode in a case where the transmission operating device 92 is operated to switch the first shifting mode. In a case where there is no request for switching the first shifting mode, the controller 72 ends the process. In a case where there is a request for switching the first shifting mode, the controller 72 proceeds to step S62.

In step S62, the controller 72 determines whether the first shifting mode is the third mode. If the first shifting mode is the third mode, the controller 72 proceeds to step S63. In step S63, the controller 72 switches the first shifting mode to the fourth mode and then ends the process.

If it is not in the third mode in step S62, the controller 72 proceeds to step S64. In step S64, the controller 72 switches the first shifting mode to the third mode and then ends the process.

Modifications

The description related to the above embodiments exemplifies, without any intention to limit, applicable forms of a control device for a human-powered vehicle and a power transmission system according to the present disclosure. The control device for a human-powered vehicle and the power transmission system according to the present disclosure can be applied to, for example, modifications of the embodiments that are described below and combinations of at least two of the modifications that do not contradict each other. In the modifications described hereinafter, same reference characters are given to those elements that are the same as the corresponding elements of the above embodiments. Such elements will not be described in detail.

The controller 72 can include at least one of configurations (A5) and (A6) instead of or in addition to at least one of configurations (A1), (A2), (A3), and (A4).

(A5) The controller 72 is configured to control the electric actuator 48 so that the transmission ratio R is changed only in one of an increasing direction and a decreasing direction. The controller 72 can be configured to selectively change the transmission ratio R in the increasing direction or the decreasing direction in a case where the derailleur 22 is actuated to change the transmission ratio R and the predetermined condition related to pedaling is satisfied. In a case where the derailleur 22 is actuated to change the transmission ratio R and the predetermined condition related to pedaling is satisfied, for example, the user operates the first operating device 44 or the external device 90 to selectively change the transmission ratio R in the increasing direction or the decreasing direction.

(A6) The controller 72 is configured to control the electric actuator 48 so that the transmission ratio R is changed in a predetermined shifting range. Information related to the predetermined shifting range is stored in the storage 74. The information related to the predetermined shifting range can be changeably stored in the storage 74. The user operates, for example, the first operating device 44 or the external device 90 to change the information related to the predetermined shifting range stored in the storage 74.

In a first example of configuration (A6), the predetermined shifting range includes a range that is less than or equal to a predetermined third transmission ratio R3. The predetermined third transmission ratio R3 is less than the maximum transmission ratio R of the transmission ratio R that is changeable by the derailleur 22. In a second example of configuration (A6), the predetermined shifting range includes a range that is greater than or equal to a predetermined fourth transmission ratio R4. The predetermined fourth transmission ratio R4 is greater than the minimum transmission ratio R of the transmission ratio R that is changeable by the derailleur 22.

Preferably, in configuration (A6), the controller 72 is configured to control the electric actuator 48 and drive the transmission body 20 with the motor 24 so that the transmission ratio R is changed in the predetermined shifting range in at least one of a case where the derailleur 22 is actuated to change the transmission ratio R, the predetermined condition related to pedaling is satisfied, and the vehicle speed V of the human-powered vehicle 10 is less than or equal to a predetermined sixth speed V6 and a case where the derailleur 22 is actuated to change the transmission ratio R, the predetermined condition related to pedaling is satisfied, and the rotational speed N of the crank axle 12 of the human-powered vehicle 10 is less than or equal to a predetermined third rotational speed N3.

In configuration (A6), the controller 72 can control the electric actuator 48 so that the transmission ratio R is changed in the predetermined shifting range in at least one of a case where the road on which the human-powered vehicle 10 travels changes from an uphill to a downhill and a case where the vehicle speed V of the human-powered vehicle 10 is changed from an increasing state to a decreasing state. In configuration (A6), the controller 72 can control the electric actuator 48 so that the transmission ratio R is changed in the predetermined shifting range in a case where the road on which the human-powered vehicle 10 travels changes from an uphill to a downhill and the vehicle speed V of the human-powered vehicle 10 is changed from an increasing state to a decreasing state.

As long as the controller 72 is configured to control the motor 24 and drive the transmission body 20 with the motor 24 so as to increase the rotational speed of the motor 24 as the difference of the first rotational speed N1, which is calculated in correspondence with the rotational speed of the wheel and the transmission ratio R, and the predetermined rotational speed or the rotational speed in the predetermined range increases in a case where the derailleur 22 is actuated to change the transmission ratio R and the predetermined condition related to pedaling is satisfied, other configurations can be omitted. In this modification, the derailleur 22 can be configured to include or not to include the electric actuator 48.

Figure 13:
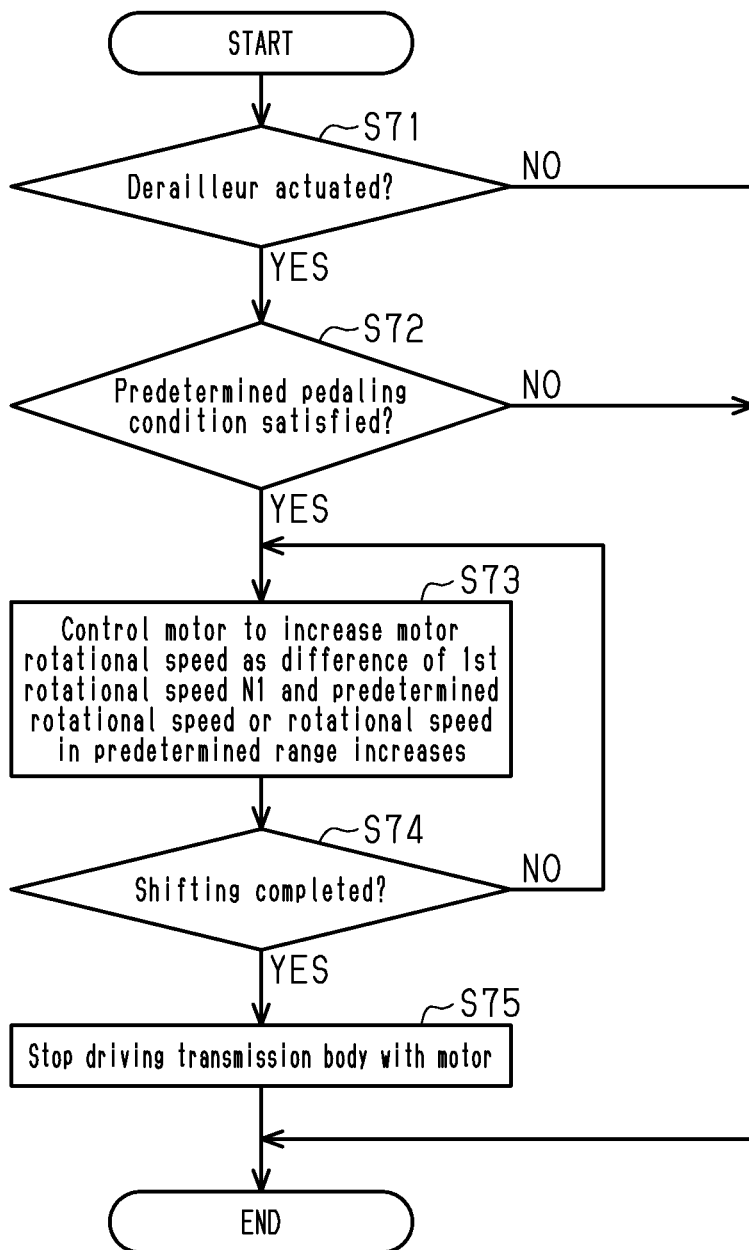
FIG. 13 is a flowchart of a process executed by a first modification of an electronic controller for controlling the electric actuator and the motor to change the transmission ratio.

A process of the controller 72 for controlling the motor 24 to change the transmission ratio R will be described with reference to FIG. 13. In a case where the controller 72 is supplied with electric power, the controller 72 starts the process and proceeds to step S71 of the flowchart illustrated in FIG. 13. Upon completion of the flowchart illustrated in FIG. 13, the controller 72 repeats the process from step S71 in predetermined cycles until the supply of electric power is stopped.

In step S71, the controller 72 determines whether the derailleur 22 is actuated. For example, in a case where the shifting execution condition of the first embodiment is satisfied, the controller 72 determines that the derailleur 22 is actuated. Preferably, in a case where the shifting execution condition is satisfied and shifting is performable, the controller 72 determines that the derailleur 22 is actuated. For example, in step S71, the controller 72 executes the same process as steps S11, S12, and S10 shown in FIG. 5 of the first embodiment. In a case where an affirmative determination is made in step S11 and an affirmative determination is made in step S10, the controller 72 determines that the derailleur 22 is actuated. The controller 72 can determine whether the derailleur 22 is actuated in correspondence with an output of a sensor that detects movement of the derailleur 22, a sensor that detects movement of the Bowden cable, or a sensor that detects movement of the transmission operating device 92. In a case where the derailleur 22 is not actuated, the controller 72 ends the process. In a case where the derailleur 22 is actuated, the controller 72 proceeds to step S72.

In step S72, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S73.

In step S73, the controller 72 controls the motor 24 so as to increase the rotational speed of the motor 24 as the difference of the first rotational speed N1 and the predetermined rotational speed or the rotational speed in the predetermined range increases, and then proceeds to step S74. In step S73, the controller 72 controls the motor 24 and drives the transmission body 20 with the motor 24.

In step S74, the controller 72 determines whether shifting is completed. In a case where shifting is not completed, the controller 72 proceeds to step S73. In a case where shifting is completed, the controller 72 proceeds to step S75. In step S75, the controller 72 stops driving the transmission body 20 with the motor 24 and ends the process.

As long as the controller 72 is configured to control the motor 24 and drive the transmission body 20 with the motor 24 so as to change the rotational speed of the motor 24 in correspondence with acceleration of the human-powered vehicle 10 in the traveling direction and increase the rotational speed of the motor 24 as the acceleration of the human-powered vehicle 10 increases in a case where the derailleur 22 is actuated to change the transmission ratio R and the predetermined condition related to pedaling is satisfied, other configurations can be omitted. In this modification, the derailleur 22 can be configured to include or not to include the electric actuator 48.

Figure 14:
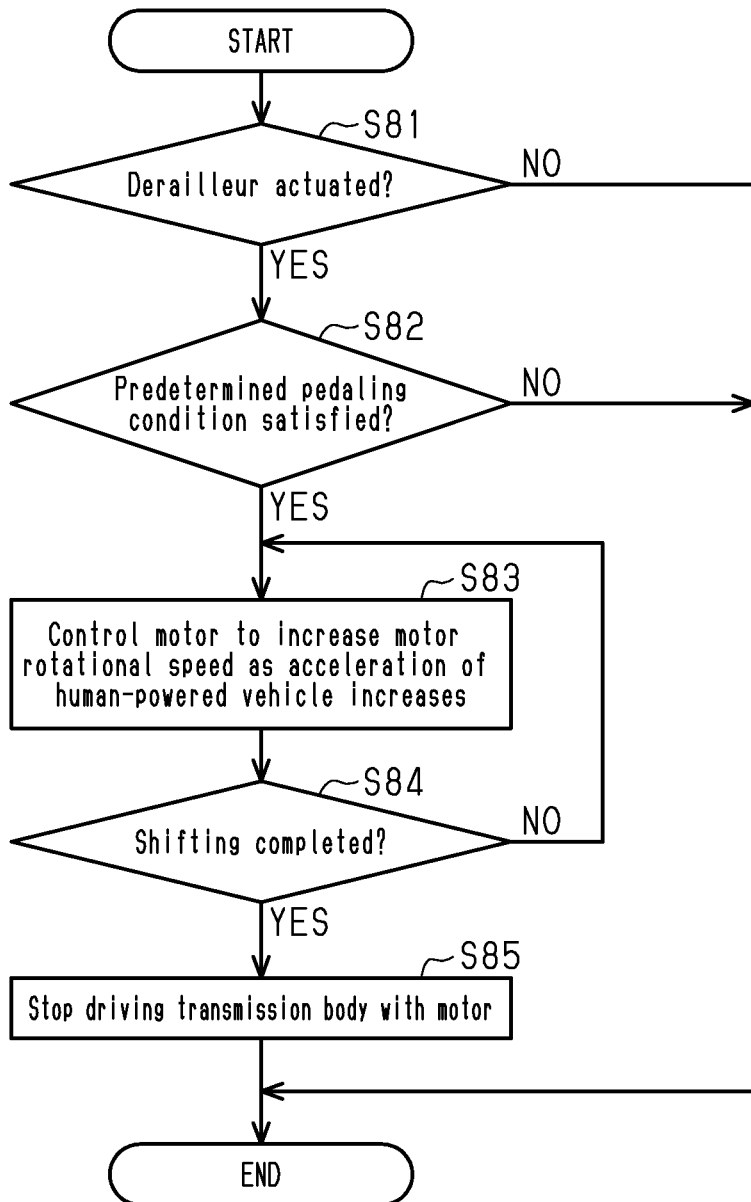
FIG. 14 is a flowchart of a process executed by a second modification of an electronic controller for controlling an electric actuator and a motor to change the transmission ratio.

A process of the controller 72 for controlling the motor 24 to change the transmission ratio R will be described with reference to FIG. 14. In a case where the controller 72 is supplied with electric power, the controller 72 starts the process and proceeds to step S81 of the flowchart illustrated in FIG. 14. Upon completion of the flowchart illustrated in FIG. 14, the controller 72 repeats the process from step S81 in predetermined cycles until the supply of electric power is stopped.

In step S81, the controller 72 determines whether the derailleur 22 is actuated. In step S81, the controller 72 executes, for example, the same process as step S71 shown in FIG. 13. In a case where the derailleur 22 is not actuated, the controller 72 ends the process. In a case where the derailleur 22 is actuated, the controller 72 proceeds to step S82.

In step S82, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S83.

In step S83, the controller 72 controls the motor 24 so as to increase the rotational speed of the motor 24 as the acceleration of the human-powered vehicle 10 increases, and then proceeds to step S84. In step S83, the controller 72 controls the motor 24 and drives the transmission body 20 with the motor 24.

In step S84, the controller 72 determines whether shifting is completed. In a case where shifting is not completed, the controller 72 proceeds to step S83. In a case where shifting is completed, the controller 72 proceeds to step S85. In step S85, the controller 72 stops driving the transmission body 20 with the motor 24 and ends the process.

As long as the controller 72 is configured to control the motor 24 and drive the transmission body 20 with the motor 24 to change at least one of the rotational angle of the motor 24 and the output torque of the motor 24 in correspondence with the state of the human-powered vehicle 10 in a case where the derailleur 22 is actuated to change the transmission ratio R and the predetermined condition related to pedaling is satisfied, other configurations can be omitted. In this modification, the derailleur 22 can be configured to include or not to include the electric actuator 48.

Figure 15:
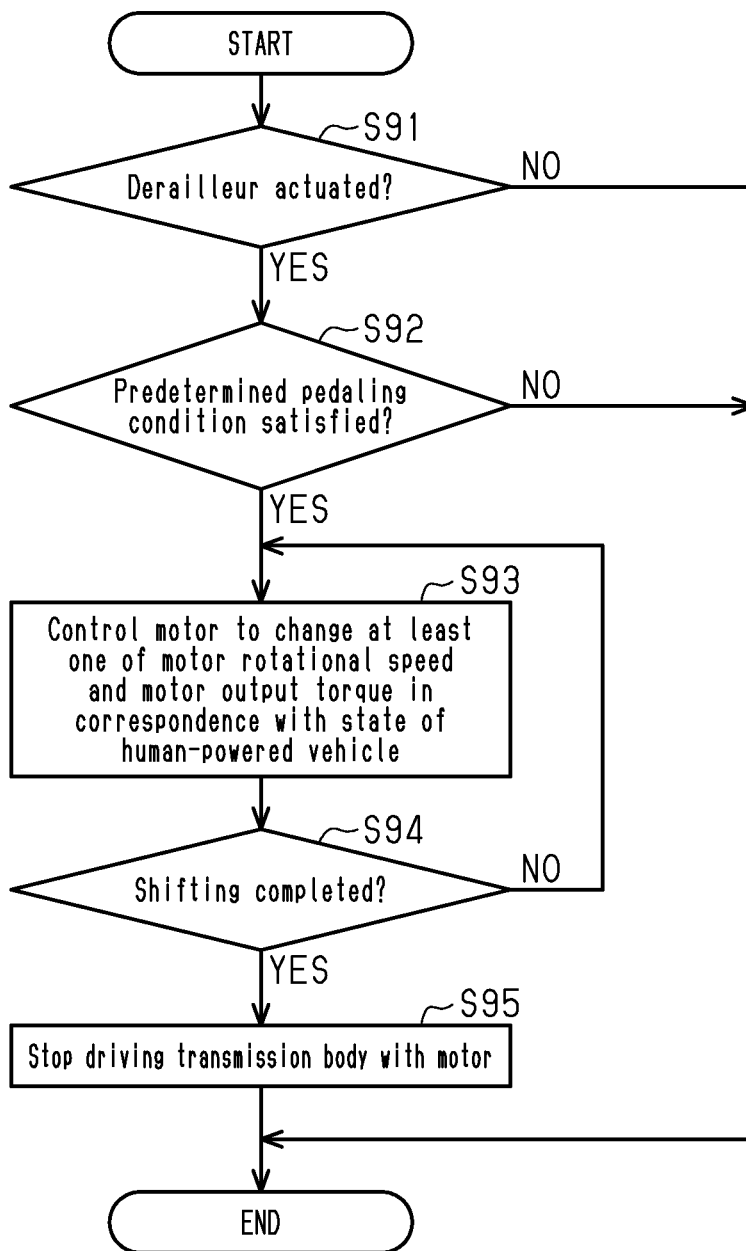
FIG. 15 is a flowchart of a process executed by a third modification of an electronic controller for controlling an electric actuator and a motor to change the transmission ratio.

A process of the controller 72 for controlling the motor 24 to change the transmission ratio R will be described with reference to FIG. 15. In a case where the controller 72 is supplied with electric power, the controller 72 starts the process and proceeds to step S91 of the flowchart illustrated in FIG. 15. Upon completion of the flowchart illustrated in FIG. 15, the controller 72 repeats the process from step S91 in predetermined cycles until the supply of electric power is stopped.

In step S91, the controller 72 determines whether the derailleur 22 is actuated. In step S91, the controller 72 executes, for example, the same process as step S71 shown in FIG. 13. In a case where the derailleur 22 is not actuated, the controller 72 ends the process. In a case where the derailleur 22 is actuated, the controller 72 proceeds to step S92.

In step S92, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S93.

In step S93, the controller 72 controls the motor 24 to change at least one of the rotational speed of the motor 24 and the output torque of the motor 24 in correspondence with the state of the human-powered vehicle 10 and then proceeds to step S84. In step S93, the controller 72 controls the motor 24 and drives the transmission body 20 with the motor 24. In step S93, in a first example, the state of the human-powered vehicle 10 includes the rotational speed of the wheel 16 and the transmission ratio R. The controller 72 is configured to control the motor 24 to increase at least one of the rotational speed and the output torque of the motor 24 as the difference of the first rotational speed N1 and the predetermined rotational speed or the rotational speed in the predetermined range increases.

In step S93, in a second example, the state of the human-powered vehicle 10 includes a change in the vehicle speed V of the human-powered vehicle 10 or a change in the rotational speed of the wheel 16. The controller 72 is configured to control the motor 24 to increase at least one of the rotational speed and the output torque of the motor 24 as the acceleration or deceleration of the human-powered vehicle 10 increases in a traveling direction or the acceleration or deceleration of the rotational speed of the wheel 16 increases in a rotational direction corresponding to the traveling direction of the human-powered vehicle 10.

In step S94, the controller 72 determines whether shifting is completed. In a case where shifting is not completed, the controller 72 proceeds to step S93. In a case where shifting is completed, the controller 72 proceeds to step S95. In step S95, the controller 72 stops driving the transmission body 20 with the motor 24 and ends the process.

As long as the controller 72 is configured to control the motor 24 and drive the transmission body 20 with the motor 24 in a case where the derailleur 22 is actuated to change the transmission ratio R and the predetermined condition related to pedaling is satisfied, and is configured to control the motor 24 so as not to drive the transmission body 20 if the first operating device 44 is operated even in a case where the derailleur 22 is actuated to change the transmission ratio R and the predetermined condition related to pedaling is satisfied, other configurations can be omitted. In this modification, the derailleur 22 can be configured to include or not to include the electric actuator 48.

Figure 16:
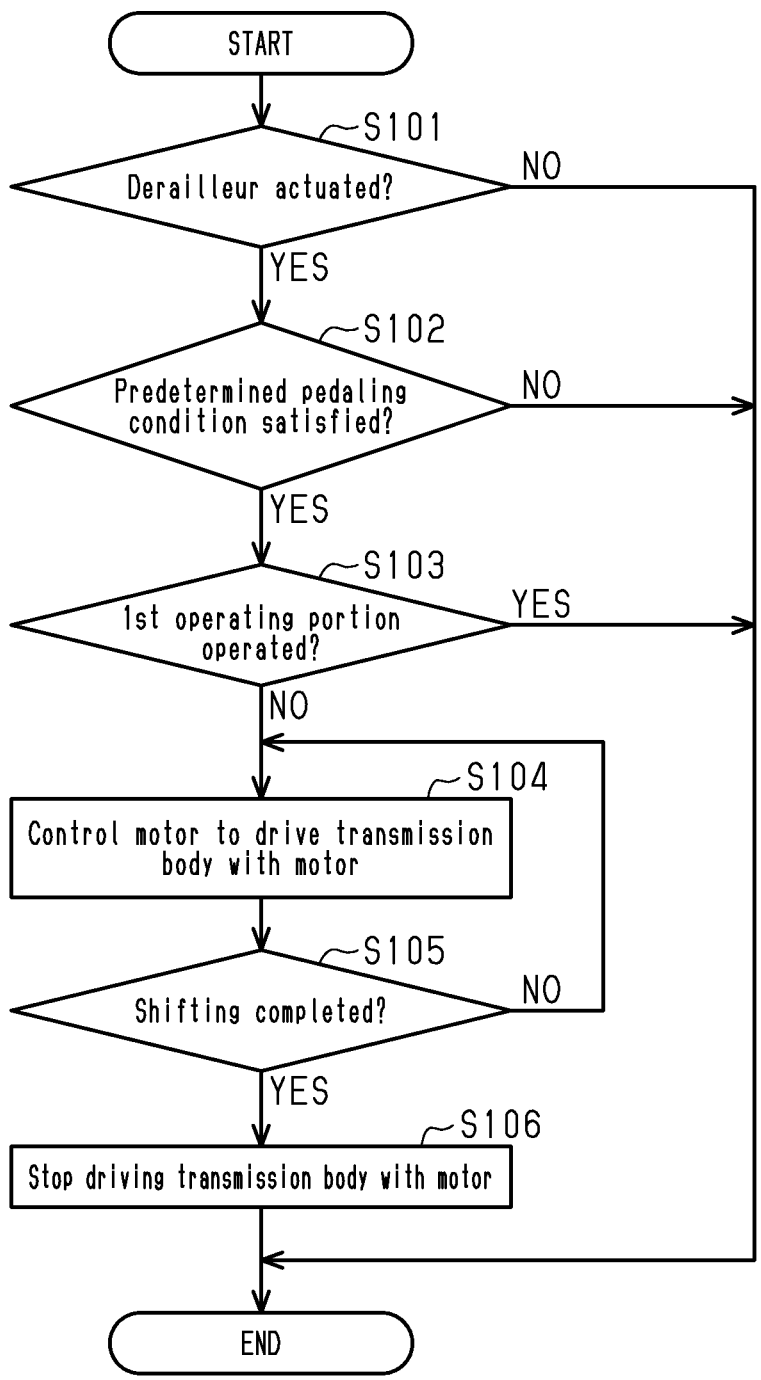
FIG. 16 is a flowchart of a process executed by a fourth modification of an electronic controller for controlling an electric actuator and a motor to change the transmission ratio.

A process of the controller 72 for controlling the motor 24 to change the transmission ratio R will be described with reference to FIG. 16. In a case where the controller 72 is supplied with electric power, the controller 72 starts the process and proceeds to step S101 of the flowchart illustrated in FIG. 16. Upon completion of the flowchart illustrated in FIG. 16, the controller 72 repeats the process from step S101 in predetermined cycles until the supply of electric power is stopped.

In step S101, the controller 72 determines whether the derailleur 22 is actuated. In step S101, the controller 72 executes, for example, the same process as step S71 shown in FIG. 13. In a case where the derailleur 22 is not actuated, the controller 72 ends the process. In a case where the derailleur 22 is actuated, the controller 72 proceeds to step S102.

In step S102, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S103.

In step S103, the controller 72 determines whether the first operating device 44 is operated. In a case where the first operating device 44 is operated, the controller 72 ends the process. In a case where the first operating device 44 is not operated, the controller 72 proceeds to step S104.

In step S104, the controller 72 controls the motor 24 and drives the transmission body 20 with the motor 24 and then proceeds to step S105.

In step S105, the controller 72 determines whether shifting is completed. In a case where shifting is not completed, the controller 72 proceeds to step S104. In a case where shifting is completed, the controller 72 proceeds to step S106. In step S106, the controller 72 stops driving the transmission body 20 with the motor 24 and ends the process.

As long as the controller 72 is configured to control the motor 24 and drive the transmission body 20 with the motor 24 in a case where the derailleur 22 is actuated to change the transmission ratio R and the predetermined condition related to pedaling is satisfied, and stop driving the transmission body 20 with the motor 24 in correspondence with the load L of the motor 24, other configurations can be omitted. In this modification, the derailleur 22 can be configured to include or not to include the electric actuator 48.

Figure 17:
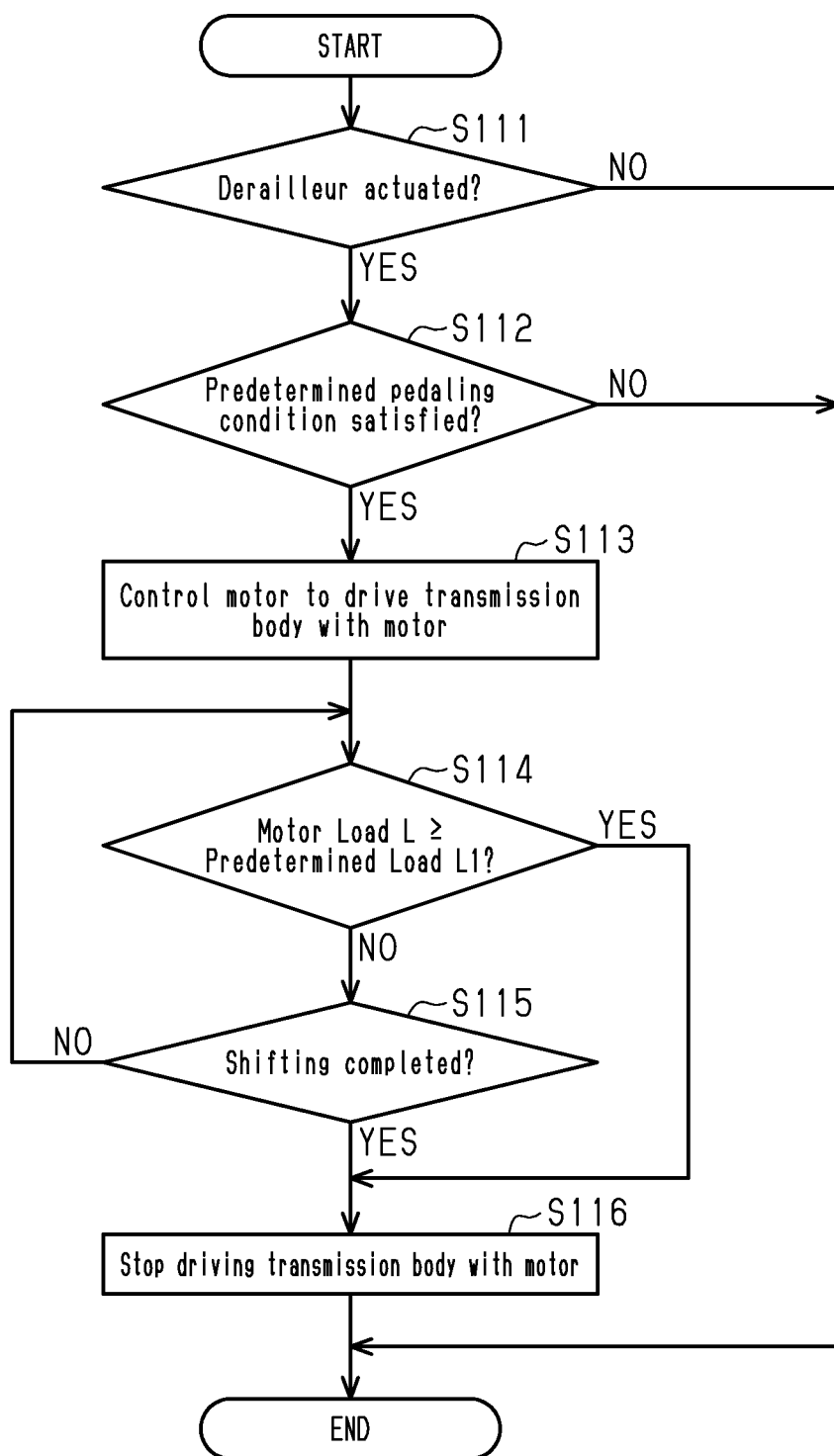
FIG. 17 is a flowchart of a process executed by a fifth modification of an electronic controller for controlling an electric actuator and a motor to change the transmission ratio.

A process of the controller 72 for controlling the motor 24 to change the transmission ratio R will be described with reference to FIG. 17. In a case where the controller 72 is supplied with electric power, the controller 72 starts the process and proceeds to step S111 of the flowchart illustrated in FIG. 17. Upon completion of the flowchart illustrated in FIG. 17, the controller 72 repeats the process from step S111 in predetermined cycles until the supply of electric power is stopped.

In step S111, the controller 72 determines whether the derailleur 22 is actuated. In step S111, the controller 72 executes, for example, the same process as step S71 shown in FIG. 13. In a case where the derailleur 22 is not actuated, the controller 72 ends the process. In a case where the derailleur 22 is actuated, the controller 72 proceeds to step S112.

In step S112, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S113.

In step S113, the controller 72 controls the motor 24 and drives the transmission body 20 with the motor 24 and then proceeds to step S114. In step S114, the controller 72 determines whether the load L of the motor 24 is greater than or equal to the predetermined load L1. In a case where the load L of the motor 24 is greater than or equal to the predetermined load L1, the controller 72 proceeds to step S116. In a case where the load L of the motor 24 is not greater than or equal to the predetermined load L1, the controller 72 proceeds to step S115.

In step S115, the controller 72 determines whether shifting is completed. In a case where shifting is not completed, the controller 72 proceeds to step S114. In a case where shifting is completed, the controller 72 proceeds to step S116. In step S116, the controller 72 stops driving the transmission body 20 with the motor 24 and ends the process.

As long as the controller 72 is configured to control the motor 24 and drive the transmission body 20 with the motor 24 in a case where the derailleur 22 is actuated to change the transmission ratio R and the predetermined condition related to pedaling is satisfied, and stop driving the transmission body 20 in a case where the vehicle speed V of the human-powered vehicle 10 becomes less than or equal to the first speed V1 or the rotational speed of the wheel 16 becomes less than or equal to a predetermined rotational speed, other configurations can be omitted. In this modification, the derailleur 22 can be configured to include or not to include the electric actuator 48.

Figure 18:
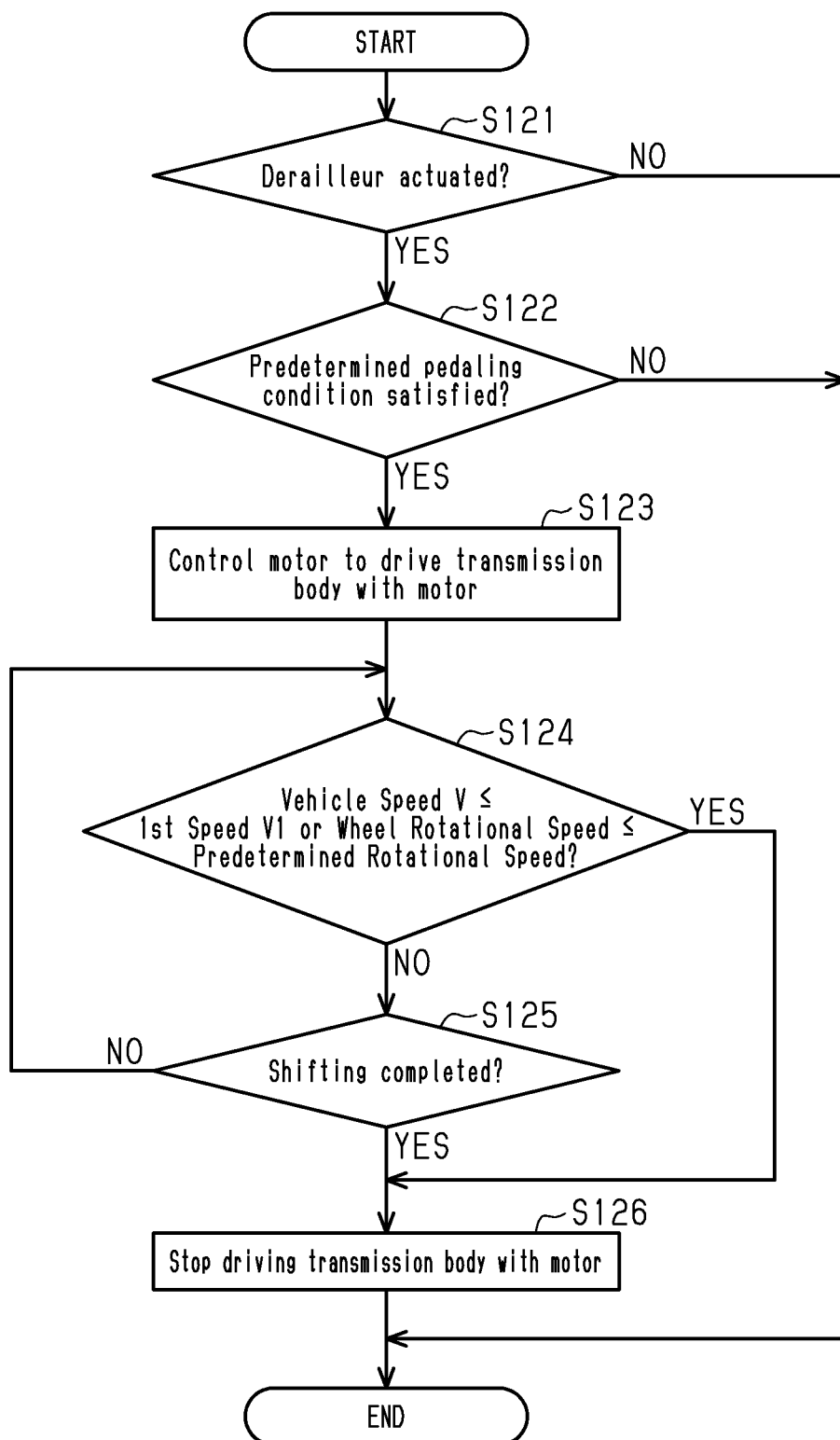
FIG. 18 is a flowchart of a process executed by a sixth modification of an electronic controller for controlling an electric actuator and a motor to change the transmission ratio.

A process of the controller 72 for controlling the motor 24 to change the transmission ratio R will be described with reference to FIG. 18. In a case where the controller 72 is supplied with electric power, the controller 72 starts the process and proceeds to step S121 of the flowchart illustrated in FIG. 18. Upon completion of the flowchart illustrated in FIG. 18, the controller 72 repeats the process from step S121 in predetermined cycles until the supply of electric power is stopped.

In step S121, the controller 72 determines whether the derailleur 22 is actuated. In step S121, the controller 72 executes, for example, the same process as step S71 shown in FIG. 13. In a case where the derailleur 22 is not actuated, the controller 72 ends the process. In a case where the derailleur 22 is actuated, the controller 72 proceeds to step S122.

In step S122, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S123.

In step S123, the controller 72 controls the motor 24 and drives the transmission body 20 with the motor 24 and then proceeds to step S124. In step S124, the controller 72 determines whether the vehicle speed V is less than or equal to the first speed V1 or the rotational speed of the wheel 16 is less than or equal to the predetermined rotational speed. In a case where the load of the motor 24 is greater than or equal to the predetermined load, the controller 72 proceeds to step S126. In a case where the vehicle speed V is not less than or equal to the first speed V1 and the rotational speed of the wheel 16 is not less than or equal to the predetermined rotational speed, the controller 72 proceeds to step S125. In step S124, the controller 72 can proceed to step S126 in a case where the vehicle speed V is less than or equal to the first speed V1 and the rotational speed of the wheel 16 is less than or equal to the predetermined rotational speed.

In step S125, the controller 72 determines whether shifting is completed. In a case where shifting is not completed, the controller 72 proceeds to step S124. In a case where shifting is completed, the controller 72 proceeds to step S126. In step S126, the controller 72 stops driving the transmission body 20 with the motor 24 and ends the process.

As long as the controller 72 is configured to control the electric actuator 48 and drive the transmission body 20 with the motor 24 so that the transmission ratio R is changed only in one of the increasing direction and the decreasing direction in a case where the derailleur 22 is actuated to change the transmission ratio R and the predetermined condition related to pedaling is satisfied, other configurations can be omitted. In this modification, the derailleur 22 includes the electric actuator 48.

Figure 19:
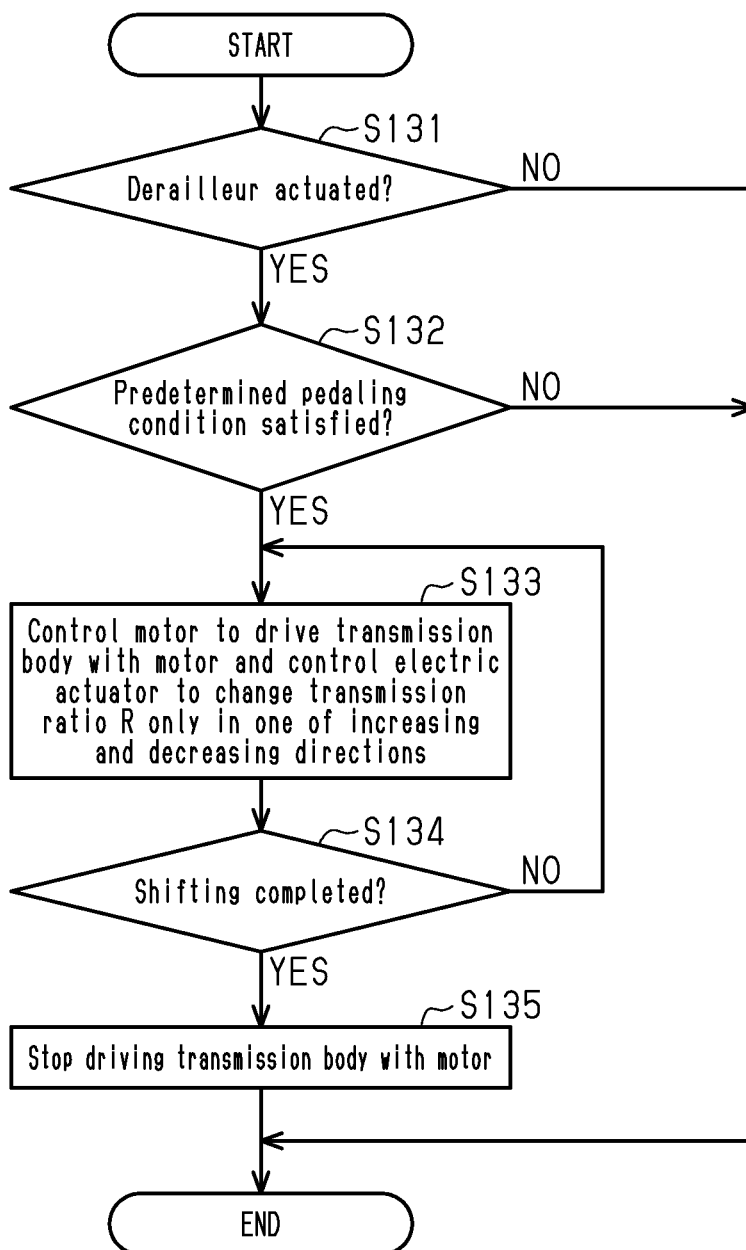
FIG. 19 is a flowchart of a process executed by a seventh modification of an electronic controller for controlling an electric actuator and a motor to change the transmission ratio.

A process of the controller 72 for controlling the motor 24 and the electric actuator 48 to change the transmission ratio R will be described with reference to FIG. 19. In a case where the controller 72 is supplied with electric power, the controller 72 starts the process and proceeds to step S131 of the flowchart illustrated in FIG. 19. Upon completion of the flowchart illustrated in FIG. 19, the controller 72 repeats the process from step S131 in predetermined cycles until the supply of electric power is stopped.

In step S131, the controller 72 determines whether the derailleur 22 is actuated. For example, in a case where the shifting execution condition of the first embodiment is satisfied, the controller 72 determines that the derailleur 22 is actuated. Preferably, in a case where the shifting execution condition is satisfied and shifting is performable, the controller 72 determines that the derailleur 22 is actuated. For example, in step S131, the controller 72 executes the same process as steps S11, S12, and S10 shown in FIG. 5 of the first embodiment. In a case where an affirmative determination is made in step S11 and an affirmative determination is made in step S10, the controller 72 determines that the derailleur 22 is actuated. In a case where the derailleur 22 is not actuated, the controller 72 ends the process. In a case where the derailleur 22 is actuated, the controller 72 proceeds to step S132.

In step S132, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S133.

In step S133, the controller 72 controls the electric actuator 48 and drives the transmission body 20 with the motor 24 so that the transmission ratio R is changed only in one of the increasing direction and the decreasing direction, and then proceeds to step S134.

In step S134, the controller 72 determines whether shifting is completed. In a case where shifting is not completed, the controller 72 proceeds to step S133. In a case where shifting is completed, the controller 72 proceeds to step S135. In step S135, the controller 72 stops driving the transmission body 20 with the motor 24 and ends the process.

As long as the controller 72 is configured to control the electric actuator 48 to change the transmission ratio R in the predetermined shifting range and configured to drive the transmission body 20 with the motor 24 in a case where the derailleur 22 is actuated to change the transmission ratio R and the predetermined condition related to pedaling is satisfied, other configurations can be omitted. In this modification, the derailleur 22 includes the electric actuator 48.

Figure 20:
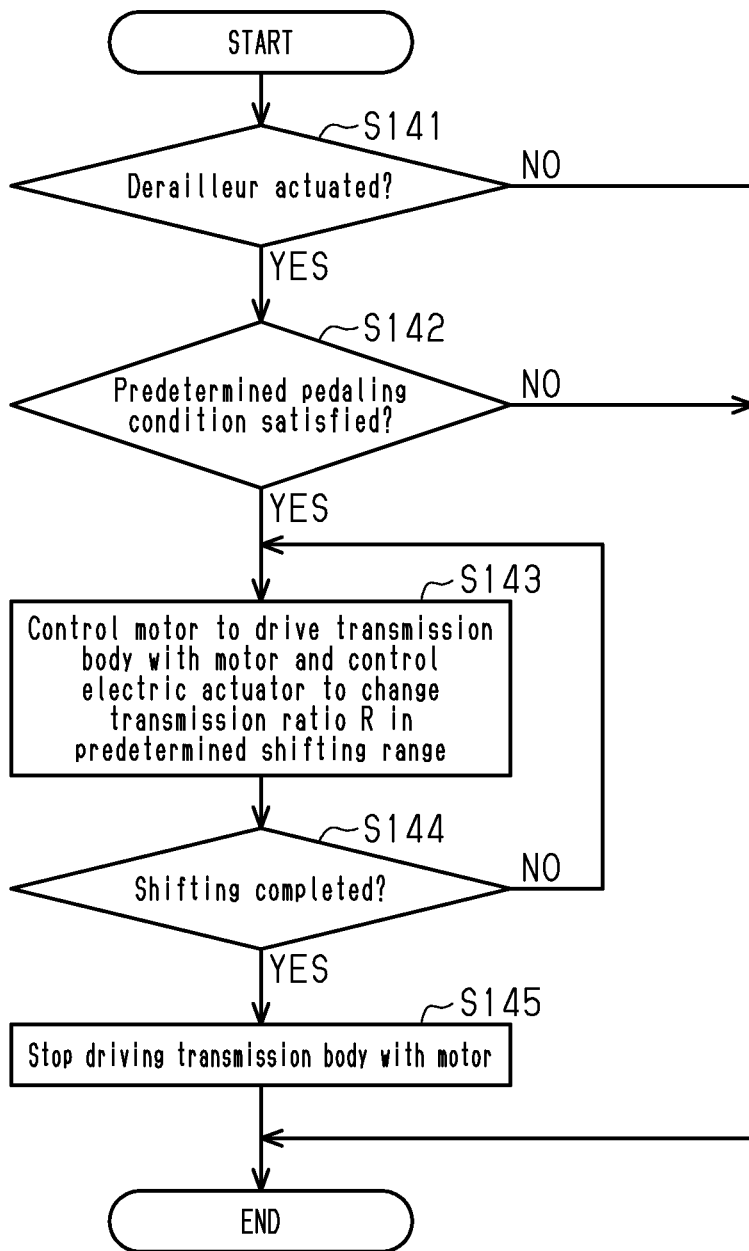
FIG. 20 is a flowchart of a process executed by an eighth modification of an electronic controller for controlling an electric actuator and a motor to change the transmission ratio.

A process of the controller 72 for controlling the motor 24 and the electric actuator 48 to change the transmission ratio R will be described with reference to FIG. 20. In a case where the controller 72 is supplied with electric power, the controller 72 starts the process and proceeds to step S141 of the flowchart illustrated in FIG. 20. Upon completion of the flowchart illustrated in FIG. 20, the controller 72 repeats the process from step S141 in predetermined cycles until the supply of electric power is stopped.

In step S141, the controller 72 determines whether the derailleur 22 is actuated. In step S141, the controller 72 executes, for example, the same process as step S131 shown in FIG. 19. In a case where the derailleur 22 is not actuated, the controller 72 ends the process. In a case where the derailleur 22 is actuated, the controller 72 proceeds to step S142.

In step S142, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S143.

In step S143, the controller 72 controls the electric actuator 48 and drives the transmission body 20 with the motor 24 so that the transmission ratio R is changed in the predetermined shifting range, and then proceeds to step S144.

In step S144, the controller 72 determines whether shifting is completed. In a case where shifting is not completed, the controller 72 proceeds to step S143. In a case where shifting is completed, the controller 72 proceeds to step S145. In step S145, the controller 72 stops driving the transmission body 20 with the motor 24 and ends the process.

As long as the controller 72 is configured to be switchable between the first shifting mode, which controls the electric actuator 48 in accordance with the state of the human-powered vehicle 10, and the second shifting mode, which controls the electric actuator 48 in accordance with operation of the transmission operating device provided on the human-powered vehicle 10, configured to be switchable between the third mode and the fourth mode in the first shifting mode, and configured in the third mode to control the motor 24 and drive the transmission body 20 in accordance with the state of the human-powered vehicle 10 in a case where the derailleur 22 is actuated to change the transmission ratio R and the predetermined condition related to pedaling is satisfied, and configured in the fourth mode to control the motor 24 so as not to drive the transmission body 20 even in a case where the derailleur 22 is actuated to change the transmission ratio R and the predetermined condition related to pedaling is satisfied, other configurations can be omitted. In this modification, the derailleur 22 includes the electric actuator 48.

A process of the controller 72 for controlling the motor 24 to change the transmission ratio R will be described with reference to FIG. 21. In a case where the controller 72 is supplied with electric power, the controller 72 starts the process and proceeds to step S151 of the flowchart illustrated in FIG. 21. Upon completion of the flowchart illustrated in FIG. 21, the controller 72 repeats the process from step S151 in predetermined cycles until the supply of electric power is stopped.

In step S151, the controller 72 determines whether the derailleur 22 is actuated. In step S151, the controller 72 executes, for example, the same process as step S71 shown in FIG. 13. In a case where the derailleur 22 is not actuated, the controller 72 ends the process. In a case where the derailleur 22 is actuated, the controller 72 proceeds to step S152.

In step S152, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S153. In step S153, the controller 72 determines whether the first shifting mode is the fourth mode. In a case where the first shifting mode is the fourth mode, the controller 72 ends the process. In a case where the first shifting mode is not the fourth mode, the controller 72 proceeds to step S154. In step S154, the controller 72 controls the motor 24 and drives the transmission body 20 with the motor 24 and then proceeds to step S155.

In step S155, the controller 72 determines whether shifting is completed. In a case where shifting is not completed, the controller 72 proceeds to step S154. In a case where shifting is completed, the controller 72 proceeds to step S156. In step S156, the controller 72 stops driving the transmission body 20 with the motor 24 and ends the process.

Figure 21:
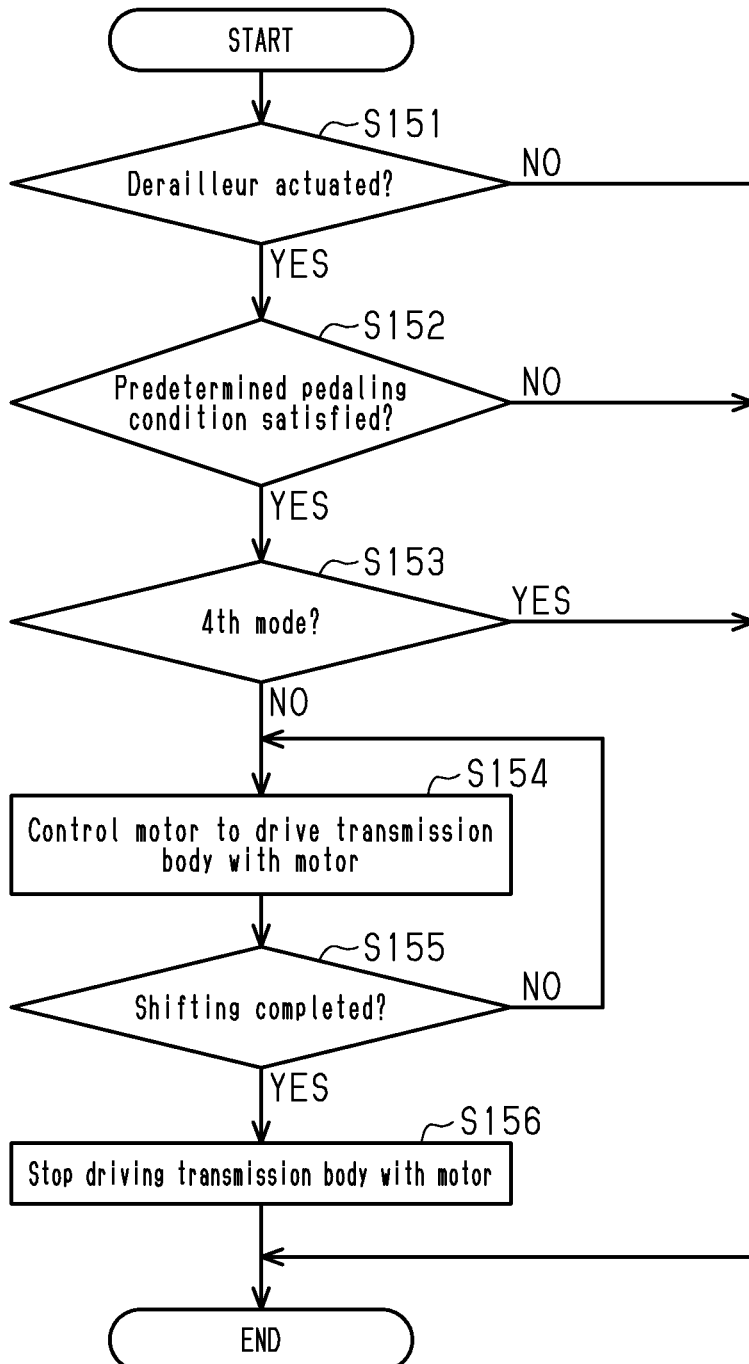
FIG. 21 is a flowchart of a process executed by a ninth modification of an electronic controller for controlling an electric actuator and a motor to change the transmission ratio.

The controller 72 can control the electric actuator 48 using a process different from the flowchart illustrated in FIG. 21 or can control the electric actuator 48 using the flowchart illustrated in FIG. 21. For example, in step S154, the electric actuator 48 is controlled.

As long as the controller 72 is configured to control the electric actuator 48 and the motor 24 so that the first rotational speed N1, which is calculated in correspondence with the rotational speed of the wheel 16 and the transmission ratio R, is included in the predetermined range, configured to drive the transmission body 20 with the motor 24 in a case where the derailleur 22 is actuated to change the transmission ratio R and the predetermined condition related to pedaling is satisfied, and configured to control the electric actuator 48 so that among a plurality of shift stages of the derailleur 22, the transmission ratio R is set to be in the largest shift stage in a case where the first rotational speed N1 is included in the predetermined range, other configurations can be omitted. In this modification, the derailleur 22 includes the electric actuator 48.

Figure 22:
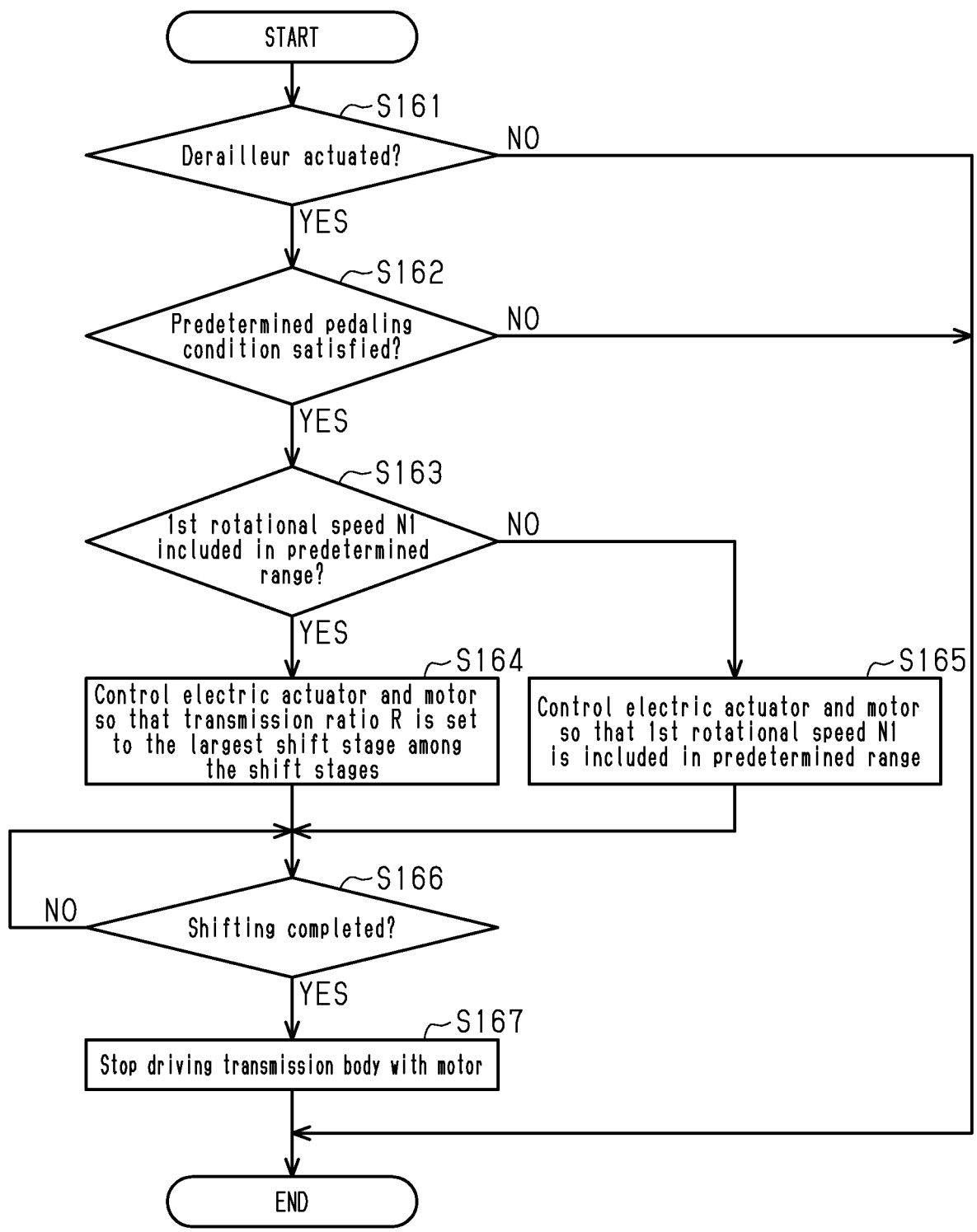
FIG. 22 is a flowchart of a process executed by a tenth modification of an electronic controller for controlling an electric actuator and a motor to change the transmission ratio.

A process of the controller 72 for controlling the motor 24 and the electric actuator 48 to change the transmission ratio R will be described with reference to FIG. 22. In a case where the controller 72 is supplied with electric power, the controller 72 starts the process and proceeds to step S161 of the flowchart illustrated in FIG. 22. Upon completion of the flowchart illustrated in FIG. 22, the controller 72 repeats the process from step S161 in predetermined cycles until the supply of electric power is stopped.

In step S161, the controller 72 determines whether the derailleur 22 is actuated. In step S161, the controller 72 executes, for example, the same process as step S131 shown in FIG. 19. In a case where the derailleur 22 is not actuated, the controller 72 ends the process. In a case where the derailleur 22 is actuated, the controller 72 proceeds to step S162.

In step S162, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S163.

In step S163, the controller 72 determines whether the first rotational speed N1 is included in the predetermined range. In a case where the first rotational speed N1 is included in the predetermined range, the controller 72 proceeds to step S164. In step S164, the controller 72 controls the electric actuator 48 and the motor 24 so that among a plurality of shift stages, the transmission ratio R is set to be in the largest shift stage, and then proceeds to step S166. In step S164, the controller 72 controls the motor 24 and drives the transmission body 20 with the motor 24.

In step S163, in a case where the first rotational speed N1 is not included in the predetermined range, the controller 72 proceeds to step S165. In step S165, the controller 72 controls the electric actuator 48 and the motor 24 so that the first rotational speed N1 is included in the predetermined range, and proceeds to step S166. In step S165, the controller 72 controls the motor 24 and drives the transmission body 20 with the motor 24.

In step S166, the controller 72 determines whether shifting is completed. In a case where shifting is not completed, the controller 72 again executes S166. In a case where shifting is completed, the controller 72 proceeds to step S167. In step S167, the controller 72 stops driving the transmission body 20 with the motor 24 and ends the process.

As long as the controller 72 is configured to control the motor 24 and drive the transmission body 20 with the motor 24 in a case where the derailleur 22 is actuated to change the transmission ratio R and a predetermined condition related to pedaling is satisfied, and configured to control the electric actuator 48 so as not to increase the transmission ratio R in a case where the vehicle speed V of the human-powered vehicle 10 is greater than or equal to the second speed V2 or the rotational speed of the wheel 16 is greater than or equal to the predetermined rotational speed, other configurations can be omitted. In this modification, the derailleur 22 includes the electric actuator 48.

Figure 23:
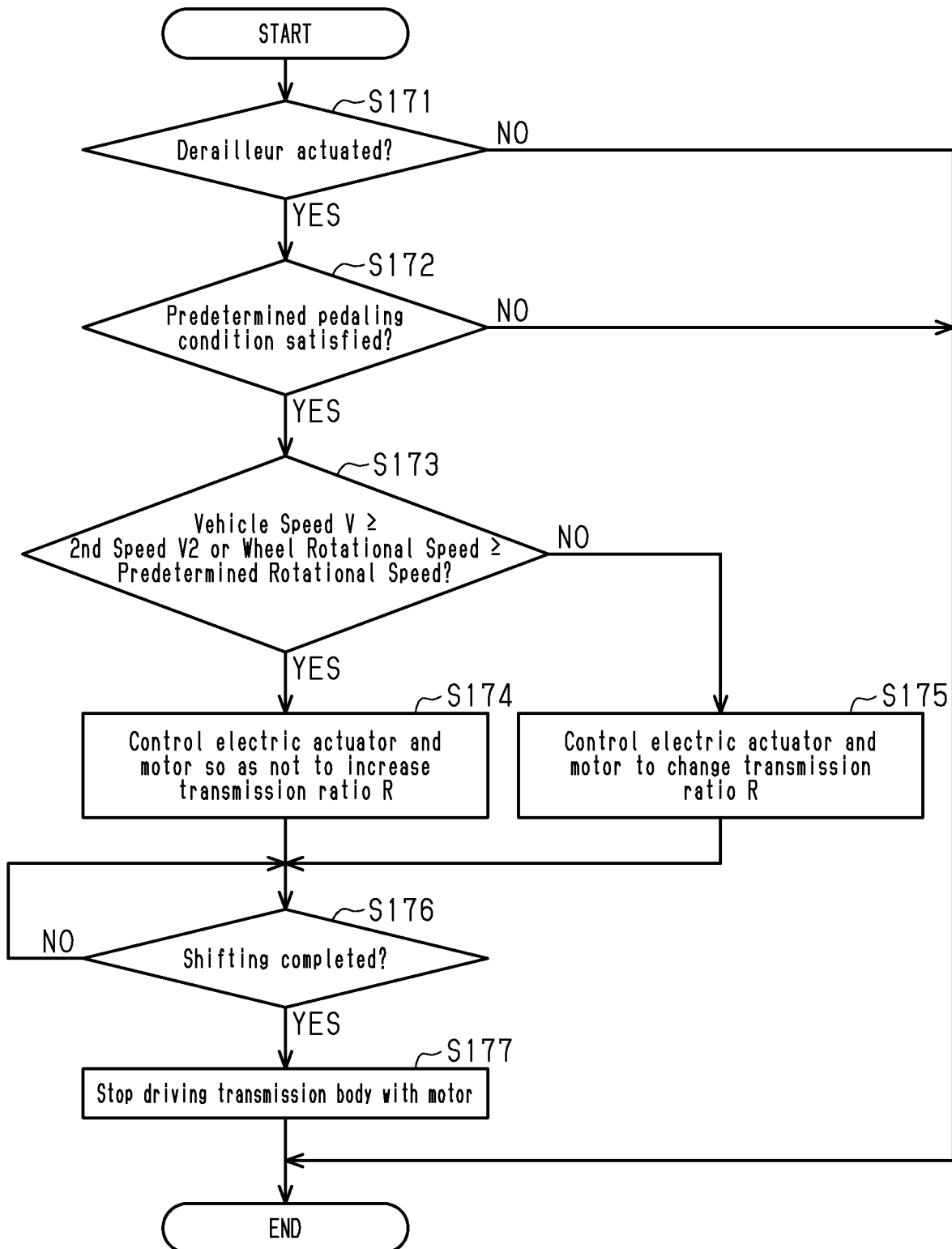
FIG. 23 is a flowchart of a process executed by an eleventh modification of an electronic controller for controlling an electric actuator and a motor to change the transmission ratio.

A process of the controller 72 for controlling the motor 24 and the electric actuator 48 to change the transmission ratio R will be described with reference to FIG. 23. In a case where the controller 72 is supplied with electric power, the controller 72 starts the process and proceeds to step S171 of the flowchart illustrated in FIG. 23. Upon completion of the flowchart illustrated in FIG. 23, the controller 72 repeats the process from step S171 in predetermined cycles until the supply of electric power is stopped.

In step S171, the controller 72 determines whether the derailleur 22 is actuated. In step S171, the controller 72 executes, for example, the same process as step S131 shown in FIG. 19. In a case where the derailleur 22 is not actuated, the controller 72 ends the process. In a case where the derailleur 22 is actuated, the controller 72 proceeds to step S172.

In step S172, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S173.

In step S173, the controller 72 determines whether the vehicle speed V is greater than or equal to the second speed V2 or the rotational speed of the wheel 16 is greater than or equal to the predetermined rotational speed. In a case where the vehicle speed V is greater than or equal to the second speed V2 or the rotational speed of the wheel 16 is greater than or equal to the predetermined rotational speed, the controller 72 proceeds to step S174. In step S174, the controller 72 controls the electric actuator 48 and the motor 24 so as not to increase the transmission ratio R, and then proceeds to step S176. In step S174, the controller 72 controls the motor 24 and drives the transmission body 20 with the motor 24. In step S174, the controller 72 controls the electric actuator 48 to decrease the transmission ratio R. In step S173, the controller 72 can proceed to step S174 in a case where the vehicle speed V is greater than or equal to the second speed V2 and the rotational speed of the wheel 16 is greater than or equal to the predetermined rotational speed.

In step S173, in a case where the vehicle speed V is not greater than or equal to the second speed V2 and the rotational speed of the wheel 16 is not greater than or equal to the predetermined rotational speed, the controller 72 proceeds to step S175. In step S175, the controller 72 controls the electric actuator 48 and the motor 24 to change the transmission ratio R and proceeds to step S176. In step S175, the controller 72 controls the motor 24 and drives the transmission body 20 with the motor 24.

In step S176, the controller 72 determines whether shifting is completed. In a case where shifting is not completed, the controller 72 again executes S176. In a case where shifting is completed, the controller 72 proceeds to step S177. In step S177, the controller 72 stops driving the transmission body 20 with the motor 24 and ends the process.

In steps S174 and S175, the controller 72 can set the target transmission ratio R. In a case where the derailleur 22 is actuated, the controller 72 can set the target transmission ratio R in another process, and in step S174, in a case where the target transmission ratio R is greater than the present transmission ratio R, the controller 72 can change the target transmission ratio R to be less than or equal to the present transmission ratio R. In a case where the derailleur 22 is actuated, the controller 72 can set the target transmission ratio R in another process, and in step S174, in a case where the target transmission ratio R is greater than the present transmission ratio R, the controller 72 can be configured not to change the transmission ratio R.

As long as the controller 72 is configured to control the motor 24 and drive the transmission body 20 in a case where the derailleur 22 is actuated by the electric actuator 48 to change the transmission ratio R and the predetermined condition related to pedaling is satisfied, and is configured to control the electric actuator 48 so as not to change the transmission ratio R until the first condition related to shifting is satisfied in a case where the derailleur 22 is actuated, other configurations can be omitted. In this modification, the derailleur 22 includes the electric actuator 48.

Figure 24:
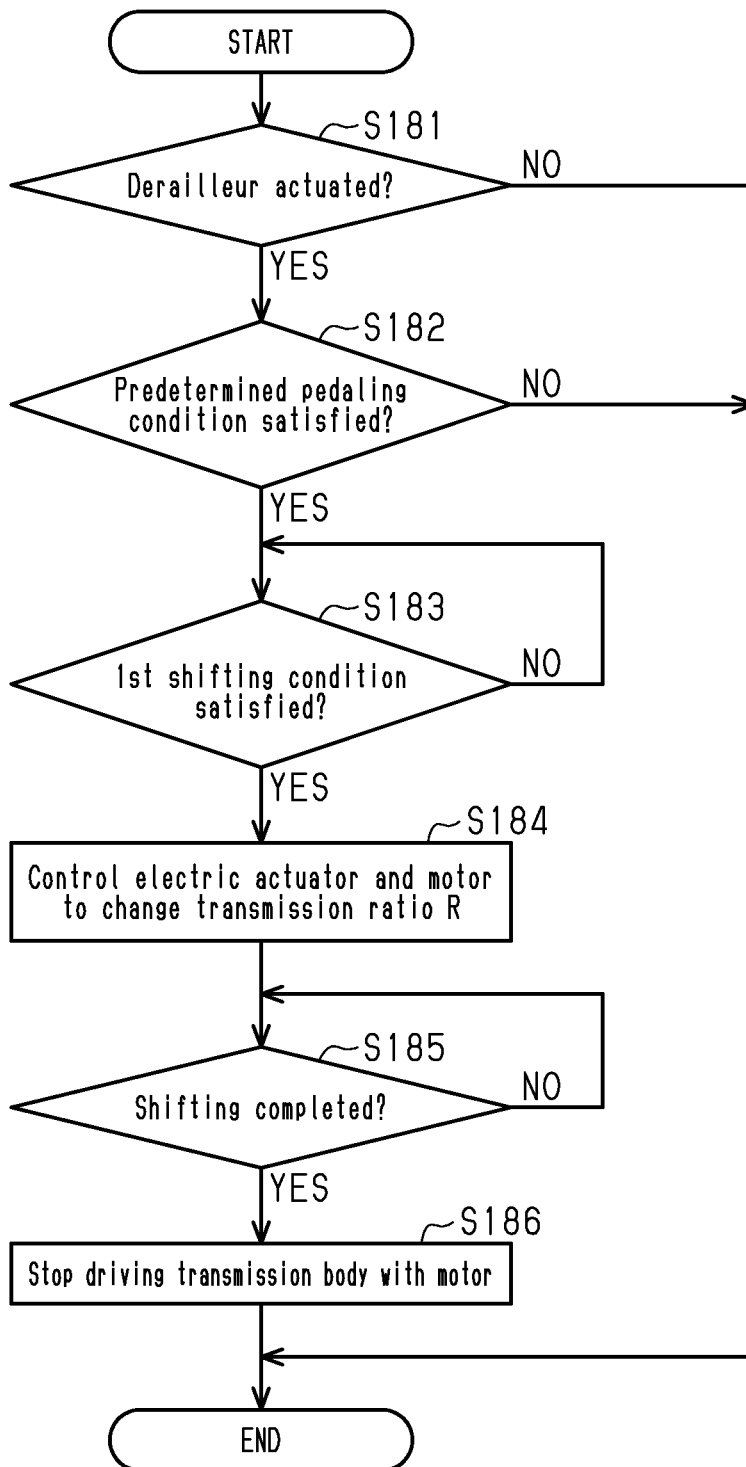
FIG. 24 is a flowchart of a process executed by a twelfth modification of an electronic controller for controlling an electric actuator and a motor to change the transmission ratio.

A process of the controller 72 for controlling the motor 24 and the electric actuator 48 to change the transmission ratio R will be described with reference to FIG. 24. In a case where the controller 72 is supplied with electric power, the controller 72 starts the process and proceeds to step S181 of the flowchart illustrated in FIG. 24. Upon completion of the flowchart illustrated in FIG. 24, the controller 72 repeats the process from step S181 in predetermined cycles until the supply of electric power is stopped.

In step S181, the controller 72 determines whether the derailleur 22 is actuated. In step S181, the controller 72 executes, for example, the same process as step S131 shown in FIG. 19. In a case where the derailleur 22 is not actuated, the controller 72 ends the process. In a case where the derailleur 22 is actuated, the controller 72 proceeds to step S182.

In step S182, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S183.

In step S183, the controller 72 determines whether the first condition related to shifting is satisfied. In a case where the first condition related to shifting is not satisfied, the controller 72 again executes step S183. In a case where the first condition related to shifting is satisfied, the controller 72 proceeds to step S184.

In step S184, the controller 72 controls the electric actuator 48 and the motor 24 to change the transmission ratio R and proceeds to step S185. In step S184, the controller 72 controls the motor 24 and drives the transmission body 20 with the motor 24.

In step S185, the controller 72 determines whether shifting is completed. In a case where shifting is not completed, the controller 72 again executes S185. In a case where shifting is completed, the controller 72 proceeds to step S186. In step S186, the controller 72 stops driving the transmission body 20 with the motor 24 and ends the process.

As long as the controller 72 is configured to control the motor 24 and drive the transmission body 20 in a case where the derailleur 22 is actuated by the electric actuator 48 to change the transmission ratio R and the predetermined condition related to pedaling is satisfied, and configured to control the electric actuator 48 so as not to change the transmission ratio R with the derailleur 22 until a second condition related to shifting is satisfied in a case where the electric actuator 48 and the motor 24 are controlled to increase or decrease the transmission ratio R a predetermined number of times or more within the predetermined third time T3, other configurations can be omitted. In this modification, the derailleur 22 includes the electric actuator 48.

Figure 25:
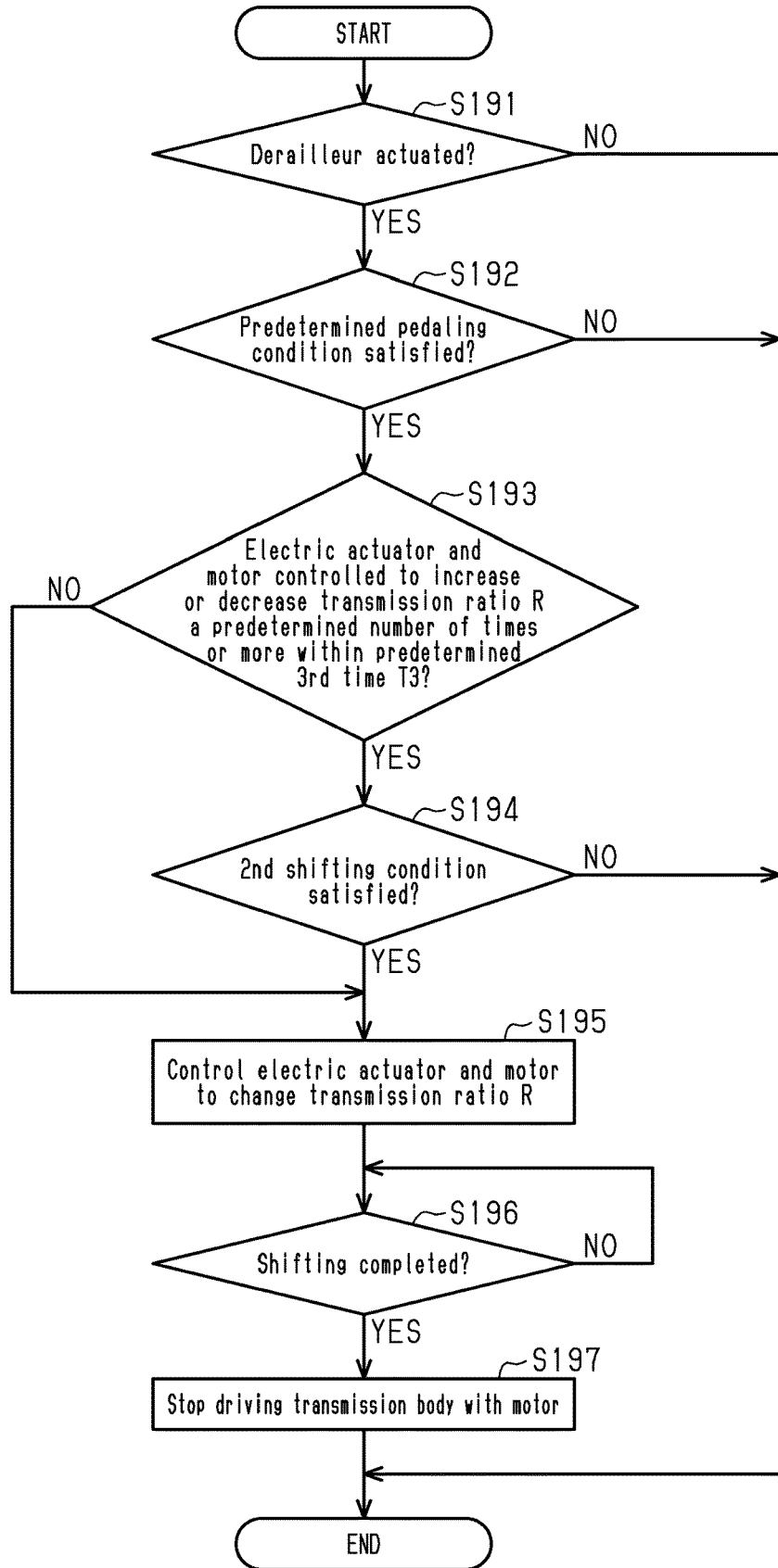
FIG. 25 is a flowchart of a process executed by a thirteenth modification of an electronic controller for controlling an electric actuator and a motor to change the transmission ratio.

A process of the controller 72 for controlling the motor 24 and the electric actuator 48 to change the transmission ratio R will be described with reference to FIG. 25. In a case where the controller 72 is supplied with electric power, the controller 72 starts the process and proceeds to step S191 of the flowchart illustrated in FIG. 25. Upon completion of the flowchart illustrated in FIG. 25, the controller 72 repeats the process from step S191 in predetermined cycles until the supply of electric power is stopped.

In step S191, the controller 72 determines whether the derailleur 22 is actuated. In step S191, the controller 72 executes, for example, the same process as step S131 shown in FIG. 19. In a case where the derailleur 22 is not actuated, the controller 72 ends the process. In a case where the derailleur 22 is actuated, the controller 72 proceeds to step S192.

In step S192, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S193.

In step S193, the controller 72 determines whether the electric actuator 48 and the motor 24 are controlled so that the transmission ratio R is increased or decreased a predetermined number of times or more within the predetermined third time T3. In a case where the electric actuator 48 and the motor 24 are controlled so that the transmission ratio R is increased or decreased a predetermined number of times or more within the predetermined third time T3, the controller 72 proceeds to step S194. In a case where the electric actuator 48 and the motor 24 are not controlled so that the transmission ratio R is increased or decreased a predetermined number of times or more within the predetermined third time T3, the controller 72 proceeds to step S195.

In step S194, the controller 72 determines whether the second condition related to shifting is satisfied. In a case where the second condition related to shifting is not satisfied, the controller 72 ends the process. In a case where the second condition related to shifting is satisfied, the controller 72 proceeds to step S195.

In step S195, the controller 72 controls the electric actuator 48 and the motor 24 to change the transmission ratio R and proceeds to step S196. In step S195, the controller 72 controls the motor 24 and drives the transmission body 20 with the motor 24.

In step S196, the controller 72 determines whether shifting is completed. In a case where shifting is not completed, the controller 72 again executes S196. In a case where shifting is completed, the controller 72 proceeds to step S197. In step S197, the controller 72 stops driving the transmission body 20 with the motor 24 and ends the process.

As long as the controller 72 is configured to control the electric actuator 48 and the motor 24 so that relative movement of the derailleur 22 and at least one of the first rotational body and the second rotational body is started at the same time as the motor 24 is driven or before the motor 24 is driven in a case where the electric actuator 48 and the motor 24 are controlled to change the transmission ratio R and the predetermined condition related to pedaling is satisfied, other configurations can be omitted. In this modification, the derailleur 22 includes the electric actuator 48.

Figure 26:
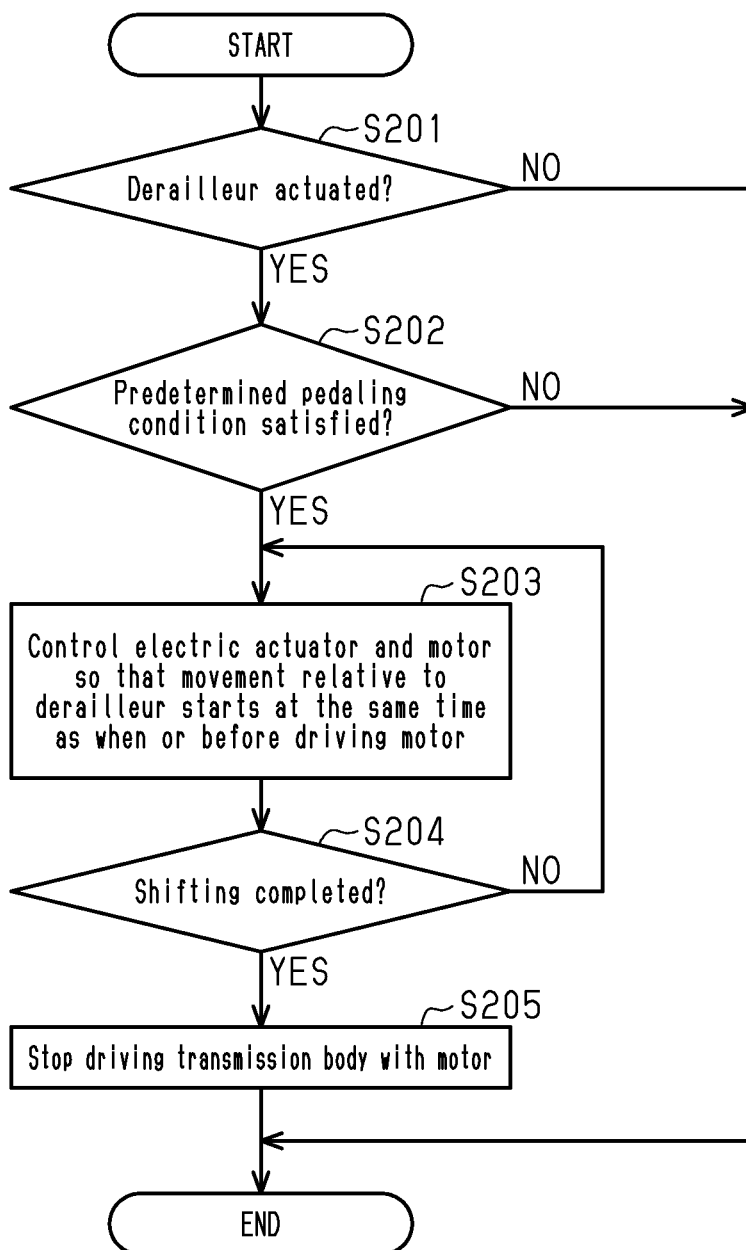
FIG. 26 is a flowchart of a process executed by a fourteenth modification of an electronic controller for controlling an electric actuator and a motor to change the transmission ratio.

A process of the controller 72 for controlling the motor 24 and the electric actuator 48 to change the transmission ratio R will be described with reference to FIG. 26. In a case where the controller 72 is supplied with electric power, the controller 72 starts the process and proceeds to step S201 of the flowchart illustrated in FIG. 26. Upon completion of the flowchart illustrated in FIG. 26, the controller 72 repeats the process from step S201 in predetermined cycles until the supply of electric power is stopped.

In step S201, the controller 72 determines whether the derailleur 22 is actuated. In step S201, the controller 72 executes, for example, the same process as step S131 shown in FIG. 19. In a case where the derailleur 22 is not actuated, the controller 72 ends the process. In a case where the derailleur 22 is actuated, the controller 72 proceeds to step S202.

In step S202, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S203.

In step S203, the controller 72 controls the electric actuator 48 and the motor 24 so that relative movement of the derailleur 22 and at least one of the first rotational body 14 and the second rotational body 18 is started at the same time as the motor 24 is driven or before the motor 24 is driven, and then proceeds to step S204. In step S203, the controller 72 controls the motor 24 and drives the transmission body 20 with the motor 24.

In step S204, the controller 72 determines whether shifting is completed. In a case where shifting is not completed, the controller 72 proceeds to step S203. In a case where shifting is completed, the controller 72 proceeds to step S205. In step S205, the controller 72 stops driving the transmission body 20 with the motor 24 and ends the process.

As long as the controller 72 is configured to control the motor 24 and drive the transmission body 20 with the motor 24 in a case where the derailleur 22 is actuated to change the transmission ratio R and the predetermined condition related to pedaling is satisfied, configured to control the electric actuator 48 so that the shift stage of the derailleur 22 approaches the predetermined shift stage or the transmission ratio R approaches a predetermined transmission ratio R in a case where the human-powered vehicle 10 is decelerated, configured to control the electric actuator 48 and change the shift stage of the derailleur 22 one stage at a time in a case where the difference of the predetermined shift stage and the present shift stage of the derailleur 22 or the difference of the predetermined transmission ratio R and the present transmission ratio R is less than or equal to the predetermined value, and configured to control the electric actuator 48 so as to continuously actuate the derailleur 22 over a plurality of shift stages in a case where the difference of the predetermined shift stage and the present shift stage of the derailleur 22 or the difference of the predetermined transmission ratio R and the present transmission ratio R exceeds the predetermined value, other configurations can be omitted. In this modification, the derailleur 22 includes the electric actuator 48.

Figure 27:
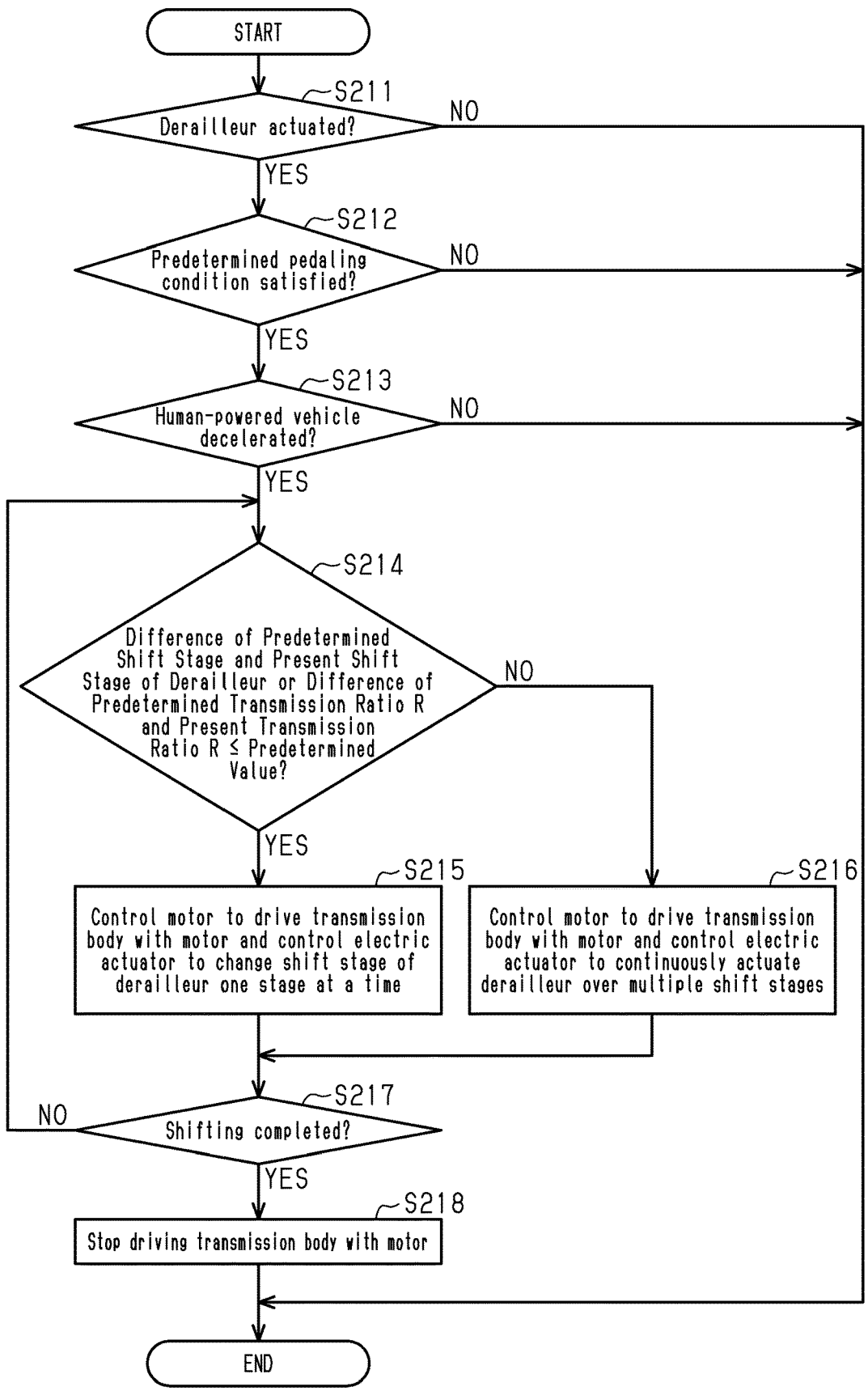
FIG. 27 is a flowchart of a process executed by a fifteenth modification of an electronic controller for controlling an electric actuator and a motor to change the transmission ratio.

A process of the controller 72 for controlling the motor 24 and the electric actuator 48 to change the transmission ratio R will be described with reference to FIG. 27. In a case where the controller 72 is supplied with electric power, the controller 72 starts the process and proceeds to step S211 of the flowchart illustrated in FIG. 27. Upon completion of the flowchart illustrated in FIG. 27, the controller 72 repeats the process from step S211 in predetermined cycles until the supply of electric power is stopped.

In step S211, the controller 72 determines whether the derailleur 22 is actuated. In step S211, the controller 72 executes, for example, the same process as step S131 shown in FIG. 19. In a case where the derailleur 22 is not actuated, the controller 72 ends the process. In a case where the derailleur 22 is actuated, the controller 72 proceeds to step S212.

In step S212, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S213.

In step S213, the controller 72 determines whether the human-powered vehicle 10 is decelerated. In a case where the human-powered vehicle 10 is not decelerated, the controller 72 ends the process. In a case where the human-powered vehicle 10 is decelerated, the controller 72 proceeds to step S214.

In step S214, the controller 72 determines whether the difference of the predetermined shift stage and the present shift stage of the derailleur 22 or the difference of the predetermined transmission ratio R and the present transmission ratio R is less than or equal to the predetermined value. In a case where the difference of the predetermined shift stage and the present shift stage of the derailleur 22 or the difference of the predetermined transmission ratio R and the present transmission ratio R is less than or equal to the predetermined value, the controller 72 proceeds to step S215. In a case where the difference of the predetermined shift stage and the present shift stage of the derailleur 22 or the difference of the predetermined transmission ratio R and the present transmission ratio R is not less than or equal to the predetermined value, the controller 72 proceeds to step S216.

In step S215, the controller 72 controls the motor 24 to drive the transmission body 20 with the motor 24 and controls the electric actuator 48 to change the shift stage of the derailleur 22 one stage at a time, and proceeds to step S217.

In step S216, the controller 72 controls the motor 24 to drive the transmission body 20 with the motor 24 and controls the electric actuator 48 to continuously actuate the derailleur 22 over a plurality of shift stages, and proceeds to step S217.

In step S217, the controller 72 determines whether shifting is completed. In a case where shifting is not completed, the controller 72 proceeds to step S214. In a case where shifting is completed, the controller 72 proceeds to step S218. In step S218, the controller 72 stops driving the transmission body 20 with the motor 24 and ends the process.

As long as the controller 72 is configured to control the motor 24 and drive the transmission body 20 with the motor 24 in a case where the derailleur 22 is actuated to change the transmission ratio R and the predetermined condition related to pedaling is satisfied, and configured to control the electric actuator 48 so that the fifth time T5 during which the derailleur 22 is actuated over a plurality of shift stages in a case where the vehicle speed V of the human-powered vehicle 10 is less than or equal to the predetermined fifth speed V5 becomes shorter than the sixth time T6 during which the derailleur 22 is actuated over a plurality of shift stages in a case where the vehicle speed V of the human-powered vehicle 10 exceeds the predetermined fifth speed V5, other configurations can be omitted. In this modification, the derailleur 22 includes the electric actuator 48.

Figure 28:
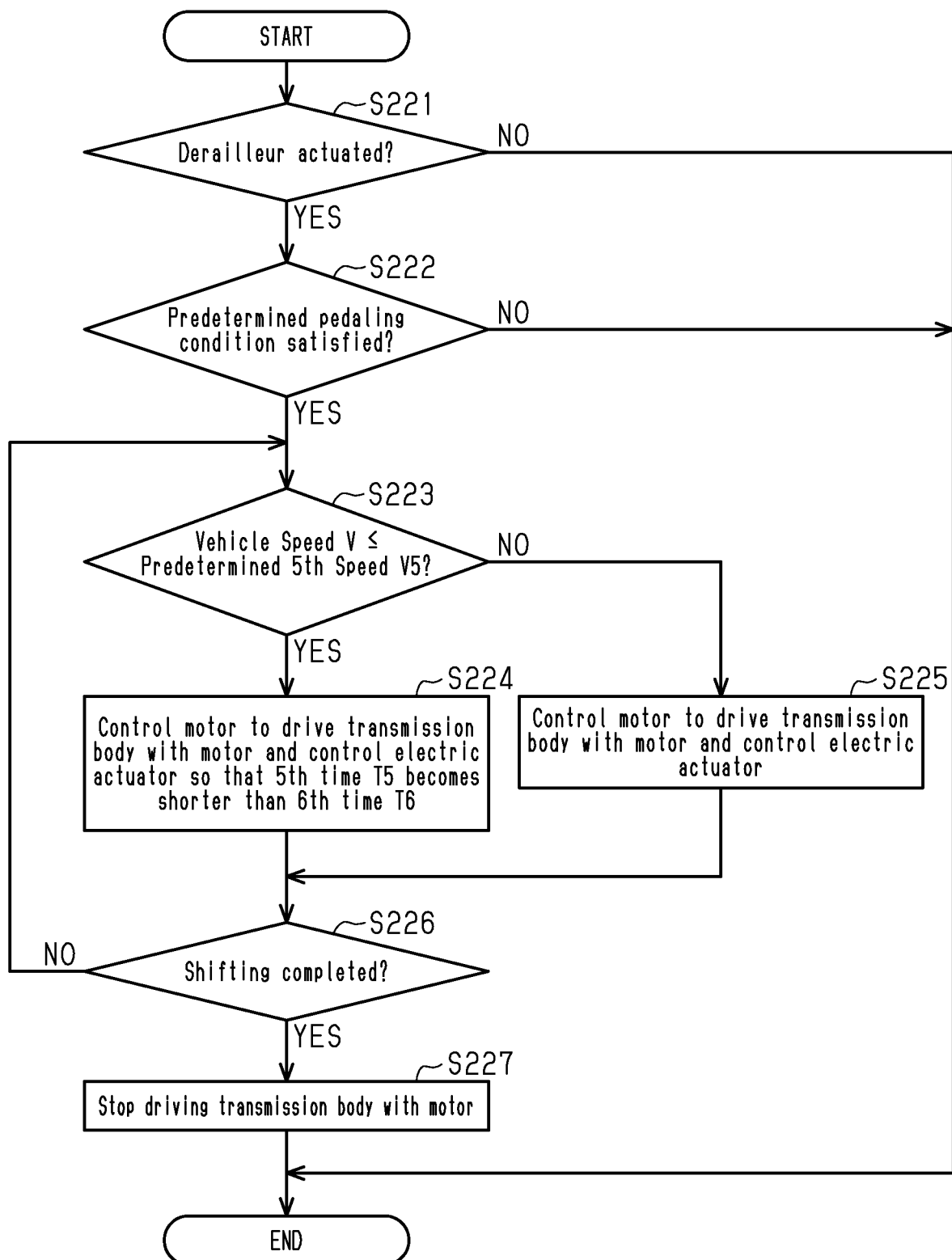
FIG. 28 is a flowchart of a process executed by a sixteenth modification of an electronic controller for controlling an electric actuator and a motor to change the transmission ratio.

A process of the controller 72 for controlling the motor 24 and the electric actuator 48 to change the transmission ratio R will be described with reference to FIG. 28. In a case where the controller 72 is supplied with electric power, the controller 72 starts the process and proceeds to step S221 of the flowchart illustrated in FIG. 28. Upon completion of the flowchart illustrated in FIG. 28, the controller 72 repeats the process from step S221 in predetermined cycles until the supply of electric power is stopped.

In step S221, the controller 72 determines whether the derailleur 22 is actuated. In step S221, the controller 72 executes, for example, the same process as step S131 shown in FIG. 19. In a case where the derailleur 22 is not actuated, the controller 72 ends the process. In a case where the derailleur 22 is actuated, the controller 72 proceeds to step S222.

In step S222, the controller 72 determines whether the predetermined condition related to pedaling is satisfied. In a case where the predetermined condition related to pedaling is not satisfied, the controller 72 ends the process. In a case where the predetermined condition related to pedaling is satisfied, the controller 72 proceeds to step S223.

In step S223, the controller 72 determines whether the vehicle speed V of the human-powered vehicle 10 is less than or equal to the predetermined fifth speed V5. In a case where the vehicle speed V of the human-powered vehicle 10 is less than or equal to the predetermined fifth speed V5, the controller 72 proceeds to step S224. In a case where the vehicle speed V of the human-powered vehicle 10 is not less than or equal to the predetermined fifth speed V5, the controller 72 proceeds to step S225.

In step S224, the controller 72 controls the motor 24 to drive the transmission body 20 with the motor 24 and controls the electric actuator 48 so that the fifth time T5 becomes shorter than the sixth time T6, and proceeds to step S226.

In step S225, the controller 72 controls the motor 24 to drive the transmission body 20 with the motor 24 and controls the electric actuator 48, and proceeds to step S226.

In step S226, the controller 72 determines whether shifting is completed. In a case where shifting is not completed, the controller 72 proceeds to step S223. In a case where shifting is completed, the controller 72 proceeds to step S227. In step S227, the controller 72 stops driving the transmission body 20 with the motor 24 and ends the process.

In the first embodiment, the second embodiment, a modification of the first embodiment, or a modification of the second embodiment, at least one of steps S16, S20, and S30 can be omitted from FIG. 5. In a case where at least one of steps S16, S20, and S30 is omitted from FIG. 5, the configuration corresponding the omitted step can be omitted from the controller 72. In a case where step S16 is omitted from FIG. 5, the controller 72 executes step S15 and then proceeds to step S17. In a case where a negative determination is made in step S17, the controller 72 repeats step S17. In a case where step S20 is omitted from FIG. 5 and an affirmative determination is made in step S13, the controller 72 proceeds to step S30. In a case where step S30 is omitted from FIG. 5 and an affirmative determination is made in step S20, the controller 72 proceeds to step S14. In a case where steps S20 and S30 are omitted from FIG. 5 and an affirmative determination is made in step S13, the controller 72 proceeds to step S14. In an embodiment including the third embodiment or a modification of the third embodiment, at least one of steps S16 and S20 can be omitted from FIG. 10. In a case where at least one of steps S16 and S20 is omitted from FIG. 10, the configuration corresponding the omitted step can be omitted from the controller 72. In a case where step S16 is omitted from FIG. 10, the controller 72 executes step S14 and then proceeds to step S57. In a case where a negative determination is made in step S57, the controller 72 repeats step S57. In a case where step S20 is omitted from FIG. 10 and an affirmative determination is made in step S13, the controller 72 proceeds to step S14.

In an embodiment including the first embodiment, the second embodiment, a modification of the first embodiment, a modification of the second embodiment, the third embodiment, or a modification of the third embodiment, the controller 72 is not limited to configurations (A1), (A2), (A3), and (A4) and can have any configuration that controls the motor 24 to drive the transmission body 20 with the motor 24. The controller 72 can control the motor 24 to drive the transmission body 20 with the motor 24 using a configuration differing from configurations (A1), (A2), (A3), and (A4). The controller 72 includes the following configuration (A5), (A6), or (A7) as the configuration differing from configurations (A1), (A2), (A3), and (A4).

(A5) In a case of driving the transmission body 20 with the motor 24, the controller 72 is configured to control the motor 24 so that the transmission body 20 moves at a constant speed regardless of the transmission ratio R.

(A6) The controller 72 is configured to control the motor 24 so that moving speed of the transmission body 20 increases from the time of starting to move regardless of the transmission ratio R.

(A7) The controller 72 is configured to control the motor 24 so that moving speed of the transmission body 20 increases from the time of starting to move and then becomes constant regardless of the transmission ratio R.

For example, in the first embodiment, the second embodiment, a modification of the first embodiment, or a modification of the second embodiment, in step S14 shown in FIG. 5, the controller 72 can control the motor 24 to drive the transmission body 20 with the motor 24 using a configuration differing from configurations (A1), (A2), (A3), and (A4). For example, in an embodiment including the third embodiment or a modification of the third embodiment, in step S14 shown in FIG. 10, the controller 72 can control the motor 24 to drive the transmission body 20 with the motor 24 using a configuration differing from configurations (A1), (A2), (A3), and (A4).

In the first embodiment, the second embodiment, a modification of the first embodiment, or a modification of the second embodiment, at least one of steps S16, S20, and S30 can be omitted from FIG. 5, and in step S14 shown in FIG. 5, the controller 72 can control the motor 24 to drive the transmission body 20 with the motor 24 using a configuration differing from configurations (A1), (A2), (A3), and (A4). In a case where at least one of steps S16, S20, and S30 is omitted from FIG. 5, the configuration corresponding the omitted step can be omitted from the controller 72.

In an embodiment including the third embodiment or a modification of the third embodiment, at least one of steps S16 and S20 can be omitted from FIG. 10, and in step S14 shown in FIG. 10, the controller 72 can control the motor 24 to drive the transmission body 20 with the motor 24 using a configuration differing from configurations (A1), (A2), (A3), and (A4). In a case where at least one of steps S16 and S20 is omitted from FIG. 10, the configuration corresponding the omitted step can be omitted from the controller 72. The configuration differing from configurations (A1), (A2), (A3), and (A4) can be configuration (A5), (A6), or (A7) or another configuration. In this modification, the motor 24 of the power transmission system 60 is configured to drive the transmission body 20 and generate electric power by being driven by the transmission body 20, the power storage device 66 is configured to store the electric power generated by the motor 24, and the control device 70 is configured to control the motor 24 using electric power of the power storage device 66. Thus, the transmission ratio R is changed in a preferred manner.

In the first embodiment, the second embodiment, a modification of the first embodiment, or a modification of the second embodiment, at least one of steps S16, S20, and S30 can be omitted from FIG. 5. In a case where at least one of steps S16, S20, and S30 is omitted from FIG. 5, the configuration corresponding the omitted step can be omitted from the controller 72. In this modification, the controller 72 is configured to control the electric actuator 48 so that among a plurality of shift stages of the derailleur 22, the transmission ratio R is set to be in the largest shift stage in a case where the first rotational speed N1 is included in the predetermined range. In this modification, in step S15 shown in FIG. 5, the controller 72 controls the electric actuator 48 so that among a plurality of shift stages of the derailleur 22, the transmission ratio R is set to be in the largest shift stage in a case where the first rotational speed N1 is included in the predetermined range. Thus, the transmission ratio R is changed in a preferred manner.

In the first embodiment, the second embodiment, a modification of the first embodiment, or a modification of the second embodiment, at least one of steps S16 and S20 can be omitted from FIG. 5. In a case where at least one of steps S16 and S20 is omitted from FIG. 5, the configuration corresponding the omitted step can be omitted from the controller 72. In this modification, the controller 72 is configured to control the motor 24 to drive the transmission body 20 in a case where the derailleur 22 is actuated by the electric actuator 48 to change the transmission ratio R and the predetermined condition related to pedaling is satisfied, and is configured to control the electric actuator 48 so as not to increase the transmission ratio R in a case where the vehicle speed V of the human-powered vehicle 10 is greater than or equal to the second speed V2 or the rotational speed NW of the wheel 16 is greater than or equal to the predetermined rotational speed NWX. Thus, the transmission ratio R is changed in a preferred manner. In step S30 shown in FIG. 5, the controller 72 determines whether the vehicle speed V of the human-powered vehicle 10 is greater than or equal to the second speed V2 or the rotational speed NW of the wheel 16 is greater than or equal to the predetermined rotational speed NWX and the target transmission ratio R is less than the present transmission ratio R. In this modification, the controller 72 can be configured to control the electric actuator 48 so that the transmission ratio R does not increase in a case where the vehicle speed V of the human-powered vehicle 10 is greater than or equal to the second speed V2 and the rotational speed NW of the wheel 16 is greater than or equal to the predetermined rotational speed NWX. In a case where the vehicle speed V of the human-powered vehicle 10 is greater than or equal to the second speed V2 or the rotational speed NW of the wheel 16 is greater than or equal to the predetermined rotational speed NWX, the controller 72 does not output the first shifting control signal to the electric actuator 48. In step S30 shown in FIG. 5, the controller 72 ends the process in a case where the vehicle speed V of the human-powered vehicle 10 is greater than or equal to the second speed V2 or the rotational speed NW of the wheel 16 is greater than or equal to the predetermined rotational speed NWX and the shifting execution condition for increasing the transmission ratio R is satisfied.

In the first embodiment, the second embodiment, a modification of the first embodiment, or a modification of the second embodiment, at least one of steps S16 and S20 can be omitted from FIG. 5. In a case where at least one of steps S16 and S20 is omitted from FIG. 5, the configuration corresponding the omitted step can be omitted from the controller 72. In this modification, the controller 72 is configured to control the motor 24 and drive the transmission body 20 in a case where the derailleur 22 is actuated by the electric actuator 48 to change the transmission ratio R and the predetermined condition related to pedaling is satisfied, and is configured to control the electric actuator 48 so as not to change the transmission ratio R until the first condition related to shifting is satisfied in a case where the derailleur 22 is actuated. Thus, the transmission ratio R is changed in a preferred manner. In a case where the derailleur 22 is actuated, the controller 72 does not output the shifting control signal to the electric actuator 48 until the first condition related to shifting is satisfied. In step S30 shown in FIG. 5, the controller 72 ends the process in a case where the derailleur 22 is actuated and the first condition related to shifting is not satisfied.

In the first embodiment, the second embodiment, a modification of the first embodiment, or a modification of the second embodiment, at least one of steps S16 and S20 can be omitted from FIG. 5. In a case where at least one of steps S16 and S20 is omitted from FIG. 5, the configuration corresponding the omitted step can be omitted from the controller 72. In this modification, the controller 72 is configured to control the motor 24 and drive the transmission body 20 in a case where the derailleur 22 is actuated by the electric actuator 48 to change the transmission ratio R and the predetermined condition related to pedaling is satisfied, and configured to control the electric actuator 48 so as not to change the transmission ratio R with the derailleur 22 until the second condition related to shifting is satisfied in a case where the electric actuator 48 and the motor 24 are controlled to increase or decrease the transmission ratio R a predetermined number of times or more within the predetermined third time T3. Thus, the transmission ratio R is changed in a preferred manner.

The controller 72 does not output the shifting control signal to the electric actuator 48 until the second condition related to shifting is satisfied in a case where the electric actuator 48 and the motor 24 are controlled to increase or decrease the transmission ratio R a predetermined number of times or more within the predetermined third time T3. In step S30, the controller 72 ends the process in a case where the electric actuator 48 and the motor 24 are controlled to increase or decrease the transmission ratio R a predetermined number of times or more within the predetermined third time T3 and the second condition related to shifting is not satisfied.

In the first embodiment, the second embodiment, a modification of the first embodiment, or a modification of the second embodiment, at least one of steps S16, S20, and S30 can be omitted from FIG. 5. In a case where at least one of steps S16, S20, and S30 is omitted from FIG. 5, the configuration corresponding the omitted step can be omitted from the controller 72. In this modification, the controller 72 is configured to control the electric actuator 48 and the motor 24 so that relative movement of the derailleur 22 and at least one of the first rotational body 14 and the second rotational body 18 is started at the same time as the motor 24 is driven or before the motor 24 is driven in a case where the electric actuator 48 and the motor 24 are controlled to change the transmission ratio R and the predetermined condition related to pedaling is satisfied. Thus, the transmission ratio R is changed in a preferred manner. In this modification, preferably, in step S14 shown in FIG. 5, the controller 72 controls the motor 24 so as not to drive the motor 24 until the electric actuator 48 is actuated in step S15.

In the first embodiment, the second embodiment, a modification of the first embodiment, or a modification of the second embodiment, at least one of steps S16, S20, and S30 can be omitted from FIG. 5. In a case where at least one of steps S16, S20, and S30 is omitted from FIG. 5, the configuration corresponding the omitted step can be omitted from the controller 72. In this modification, the controller 72 is configured to control the electric actuator 48 so that the shift stage of the derailleur 22 approaches the predetermined shift stage or the transmission ratio R approaches a predetermined transmission ratio RX in a case where the human-powered vehicle 10 is decelerated, configured to control the electric actuator 48 and change the shift stage of the derailleur 22 one stage at a time in a case where the difference of the predetermined shift stage and the present shift stage of the derailleur 22 or the difference of the predetermined transmission ratio R and the present transmission ratio R is less than or equal to the predetermined value, and configured to control the electric actuator 48 so as to continuously actuate the derailleur 22 over a plurality of shift stages in a case where the difference of the predetermined shift stage and the present shift stage of the derailleur 22 or the difference of the predetermined transmission ratio R and the present transmission ratio R exceeds the predetermined value. Thus, the transmission ratio R is changed in a preferred manner.

In this modification, in step S11, in a case where the human-powered vehicle 10 is decelerated, the controller 72 determines that the shifting execution condition is satisfied. In step S15, the controller 72 controls the electric actuator 48 so that the shift stage of the derailleur 22 approaches the predetermined shift stage or the transmission ratio R approaches the predetermined transmission ratio RX in a case where the human-powered vehicle 10 is decelerated, and controls the electric actuator 48 and change the shift stage of the derailleur 22 one stage at a time in a case where the difference of the predetermined shift stage and the present shift stage of the derailleur 22 or the difference of the predetermined transmission ratio R and the present transmission ratio R is less than or equal to the predetermined value, and controls the electric actuator 48 so as to continuously actuate the derailleur 22 over a plurality of shift stages in a case where the difference of the predetermined shift stage and the present shift stage of the derailleur 22 or the difference of the predetermined transmission ratio R and the present transmission ratio R exceeds the predetermined value. In step S11, for example, in a case where deceleration in a direction corresponding to the traveling direction of the human-powered vehicle 10 is greater than the predetermined deceleration, the controller 72 can determine that the shifting execution condition is satisfied.

In the first embodiment, the second embodiment, a modification of the first embodiment, or a modification of the second embodiment, at least one of steps S16, S20, and S30 can be omitted from FIG. 5. In a case where at least one of steps S16, S20, and S30 is omitted from FIG. 5, the configuration corresponding the omitted step can be omitted from the controller 72. In this modification, the controller 72 is configured to control the electric actuator 48 so that the fifth time T5 during which the derailleur 22 is actuated over a plurality of shift stages in a case where the vehicle speed V of the human-powered vehicle 10 is less than or equal to the predetermined fifth speed V5 becomes shorter than the sixth time T6 during which the derailleur 22 is actuated over a plurality of shift stages in a case where the vehicle speed V of the human-powered vehicle 10 exceeds the predetermined fifth speed V5.

In this modification, in step S15 shown FIG. 5, the controller 72 controls the electric actuator 48 so that the fifth time T5 during which the derailleur 22 is actuated over a plurality of shift stages in a case where the vehicle speed V of the human-powered vehicle 10 is less than or equal to the predetermined fifth speed V5 becomes shorter than the sixth time T6 during which the derailleur 22 is actuated over a plurality of shift stages in a case where the vehicle speed V of the human-powered vehicle 10 exceeds the predetermined fifth speed V5. Thus, the transmission ratio R is changed in a preferred manner.

Figure 6:
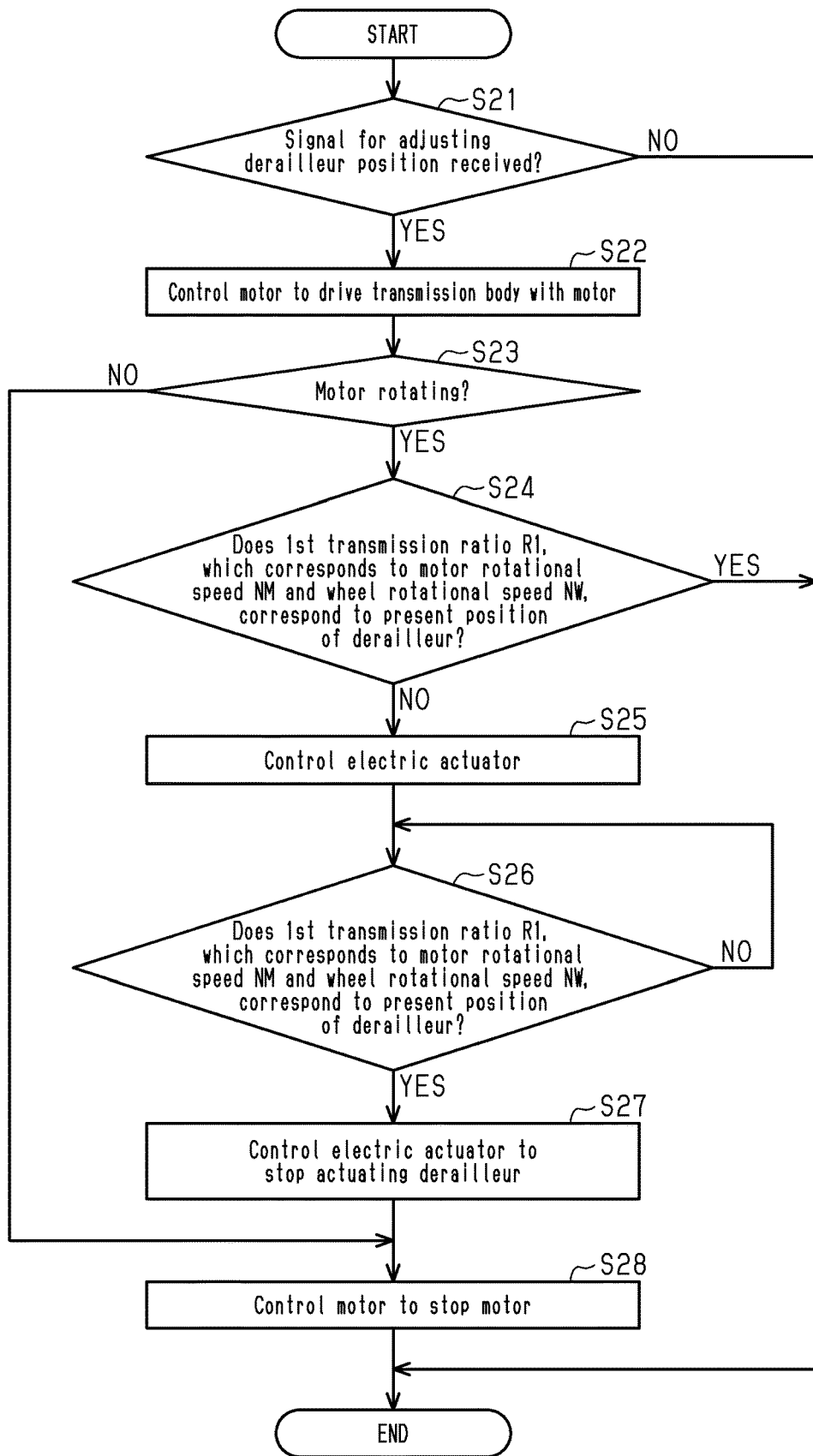
FIG. 6 is a flowchart of a process executed by the electronic controller shown in FIG. 4 for controlling the electric actuator and the motor to adjust the position of a derailleur.

In the first embodiment, the second embodiment, a modification of the first embodiment, or a modification of the second embodiment, the controller 72 can execute the process in the flowchart illustrated in FIG. 6, and the entire process in the flowchart illustrated in FIG. 5 can be omitted. In a case where the process shown in FIG. 5 is omitted, the configuration corresponding the omitted step can be omitted from the controller 72. In this modification, the control device 70 includes the controller 72 configured to control the electric actuator 48 and the motor 24 and receive a signal for adjusting the position of the derailleur 22. The controller 72 is configured to control the motor 24 and drive the motor 24 in a case where the signal for adjusting the position of the derailleur 22 is received, and is configured to control the electric actuator 48 so that the position of the derailleur 22 corresponds to the first transmission ratio R1 in a case where the first transmission ratio R1 corresponding to the rotational speed of the motor 24 and the rotational speed NW of the wheel 16 does not correspond to the present position of the derailleur 22. Thus, the transmission ratio R is changed in a preferred manner.

In the first embodiment, the second embodiment, a modification of the first embodiment, or a modification of the second embodiment, the entire process in the flowchart illustrated in FIG. 5 and the entire process in the flowchart illustrated in FIG. 6 can be omitted from the configuration of the controller 72. In a case where the process shown in FIG. 5 is omitted, the configuration corresponding the omitted step can be omitted from the controller 72. In this modification, the controller 72 is configured to control the electric actuator 48 using electric power of the power storage device 66. Thus, the transmission ratio R is changed in a preferred manner.

In the first embodiment, the second embodiment, a modification of the first embodiment, or a modification of the second embodiment, the controller 72 does not have to execute step S13 in the flowchart illustrated in FIG. 5. In a case where step S13 is omitted from FIG. 5, the configuration corresponding to the omitted step can be omitted from the controller 72. In this case, in the flowchart illustrated in FIG. 5, in a case where an affirmative determination is made in step S10, the controller 72 can proceed to step S20 or S19. In the flowchart illustrated in FIG. 5, after executing step S12, the controller 72 can proceed to one of steps S20 and S19 in accordance with a condition different from the predetermined condition related to pedaling.

Further, in this modification, at least one of steps S16, S20, and S30 can be omitted from FIG. 5, and in step S14 shown in FIG. 5, the controller 72 can control the motor 24 to drive the transmission body 20 with the motor 24 using a configuration differing from configurations (A1), (A2), (A3), and (A4). In the third embodiment or a modification of the third embodiment, the controller 72 does not have to execute step S13 in the flowchart illustrated in FIG. 10. In a case where step S13 is omitted from FIG. 10, the configuration corresponding to the omitted step can be omitted from the controller 72. In this case, in the flowchart illustrated in FIG. 10, in a case where an affirmative determination is made in step S51, the controller 72 proceeds to step S20.

Further, in a modification in which step S13 is omitted from the flowchart illustrated in FIG. 10, at least one of steps S16 and S20 can be omitted from FIG. 10, and in step S14, the controller 72 can control the motor 24 and drive the transmission body 20 with the motor 24 using a configuration differing from configurations (A1), (A2), (A3), and (A4). In a modification in which step S13 is omitted from FIG. 5 and a modification in which step S13 is omitted from FIG. 10, the motor 24 of the power transmission system 60 is configured to drive the transmission body 20 and generate electric power by being driven by the transmission body 20, the power storage device 66 is configured to store the electric power generated by the motor 24, and the control device 70 is configured to control the motor 24 using electric power of the power storage device 66. Thus, the transmission ratio R is changed in a preferred manner.

In the first embodiment, the second embodiment, a modification of the first embodiment, or a modification of the second embodiment, the motor 24 can be configured not to apply a propulsion force to the human-powered vehicle 10 in correspondence with the human driving force H.

In the first embodiment, the second embodiment, a modification of the first embodiment, or a modification of the second embodiment, instead of executing step S17 in the flowchart illustrated in FIG. 5, the controller 72 can determine whether a predetermined time elapses from the time of driving the motor 24. Information related to predetermined time T is stored in the storage 74. In a case where the predetermined time T has elapsed from the time of driving the motor 24, the controller 72 proceeds to step S18. The predetermined time T can be fixed or can be changed in accordance with at least one of the present transmission ratio R and the target transmission ratio R. Information related to predetermined time T is stored in the storage 74.

The controller 72 repeats step S17 until the predetermined time T elapses from the time of driving the motor 24. In the third embodiment or a modification of the third embodiment, the controller 72 can determine whether the predetermined time elapses from the time of driving the motor 24 instead of executing step S57 in the flowchart illustrated in FIG. 10. In a case where the predetermined time T has elapsed from the time of driving the motor 24, the controller 72 proceeds to step S18. The predetermined time T can be fixed or can be changed in accordance with at least one of the present transmission ratio R and the target transmission ratio R. The controller 72 repeats step S57 until the predetermined time T elapses from the time of driving the motor 24.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A control device for a human-powered vehicle including a crank axle, a first rotational body connected to the crank axle, a wheel, a second rotational body connected to the wheel, a transmission body engaged with the first rotational body and the second rotational body to transmit driving force between the first rotational body and the second rotational body, a derailleur configured to operate the transmission body to change a transmission ratio of a rotational speed of the wheel to a rotational speed of the crank axle, a motor configured to drive the transmission body, and an electric actuator configured to operate the derailleur, the control device comprising:

an electronic controller including a processor, the electronic controller being communicably connected to the electric actuator and the motor and configured to control the electric actuator and the motor, the electronic controller being configured to control the electric actuator and drive the transmission body with the motor so that the transmission ratio is changed in a predetermined shifting range in upon determining the derailleur has been actuated to change the transmission ratio and a predetermined condition related to pedaling is satisfied.

2. The control device according to claim 1, wherein
the predetermined shifting range includes a range that is less than or equal to a predetermined third transmission ratio, and
the predetermined third transmission ratio is less than a maximum one of the transmission ratio that is changeable by the derailleur.

3. The control device according to claim 2, wherein
the electronic controller is configured to control the electric actuator and drive the transmission body with the motor so that the transmission ratio is changed in a predetermined shifting range in at least one of a case where the derailleur is actuated to change the transmission ratio, the predetermined condition related to pedaling is satisfied, and a road on which the human-powered vehicle travels changes from an uphill to a downhill, and a case where the derailleur is actuated to change the transmission ratio, the predetermined condition related to pedaling is satisfied, and a vehicle speed of the human-powered vehicle changes from an increasing state to a decreasing state.

4. The control device according to claim 1, wherein
the predetermined shifting range includes a range that is greater than or equal to a predetermined fourth transmission ratio, and
the predetermined fourth transmission ratio is greater than a minimum one of the transmission ratio that is changeable by the derailleur.

5. The control device according to claim 4, wherein
the electronic controller is configured to control the electric actuator and drive the transmission body with the motor so that the transmission ratio is changed in the predetermined shifting range in at least one of a case where the derailleur has been actuated to change the transmission ratio, the predetermined condition related to pedaling is satisfied, and a vehicle speed of the human-powered vehicle is less than or equal to a sixth speed, and a case where the derailleur has been actuated to change the transmission ratio, the predetermined condition related to pedaling is satisfied, and the rotational speed of the crank axle of the human-powered vehicle is less than or equal to a third rotational speed.

6. The control device according to claim 1, wherein
the electronic controller is configured to be switchable between a first shifting mode, in which the electronic controller controls the electric actuator in accordance with a state of the human-powered vehicle, and a second shifting mode, in which the electronic controller controls the electric actuator in accordance with operation of a transmission operating device that includes a switch and is provided on the human-powered vehicle,
the electronic controller is configured to be switchable between a third mode and a fourth mode in the first shifting mode,
in the third mode, the electronic controller is configured to control the motor and drive the transmission body in accordance with the state of the human-powered vehicle upon determining the derailleur has been actuated to change the transmission ratio and the predetermined condition related to pedaling is satisfied, and in the fourth mode, the electronic controller is configured to control the motor so as not to drive the transmission body even upon determining the derailleur has been actuated to change the transmission ratio and the predetermined condition related to pedaling is satisfied.

7. The control device according to claim 1, wherein
the electronic controller is configured to control the motor and the electric actuator so that relative movement of the derailleur and at least one of the first rotational body and the second rotational body is started simultaneously as the motor is driven or before the motor is driven upon determining the electric actuator and the motor are controlled to change the transmission ratio and a predetermined condition related to pedaling is satisfied.

8. The control device according to claim 1, wherein
the electronic controller is configured to control the motor and drive the transmission body with the motor upon determining the derailleur has been actuated to change the transmission ratio and the predetermined condition related to pedaling is satisfied;
the electronic controller is configured to control the electric actuator so that a shift stage of the derailleur approaches a predetermined shift stage or the transmission ratio approaches a predetermined transmission ratio upon determining the human-powered vehicle is decelerated,
the electronic controller is configured to control the electric actuator and change the shift stage of the derailleur one stage at a time upon determining either a difference of the predetermined shift stage and a present shift stage of the derailleur or a difference of the predetermined transmission ratio, and the present transmission ratio is less than or equal to a predetermined value; and
the electronic controller is configured to control the electric actuator so as to continuously actuate the derailleur over a plurality of shift stages upon determining either a difference of the predetermined shift stage and a present shift stage of the derailleur or a difference of the predetermined transmission ratio, and the present transmission ratio exceeds the predetermined value.

9. The control device according to claim 1, wherein
the predetermined condition related to pedaling is satisfied in at least one of a case where a human driving force input to the crank axle is less than or equal to a predetermined driving force, a case where a rotational speed of the crank axle is less than or equal to a second rotational speed, and a case where the crank axle is oscillating.

10. The control device according to claim 1, wherein
the electronic controller is configured to control the motor to apply a propulsion force to the human-powered vehicle in accordance with a human driving force, and
the electronic controller is configured to drive the transmission body so as not to apply the propulsion force to the human-powered vehicle upon determining the derailleur has been actuated to change the transmission ratio and the predetermined condition related to pedaling is satisfied.

11. A power transmission system comprising the control device according to claim 1, the power transmission system further comprising:

a first one-way clutch provided in a first power transmission path between the crank axle and the first rotational body and configured to transmit rotational force from the crank axle to the first rotational body in a first rotational direction and restrict transmission of rotational force from the first rotational body to the crank axle in the first rotational direction.

12. The power transmission system according to claim 11, further comprising:

a second one-way clutch provided in a second power transmission path between the second rotational body and the wheel and configured to transmit rotational force from the second rotational body to the wheel in a second rotational direction corresponding to the first rotational direction and restrict transmission of rotational force from the wheel to the second rotational body in the second rotational direction.

13. A control device for a human-powered vehicle including the human-powered vehicle includes a crank axle, a first rotational body connected to the crank axle, a wheel, a second rotational body connected to the wheel, a transmission body engaged with the first rotational body and the second rotational body to transmit driving force between the first rotational body and the second rotational body, a derailleur configured to operate the transmission body to change a transmission ratio of a rotational speed of the wheel to a rotational speed of the crank axle, a motor configured to drive the transmission body, and an electric actuator configured to operate the derailleur, the control device comprising:

an electronic controller including a processor, the electronic controller being communicably connected to the electric actuator and the motor and configured to control the electric actuator and the motor,
the electronic controller being configured to be switchable between a first shifting mode, in which the electronic controller controls the electric actuator in accordance with a state of the human-powered vehicle, and a second shifting mode, in which the electronic controller controls the electric actuator in accordance with operation of a transmission operating device that includes a switch and is provided on the human-powered vehicle,
the electronic controller being configured to be switchable between a third mode and a fourth mode while in the first shifting mode,
in the third mode, the electronic controller is configured to control the motor and drive the transmission body in accordance with the state of the human-powered vehicle upon determining the derailleur has been actuated to change the transmission ratio and a predetermined condition related to pedaling is satisfied, and
in the fourth mode, the electronic controller is configured to control the motor so as not to drive the transmission body even upon determining the derailleur has been actuated to change the transmission ratio and the predetermined condition related to pedaling is satisfied.

14. The control device according to claim 13, wherein
the electronic controller is configured to control the motor and the electric actuator so that relative movement of the derailleur and at least one of the first rotational body and the second rotational body is started simultaneously as the motor is driven or before the motor is driven upon determining the electric actuator and the motor are controlled to change the transmission ratio and a predetermined condition related to pedaling is satisfied.

15. The control device according to claim 13, wherein
the electronic controller is configured to control the motor and drive the transmission body with the motor upon determining the derailleur has been actuated to change the transmission ratio and the predetermined condition related to pedaling is satisfied;
the electronic controller is configured to control the electric actuator so that a shift stage of the derailleur approaches a predetermined shift stage or the transmission ratio approaches a predetermined transmission ratio upon determining the human-powered vehicle is decelerated;
the electronic controller is configured to control the electric actuator and change the shift stage of the derailleur one stage at a time upon determining either a difference of the predetermined shift stage and a present shift stage of the derailleur or a difference of the predetermined transmission ratio, and the present transmission ratio is less than or equal to a predetermined value; and
the electronic controller is configured to control the electric actuator so as to continuously actuate the derailleur over a plurality of shift stages upon determining either a difference of the predetermined shift stage and a present shift stage of the derailleur or a difference of the predetermined transmission ratio, and the present transmission ratio exceeds the predetermined value.

16. The control device according to claim 13, wherein
the predetermined condition related to pedaling is satisfied in at least one of a case where a human driving force input to the crank axle is less than or equal to a predetermined driving force, a case where a rotational speed of the crank axle is less than or equal to a second rotational speed, and a case where the crank axle is oscillating.

17. The control device according to claim 13, wherein
the electronic controller is configured to control the motor to apply a propulsion force to the human-powered vehicle in accordance with a human driving force, and
the electronic controller is configured to drive the transmission body so as not to apply the propulsion force to the human-powered vehicle upon determining the derailleur has been actuated to change the transmission ratio and the predetermined condition related to pedaling is satisfied.

18. A power transmission system comprising the control device according to claim 13, the power transmission system further comprising:
a first one-way clutch provided in a first power transmission path between the crank axle and the first rotational body and configured to transmit rotational force from the crank axle to the first rotational body in a first rotational direction and restrict transmission of rotational force from the first rotational body to the crank axle in the first rotational direction.

19. The power transmission system according to claim 18, further comprising:
a second one-way clutch provided in a second power transmission path between the second rotational body and the wheel and configured to transmit rotational force from the second rotational body to the wheel in a second rotational direction corresponding to the first rotational direction and restrict transmission of rotational force from the wheel to the second rotational body in the second rotational direction.

20. A control device for a human-powered vehicle including the human-powered vehicle includes a crank axle, a first rotational body connected to the crank axle, a wheel, a second rotational body connected to the wheel, a transmission both engaged with the first rotational body and the second rotational body to transmit driving force between the first rotational body and the second rotational body, a derailleur configured to operate the transmission body to change a transmission ratio of a rotational speed of the wheel to a rotational speed of the crank axle, an electric actuator configured to operate the derailleur, and a motor configured to drive the transmission body, the control device comprising:
an electronic controller including a processor, the electronic controller being communicably connected to the electric actuator and the motor and configured to control the electric actuator and the motor,
the electronic controller being configured to control the motor and drive the transmission body with the motor upon determining the derailleur has been actuated to change the transmission ratio and a predetermined condition related to pedaling is satisfied, and
the electronic controller being configured to control the electric actuator so that the transmission ratio does not increase upon determining a vehicle speed of the human-powered vehicle is greater than or equal to a second speed or the rotational speed of the wheel is greater than or equal to a predetermined rotational speed.

21. The control device according to claim 20, wherein
the electronic controller is configured to control the electric actuator so as not to change the transmission ratio until a first condition related to shifting is satisfied in a case where the derailleur is actuated.

22. The control device according to claim 20, wherein
the electronic controller is configured to control the motor and the electric actuator so that relative movement of the derailleur and at least one of the first rotational body and the second rotational body is started simultaneously as the motor is driven or before the motor is driven upon determining the electric actuator and the motor are controlled to change the transmission ratio and a predetermined condition related to pedaling is satisfied.

23. The control device according to claim 20, wherein
the electronic controller is configured to control the motor and drive the transmission body with the motor upon determining the derailleur has been actuated to change the transmission ratio and the predetermined condition related to pedaling is satisfied;
the electronic controller is configured to control the electric actuator so that a shift stage of the derailleur approaches a predetermined shift stage or the transmission ratio approaches a predetermined transmission ratio upon determining the human-powered vehicle is decelerated;
the electronic controller is configured to control the electric actuator and change the shift stage of the derailleur one stage at a time upon determining either a difference of the predetermined shift stage and a present shift stage of the derailleur or a difference of the predetermined transmission ratio, and the present transmission ratio is less than or equal to a predetermined value; and
the electronic controller is configured to control the electric actuator so as to continuously actuate the derailleur over a plurality of shift stages upon determining either a difference of the predetermined shift stage and a present shift stage of the derailleur or a difference of the predetermined transmission ratio, and the present transmission ratio exceeds the predetermined value.

24. The control device according to claim 20, wherein the predetermined condition related to pedaling is satisfied in at least one of a case where a human driving force input to the crank axle is less than or equal to a predetermined driving force, a case where a rotational speed of the crank axle is less than or equal to a second rotational speed, and a case where the crank axle is oscillating.

25. The control device according to claim 20, wherein the electronic controller is configured to control the motor to apply a propulsion force to the human-powered vehicle in accordance with a human driving force, and the electronic controller is configured to drive the transmission body so as not to apply the propulsion three to the human-powered vehicle upon determining the derailleur has been actuated to change the transmission ratio and the predetermined condition related to pedaling is satisfied.

26. A power transmission system comprising the control device according to claim 20, the power transmission system further comprising:
 a first one-way clutch provided in a first power transmission path between the crank axle and the first rotational body and configured to transmit rotational force from the crank axle to the first rotational body in a first rotational direction and restrict transmission of rotational force from the first rotational body to the crank axle in the first rotational direction.

27. The power transmission system according to claim 26, further comprising:
 a second one-way clutch provided in a second power transmission path between the second rotational body and the wheel and configured to transmit rotational force from the second rotational body to the wheel in a second rotational direction corresponding to the first rotational direction and restrict transmission of rotational force from the wheel to the second rotational body in the second rotational direction.

\* \* \* \* \*